United States Patent
Swiegers et al.

(10) Patent No.: US 10,026,967 B2
(45) Date of Patent: Jul. 17, 2018

(54) COMPOSITE THREE-DIMENSIONAL ELECTRODES AND METHODS OF FABRICATION

(71) Applicant: AquaHydrex Pty Ltd, North Wollongong (AU)

(72) Inventors: Gerhard Frederick Swiegers, Woonona (AU); Andrew Nattestad, Fairy Meadow (AU); Dennis Antiohos, Fairy Meadow (AU); Fletcher William Thompson, Coniston (AU); Stephen Thomas Beirne, Farmborough Heights (AU); Mark S. Romano, Wollongong (AU); Wen Zheng, Balgownie (AU); Jun Chen, Balgownie (AU); Caiyun Wang, Mangerton (AU); Steven DuWayne Kloos, Naperville, IL (US)

(73) Assignee: AQUAHYDREX PTY LTD, North Wollongong (AU)

( * ) Notice: Subject to any disclaimer, the term of this patent is extended or adjusted under 35 U.S.C. 154(b) by 0 days.

(21) Appl. No.: 14/908,258

(22) PCT Filed: Jul. 30, 2014

(86) PCT No.: PCT/AU2014/050160
§ 371 (c)(1),
(2) Date: Jan. 28, 2016

(87) PCT Pub. No.: WO2015/013765
PCT Pub. Date: Feb. 5, 2015

(65) Prior Publication Data
US 2016/0211527 A1 Jul. 21, 2016

(30) Foreign Application Priority Data

Jul. 31, 2013 (AU) ................................ 2013902844
Dec. 10, 2013 (AU) ................................ 2013904802
(Continued)

(51) Int. Cl.
*H01M 8/02* (2016.01)
*H01M 4/86* (2006.01)
(Continued)

(52) U.S. Cl.
CPC ............ *H01M 4/8626* (2013.01); *C25B 1/13* (2013.01); *C25B 1/14* (2013.01); *C25B 1/245* (2013.01);
(Continued)

(58) Field of Classification Search
CPC .... H01M 4/8626; H01M 4/8807; H01M 8/08; H01M 8/04104; H01M 4/8605;
(Continued)

(56) References Cited

U.S. PATENT DOCUMENTS 3,284,243 A 11/1966 Von Sturm
3,553,029 A 1/1971 Kordesch et al.
(Continued)

FOREIGN PATENT DOCUMENTS

CA 2238738 6/1997
CN 1474883 2/2004
(Continued)

OTHER PUBLICATIONS

Winther-Jensen et al., "Towards hydrogen production using a breathable electrode structure to directly separate gases in the water splitting reaction," International Journal of Hydrogen Energy, May 2012, pp. 8185-8189, vol. 37, No. 10, Elsevier Ltd.
(Continued)

*Primary Examiner* — Cynthia K Walls
(74) *Attorney, Agent, or Firm* — Knobbe Martens Olson and Bear, LLP

(57) ABSTRACT

Disclosed are gas permeable 3D electrodes, preferably that have practical utility in, particularly, electro-energy and electro-synthetic applications. Gas permeable materials, such as non-conductive porous polymer membranes, are attached to one or more porous conductive materials. In another aspect there is provided a method for the fabrication of gas permeable 3D electrodes, for example gas diffusion electrodes (GDEs). The 3D electrodes can be utilized in electrochemical cells or devices.

40 Claims, 16 Drawing Sheets

(30) Foreign Application Priority Data

| Dec. 10, 2013 | (AU) | 2013904803 |
|---|---|---|
| Dec. 10, 2013 | (AU) | 2013904804 |
| Dec. 10, 2013 | (AU) | 2013904806 |

(51) Int. Cl.

| | | |
|---|---|---|
| *C25B 15/02* | (2006.01) | |
| *C25C 7/00* | (2006.01) | |
| *C25B 9/08* | (2006.01) | |
| *H01M 8/04089* | (2016.01) | |
| *C25B 1/13* | (2006.01) | |
| *C25B 1/14* | (2006.01) | |
| *C25B 1/24* | (2006.01) | |
| *C25B 1/26* | (2006.01) | |
| *C25B 1/30* | (2006.01) | |
| *C25B 3/00* | (2006.01) | |
| *C25B 11/03* | (2006.01) | |
| *H01M 8/08* | (2016.01) | |
| *H01M 4/88* | (2006.01) | |
| *H01M 8/083* | (2016.01) | |

(52) U.S. Cl.
CPC ............ *C25B 1/26* (2013.01); *C25B 1/265* (2013.01); *C25B 1/30* (2013.01); *C25B 3/00* (2013.01); *C25B 9/08* (2013.01); *C25B 11/035* (2013.01); *C25B 15/02* (2013.01); *C25C 7/00* (2013.01); *H01M 4/8605* (2013.01); *H01M 4/8807* (2013.01); *H01M 8/04104* (2013.01); *H01M 8/08* (2013.01); *H01M 8/083* (2013.01); *H01M 2300/0011* (2013.01); *Y02E 60/366* (2013.01)

(58) Field of Classification Search
CPC .. C25B 1/265; C25B 1/26; C25B 1/14; C25B 1/13; C25B 3/00; C25B 1/30; C25B 1/245; C25B 11/035; C25B 15/02; C25B 9/08

See application file for complete search history.

(56) References Cited

U.S. PATENT DOCUMENTS

| 3,697,410 | A | 10/1972 | Johnson et al. |
|---|---|---|---|
| 3,854,994 | A | 12/1974 | Binder et al. |
| 3,923,629 | A | 12/1975 | Shaffer |
| 4,299,682 | A * | 11/1981 | Oda ............ C25B 1/46 204/265 |
| 4,568,442 | A | 2/1986 | Goldsmith |
| 4,581,116 | A | 4/1986 | Plowman et al. |
| 4,586,999 | A | 5/1986 | Goldsmith et al. |
| 4,722,773 | A * | 2/1988 | Plowman ............ C25B 1/46 204/252 |
| 4,865,925 | A | 9/1989 | Ludwig et al. |
| 5,242,765 | A | 9/1993 | Naimer et al. |
| 5,336,570 | A | 8/1994 | Dodge |
| 5,376,253 | A | 12/1994 | Rychen et al. |
| 5,396,253 | A | 3/1995 | Chia |
| 5,423,967 | A | 6/1995 | Kunimatsu et al. |
| 5,538,608 | A | 7/1996 | Furuya |
| 6,203,676 | B1 | 3/2001 | Phillips et al. |
| 6,368,473 | B1 | 4/2002 | Furuya et al. |
| 6,733,639 | B2 | 5/2004 | Busse et al. |
| 7,229,944 | B2 | 6/2007 | Shao-Horn et al. |
| 7,326,329 | B2 | 2/2008 | Gomez |
| 7,651,602 | B2 | 1/2010 | Helmke et al. |
| 2002/0110726 | A1 * | 8/2002 | Busse ............ C25B 1/46 204/283 |
| 2002/0150812 | A1 | 10/2002 | Kaz et al. |
| 2003/0035990 | A1 | 2/2003 | Washima |
| 2004/0229107 | A1 | 11/2004 | Smedley |
| 2005/0036941 | A1 | 2/2005 | Bae et al. |
| 2005/0106450 | A1 | 5/2005 | Castro et al. |
| 2005/0208366 | A1 * | 9/2005 | Rohwer ............ H01M 4/8636 429/413 |
| 2007/0131556 | A1 | 6/2007 | Lambie |
| 2007/0246351 | A1 | 10/2007 | Smola et al. |
| 2008/0070076 | A1 | 3/2008 | Makita et al. |
| 2008/0155813 | A1 | 7/2008 | Dopp et al. |
| 2009/0078568 | A1 | 3/2009 | Ramaswami et al. |
| 2009/0101521 | A1 | 4/2009 | Bayer et al. |
| 2009/0162714 | A1 | 6/2009 | Nakanishi et al. |
| 2009/0165933 | A1 | 7/2009 | Losch et al. |
| 2009/0272648 | A1 | 11/2009 | Pratt |
| 2009/0305084 | A1 | 12/2009 | Crookes et al. |
| 2010/0314261 | A1 | 12/2010 | Perry |
| 2011/0229790 | A1 | 9/2011 | Sato et al. |
| 2011/0244358 | A1 * | 10/2011 | Yamauchi ............ H01M 8/0234 429/480 |
| 2011/0253526 | A1 | 10/2011 | McAlister |
| 2012/0021303 | A1 | 1/2012 | Amendola et al. |
| 2012/0149789 | A1 | 6/2012 | Greenbaum |
| 2012/0308807 | A1 | 12/2012 | Edwards |
| 2013/0017414 | A1 | 1/2013 | He |
| 2013/0092532 | A1 | 4/2013 | Monzyk et al. |
| 2013/0183591 | A1 | 7/2013 | Dickson |
| 2013/0189592 | A1 | 7/2013 | Roumi et al. |
| 2013/0209919 | A1 | 8/2013 | Amendola et al. |

FOREIGN PATENT DOCUMENTS

| DE | 29823321 | 8/1999 |
|---|---|---|
| EP | 1449292 | 8/2004 |
| EP | 1658652 | 1/2011 |
| GB | 1 267 619 | 3/1972 |
| GB | 1542690 | 3/1979 |
| JP | 2004-250736 | 9/2004 |
| WO | WO 2002/014224 | 2/2002 |
| WO | WO 2003/035939 | 5/2003 |
| WO | WO 2003/042430 | 5/2003 |
| WO | WO 2003/047011 | 6/2003 |
| WO | WO 2009/015127 | 1/2009 |
| WO | WO 2011/089904 | 7/2011 |
| WO | WO 2011/094295 | 8/2011 |
| WO | WO 2011/146558 | 11/2011 |
| WO | WO 2012/012558 | 1/2012 |
| WO | WO 2012/021550 | 2/2012 |
| WO | WO 2012/075546 | 6/2012 |
| WO | WO 2012/122600 | 9/2012 |
| WO | WO 2013/037902 | 3/2013 |
| WO | WO 2013/185170 | 12/2013 |
| WO | WO 2014/088628 | 6/2014 |

OTHER PUBLICATIONS

Bingkun Guo, et al "Chemical power sources battery principle and manufacturing technology", Central South University Press, 1st ed, Dec. 31, 2009.

* cited by examiner

COMPOSITE THREE-DIMENSIONAL ELECTRODES AND METHODS OF FABRICATION

TECHNICAL FIELD

The present invention relates to three-dimensional (3D) electrodes and methods of fabrication of three-dimensional electrodes, for example an improved method for making practically useful 3D electrodes. In a particular example, the present invention relates to 3D Gas Diffusion Electrodes (GDEs) and methods of fabrication of 3D GDEs. In various forms the present invention provides for and makes practically viable a range of electro-energy and electro-synthetic devices and applications.

BACKGROUND

Numerous electrochemical processes rely upon or are drastically improved by the use of electrodes having porous, 3D structures rather than flat, 2D structures.

This is particularly true for the many electrochemical processes that require the simultaneous presence of different phases of matter—liquid, gas, and solid phases—at an interface. For example, hydrogen-oxygen fuel cells typically utilize the transformation of gaseous oxygen and hydrogen into liquid water at solid-phase, electrically-connected catalysts, like platinum metal. To facilitate this reaction, electrodes capable of providing a three-phase, solid-liquid-gas boundary are required. Such electrodes must contain an electrically-connected solid phase to which both the gases and liquids have access.

3D electrodes are also used in industrial electrochemical processes where slow reaction kinetics or low, mass-transfer-limited current densities (typically less than 100 mA/cm$^2$) necessitate the application of large electrochemically active surface areas.

Several different classes of 3D electrodes have been developed. Common forms include:
  (1) Fixed bed electrodes, such as
    i. Reticulated electrodes;
    ii. Felt or textile electrodes;
    iii. Particulate electrodes.
  (2) Layered, porous electrodes.

Reticulated electrodes typically resemble an electrically conductive net or a network. Examples include conductive foams through which liquids and/or gases may move such as Reticulated Vitreous Carbon (RVC).

Felt electrodes typically comprise of a textile-like conductive network, often comprising of conductive carbon textile, such as a carbon cloth electrode.

Particulate fixed bed electrodes typically comprise of a porous mass of conductive particles, such as carbon black particles, fused by compression or sintering, with hydrophobic particles like PTFE particles (PTFE=polytetrafluoroethylene, or Teflon™). The key variable in this fabrication process is the relative quantity of PTFE that must be included. PTFE particles are needed to hold the structure together and create the required porosity. However, the quantity of PTFE must be such as to impart an intermediate and not an overwhelming hydrophobicity on the structure. That is, the hydrophobicity of the electrode should allow partial, but not complete water ingress, in order to thereby allow for the creation of a three-phase solid-liquid-gas boundary within the electrode. Consequently, optimisation of the properties of conventional particulate fixed bed electrodes typically involves optimisation of the relative quantity of PTFE particles included in the solid-state mixture used to create the electrode. That is, conventional particulate fixed bed electrodes are typically optimised by manipulating their hydrophobicity to thereby promote the formation of a three-way solid-liquid-gas boundary within the electrode.

An example of a particulate fixed bed reactor of this type is the "Trickle-Bed Reactor" (TBR) in which a liquid and a gas are simultaneously moved over a packed bed of catalyst particles. To act as an electrode, the materials on the surface of the particles in a Trickle-Bed Reactor need to be electrically connected to each other, and collectively comprise either the anode or the cathode in the reactor. The hydrophobicity of the trickle-bed reactor is typically intermediate, allowing the partial ingress of both water and gas, to thereby create a three-phase solid-liquid-gas boundary within the bed. A three-phase solid-liquid-gas boundary refers to a reaction boundary involving gaseous material, liquid electrolyte, and solid matter such as from an electrode or a catalyst. The hydrophobicity is made optimum by adjusting the relative quantity of PTFE particles in the bed.

Layered, porous, particulate fixed beds of this type are also commonly used in the Gas Diffusion Electrodes (GDEs) employed in proton exchange membrane fuel cells. GDEs of this type typically comprise of porous layers of conductive carbon particles of different size fused with PTFE particles of various sizes. The outermost layers typically contain fused carbon black and PTFE particles of the smallest dimensions. The inner-most layers typically contain the largest particles. There may be multiple intermediate layers of intermediate particle size.

The intention of this gradation in particle size within GDEs, from largest in the center to smallest on the outer sides, is to create and control a three-phase solid-liquid-gas boundary within the electrode. This boundary should have the largest possible surface area. The creation of such a boundary is achieved, effectively, by controlling the average pore sizes between the particles, ensuring that the smallest pore sizes are at the edges and the largest are in the center. Since the pores are typically relatively hydrophobic (due to the PTFE binder), the small pore sizes at the edges (e g. 30 microns pore size) act to hinder and limit the ingress of liquid water into the GDE. That is, water can penetrate only a relatively short distance into the GDE, where the electrochemically active surface area per unit volume, is largest. By contrast, the larger pores in the centre of the GDE (e.g. 150 microns pore size), allow for ready gas transmission at low pressure along the length of the GDE, with the gas then forming a three-way solid-liquid-gas boundary with the liquid water at the edges of the GDE, where the electrochemically active surface area per unit volume is the largest.

Layered porous electrode structures are presently the industry standard for:
  (1) conventional free-standing GDEs (for example, of the type used in hydrogen-oxygen PEM fuel cells); and
  (2) hybrid GDEs, where a GDE layer has been incorporated within an electrode, typically between a current collector and the gas zone.

GDEs of this type often display significant technical problems during operation. These largely derive from the difficulty of creating a seamlessly homogeneous particulate bed, with uniform pore sizes and distributions, and uniform hydrophobicity (imparted by the hydrophobic PTFE binder within the GDE). Because of the resulting relative lack of uniformity in the GDE structure, the three-phase solid-liquid-gas boundary created within the GDE may be:

Unstable and fluctuating. The location of the boundary within the GDE may be subject to changing conditions during reaction which cause the boundary to constantly re-distribute itself to new locations within the GDE during operation.

Inhomogeneous. The boundary may be located at widely and unpredictably divergent depths within the GDE as one traverses the length of the GDE.

Inconsistent and ill-defined. At certain points within the GDE, there may be multiple and not a single solid-liquid-gas boundary.

Prone to failure. The boundary may fail at certain points within the GDE during operation, causing a halt to the desired chemical reaction. For example, a common failure mode is that the GDE becomes completely filled with the liquid phase, thereby destroying the three-phase boundary; this is known in the industry as "flooding" Flooding is a particular problem in fuel cells, such as hydrogen-oxygen fuel cells, that require the feedstock gases to be humidified. Flooding may be caused by water ingress into the gas diffusion electrode via systematic, incremental percolation through the non-homogeneous pores of the electrode, or it may be caused by spontaneous condensation of the water vapour in the feedstock gas stream. In all cases, flooding induces a decline in the voltage output and power generation of such fuel cells.

Problems of this type are not conducive to optimum operations and may result in uneven, low-yielding, incomplete or incorrect reactions, amongst others.

The phenomenon of flooding described above, is often caused by water ingress into the gas diffusion electrode when the water is subject to any sort of external pressure. For example, in an industrial electrolytic cell of 1 meter height, the water at the bottom of the cell is pressurised at 0.1 bar due to the hydraulic head of water. If a GDE were used at this depth, the GDE would typically be immediately flooded by water ingress because modern-day GDEs have very low "wetting pressures" (also known as the "water entry pressure"), that are typically less than 0.1 bar (although GDEs with wetting pressures of 0.2 bar have recently been reported in WO2013037902). GDEs are, additionally, relatively expensive.

Conventional 3D Particulate Fixed-Bed Electrodes and GDEs

At the present time, 3D particulate fixed bed electrodes and gas diffusion electrodes (GDEs) are conventionally fabricated by mixing carbon black and PTFE powders and then compressing the solid mixture into a bulk, porous electrode.

The pore size of the resulting structure may be very roughly controlled by managing the particle size of the particulates used. However, it is difficult to achieve a uniform pore size throughout the electrode using this approach because particles, especially "sticky" particles like PTFE, often do not flow evenly and distribute themselves uniformly when compressed. A wide range of pore sizes are therefore typically obtained. It is, moreover, generally not possible to create structures with uniformly small pore sizes, such as 0.05 µm-0.5 µm in size.

The hydrophobicity of the structure is typically controlled by managing the relative quantity of PTFE incorporated into the structure. The PTFE holds the structure together and creates the required porosity. However, its quantity must be carefully controlled so as to impart the electrode with an appropriately intermediate hydrophobicity. An intermediate hydrophobicity is needed to ensure partial, but not complete water ingress. In the case of GDEs, this is needed to thereby create a solid-liquid-gas boundary within the carbon black matrix that makes up the electrode.

This method of constructing 3D particulate fixed bed electrodes and gas diffusion electrodes creates some significant practical problems when operating such electrodes in industrial electrochemical cells, particularly in electrosynthetic and electroenergy applications. These problems include the formation of three-way solid-liquid-gas boundaries that are: ill-defined, inconsistent, unstable, fluctuating, inhomogeneous, and prone to failures like flooding.

Problems of this type largely arise from the intrinsic lack of control in the fabrication process, which attempts to create all of the inherent properties of the electrode—including porosity, hydrophobicity, and conductivity—in a single step. Moreover, the fabrication method seeks to simultaneously optimise all of these properties within a single structure. This is often not practically possible since the properties are inter-related, meaning that optimising one may degrade another.

Despite these drawbacks, the approach of combining particulate carbon black and PTFE into a compressed or sintered fixed bed remains the standard method of fabricating GDEs for industrial electrochemistry. This approach is used to fabricate, for example, free-standing GDEs of the type used in hydrogen-oxygen PEM fuel cells. Even where only a GDE component is required within an electrode, the standard method of fabricating that GDE component is to form it as a compressed, porous layer of particulate carbon black and PTFE.

For the above and other reasons, the conventional method of making GDEs and the properties of conventional GDEs are open to improvement.

FIG. 1 (prior art) depicts in a schematic form, a conventional 3D particulate fixed bed electrode or a gas diffusion electrode (GDE) 110, as widely used in industry at present.

In a conventional 3D particulate fixed bed electrode or GDE 110, a conductive element (e.g. carbon particles) is typically combined (using compression/sintering) with a non-conductive, hydrophobic element (e.g. polytetrafluoroethylene (PTFE) Teflon™ particles) and catalyst into a single, fixed-bed structure 110. The fixed-bed structure 110 has intermediate hydrophobicity, good but not the best available conductivity, and a pore structure that is non-uniform and poorly defined over a single region 113. When the 3D particulate fixed bed electrode or GDE 110 is then contacted on one side by a liquid electrolyte and on the other side by a gaseous substance, these physical features bring about the formation of an irregularly-distributed three-phase solid-liquid-gas boundary within the body of the electrode 110, below its outer surface 112 and within single region 113, as illustrated in the magnified view presented in FIG. 1. At the three-phase boundary, electrically connected catalyst (solid phase) is in simultaneous contact with the reactants (in either the liquid or the gas phase) and the products (in the other one of the liquid or gas phase). The solid-liquid-gas boundary within the GDE 110 therefore provides a boundary at which electrochemical liquid-to-gas or gas-to-liquid reactions may be facilitated by, for example, the application of a particular electrical voltage. The macroscopic width of the three-phase solid-liquid-gas boundary is comparable or similar in dimension to the width of the conventional GDE. The thickness of the three-phase solid-liquid-gas boundary in a conventional GDE is typically in the range of from 0.4 mm to 0.8 mm in fuel cell GDEs up to, higher thicknesses, such as several millimeters, in industrial electrochemical GDEs.

Because of the practical and commercial importance of 3D electrodes, new 3D electrodes and practical methods of fabricating 3D electrodes are always of interest. This is especially true for GDEs, upon whose effective operation many industrial electrochemical reactions rely.

Efforts have therefore been made to develop new 3D electrodes and fabrication processes therefor. By way of example only, U.S. Pat. No. 7,229,944 B2 teaches the use of a new technique known as "electrospinning", to generate a novel, conductive "nano-fibrous" 3D electrode comprising conductive carbon fibres decorated with catalyst materials.

There exists a need for new types of practically useful three-dimensional (3D) electrodes, preferably for industrial scale electro-energy or electro-synthetic applications, cells or devices including one or more of the 3D electrodes, and/or methods of fabrication of 3D electrodes. Of particular interest are 3D electrodes that can act as Gas Diffusion Electrodes (GDEs).

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY

This Summary is provided to introduce a selection of concepts in a simplified form that are further described below in the Examples. This Summary is not intended to identify all of the key features or essential features of the claimed subject matter, nor is it intended to be used to limit the scope of the claimed subject matter.

In one example form, example 3D electrodes or GDEs of the current embodiments are distinguished from conventional particulate fixed-bed GDEs in that they separate the key features of a 3D electrode or GDE into two, or at least two, distinct regions, each of whose properties improve upon and may be more fully controlled than is possible within the single body of a conventional GDE. An example embodiment of such a 3D electrode or GDE may comprise a liquid-and-gas-porous conductive material, which can optionally also include a catalyst which is enhanced or optimized for its catalytic capabilities and conductivity. The conductive material is attached to, coupled to, touching, positioned adjacent to, or abuts, a gas permeable material that is non-conductive and liquid electrolyte impermeable during normal operational use of the electrode, e.g. which may be hydrophobic, for which the pore structure is selected, enhanced or optimised for gas transport properties. Normal operational use is, for example, when the electrode is functioning as intended and not flooded. In an example, a surface of the gas permeable material is facing the porous conductive material. The surface of the gas permeable material may, but need not necessarily, touch or contact the porous conductive material, for example there may be an intermediary binder material or layer that can include one or more catalysts. At or near the surface of the gas permeable material is an interface or boundary region of the gas permeable material and the porous conductive material. When the electrode is in use, a three-phase solid-liquid-gas boundary is able to form at or near the surface of the gas permeable material facing the porous conductive material. In this context, "at or near" the surface is intended to mean within a distance being the thickness of a binder material (if present, and as discussed herein), or within a distance being the macroscopic width of the three-phase solid-liquid-gas boundary itself, or within a distance of any overlap of the gas permeable material and the porous conductive material, or within a distance being the width of the porous conductive material. The three-phase solid-liquid-gas boundary need not form precisely 'at' the surface, but can form 'near' the surface in the sense of being close, neighboring, adjoining, immediately next to or within, or proximate. The three-phase solid-liquid-gas boundary can further move in response to the application of an excess gas or liquid pressure, however the boundary will remain 'near' to the surface as described during normal operational use.

Preferably, the two regions (being a first region including the porous conductive material and a second region including the non-conductive gas permeable material) are substantially distinct, demarcated or separated, although they are positioned adjacent, abut, touch or adjoin each other, so that there is an interface or a boundary region, or possibly an overlap.

In such an example embodiment, the non-conductive, liquid electrolyte impermeable or hydrophobic, gas permeable material has pores that are better defined, more uniform, and of smaller average size, than can be achieved in a conventional GDE. The liquid-and-gas-porous conductor, preferably provided with a catalyst, may be more conductive than a conventional GDE, while its low hydrophobicity may see the porous conductor completely or substantially completely filled with liquid electrolyte under normal operating conditions, thereby enhancing or maximally facilitating catalysis. In contrast, in a preferred form, the high hydrophobicity of the non-conductive, hydrophobic, gas permeable material will typically see the gas permeable material completely empty or substantially empty of liquid electrolyte at atmospheric pressure, thereby enhancing or maximally facilitating gas transport into and out of the GDE When such an example embodiment 3D electrode or GDE is contacted on the conductive side by a liquid electrolyte and on the non-conductive side by a gaseous material, then the above physical features cause the formation of a three-phase solid-liquid-gas boundary at or near a surface of the gas permeable material facing the porous conductive material, which also can be at the interface between the two distinct regions. This boundary is quite different to the three-phase solid-liquid-gas boundary in a conventional GDE. It differs in that it is better defined, narrower, more stable and/or more robust than can be achieved in a conventional GDE. Thus, in operation of a preferred embodiment, a three-phase solid-liquid-gas boundary forms at or near a surface of the gas permeable material facing the porous conductive material (which may also be at the interface, or a boundary region, of the porous conductive material, which can include a catalyst, and the non-conductive gas permeable material). This provides a three-phase solid-liquid-gas boundary with a relatively narrow macroscopic width, for example in comparison to the width or thickness of the electrode.

These features are important because the inventors have found that example embodiment 3D electrodes or GDEs can provide, at or near the interface of the two regions, an enhanced or optimum pore structure, for example hydrophobic pore structure, that facilitates improved or maximum gas transport, with an enhanced or optimally conductive, improved or maximally catalytic structure. In effect, at the three-phase solid-liquid-gas boundary in example embodiment 3D electrodes or GDEs, each of the critical properties of a gas diffusion electrode may be made ideal, or, at least, nearer to ideal than is otherwise possible.

The inventors have further found that the effect of this enhancement or optimisation yields surprising and remarkable electrochemical performance. Despite the three-phase solid-liquid-gas boundary being narrower and confined to what appears to be a two dimensional (2D), or substantially 2D, macroscopic geometry, the electrochemical capabilities of the three-phase solid-liquid-gas boundary in example embodiment 3D electrodes or GDEs substantially improves upon and, in fact, far exceed those of conventional GDEs. Such three-phase solid-liquid-gas boundaries can, for example, impart example embodiment 3D electrodes or GDEs with a range of unexpected and novel electrochemical capabilities, including:

1. much higher wetting pressures and bubble points than can be achieved in conventional GDEs. "Wetting pressure" is defined as the lowest excess of pressure on the liquid electrolyte side of a GDE relative to the gas side of the GDE, at which the liquid electrolyte penetrates and floods the GDE. The "bubble point" is defined as the lowest excess of pressure on the gas side of a GDE relative to the liquid electrolyte side of the GDE, at which the gas blows through the GDE and forms bubbles at the electrode surface on the liquid electrolyte side. Example embodiment GDEs typically have wetting pressures and bubble points in excess of 0.2 bar, whereas conventional GDEs typically have wetting pressures and bubbles points of 0.2 bar or less;
2. lower electrical resistances, higher electrocatalytic activities and reactivities, as well as more efficient utilization of catalytic materials, if used, than can be realised in conventional GDEs, especially, but not exclusively, when operated at relatively low current densities; and
3. an apparent capacity to facilitate hitherto unachievable gas-to-liquid or liquid-to-gas electrochemical reactions, or, at least, improve upon electrochemical reactions that have not proved practically viable to date, especially, but not exclusively, when operated at relatively low current densities.

Thus, in particular examples, such 3D electrodes or GDEs display a uniquely and an exceedingly well-defined, narrow, stable, and/or robust three-way solid-liquid-gas interface. One effect created by such an interface is an unusually high electrochemical and catalytic activity that derives from the high quality of the liquid-solid-gas interface. For example, the inventors have observed that example GDEs of the present embodiments are able to spontaneously, aggressively and selectively sequester oxygen from the atmosphere, even though oxygen makes up only 20% of the atmosphere. Thus, example GDEs of this type may be used to facilitate the Dow Huron process in a more electrically and economically efficient manner than has hitherto been possible. Similarly, example GDEs have proved able to facilitate the hitherto unknown reactions that occur in a room temperature direct methane fuel cell.

These enhancements provide unexpected improvements over conventional GDEs. They appear to arise because the fabrication of conventional particulate fixed-bed GDEs as currently employed in the art, is predicated on creating all of the important physical properties at the same time within a single material. Such an approach effectively ignores the fact that the key properties of GDEs (namely: pore structure, hydrophobicity, gas transport, liquid transport, conductivity and catalytic activity) are typically inter-dependent and are therefore not open to ready, concurrent enhancement or optimisation within a single material. Example embodiment GDEs as described herein take account of this limitation and separately optimise one or more of the key properties, to thereby achieve more ideal overall properties at the interface of the two distinct regions.

The inventors have further found that example embodiment GDEs may be fabricated in an exceedingly low cost manner, allowing for the practical use of: (i) relatively low current densities, which minimise electrical losses and maximise electrical efficiency, and/or (ii) low-cost catalysts comprising of Earth-abundant elements which only operate efficiently at lower current densities. By these means, it becomes possible to manufacture, practically and economically viably, large-scale electrochemical cells for use in industrial-scale electro-synthetic and electro-energy applications. Such cells may achieve energy efficiencies that have hitherto been unavailable in large-scale production and energy environments. For example, chlorine may be manufactured at scale using the chlor-alkali process with 91% energy efficiency, whereas the best available industrial chlor-alkali plants achieve 66% energy efficiency.

As used herein, a three-dimensional (3D) electrode is a solid, gas permeable or liquid flow-through electrode whose effective surface area is greater than the geometric 2D surface area of the electrode. 3D electrodes are non-planar electrodes that typically improve the transport of one or more reactant species to the 3D electrode's surface (by utilising the increased effective surface area) Reference to 3D electrodes should be read as also including flow-through electrodes or porous electrodes.

Reference to a gas permeable material should be read as a general reference including any form or type of gas permeable medium, article, layer, membrane, barrier, matrix, element or structure, or combination thereof.

Reference to a gas permeable material should also be read as including any medium, article, layer, membrane, barrier, matrix, element or structure that is penetrable to allow movement, transfer, penetration or transport of one or more gases through or across at least part of the material, medium, article, layer, membrane, barrier, matrix, element or structure (i.e. the gas permeable material). That is, a substance of which the gas permeable material is made may or may not be gas permeable itself, but the material, medium, article, layer, membrane, barrier, matrix, element or structure formed or made of, or at least partially formed or made of, the substance is gas permeable. The gas permeable material may be porous, may be a composite of at least one non-porous material and one porous material, or may be completely non-porous. The gas permeable material can also be referred to as a "breathable" material. By way of clarifying example only, without imposing any limitation, an example of a gas permeable material is a porous matrix, and an example of a substance from which the gas permeable material is made or formed is PTFE.

Reference to a porous conductive material should be read as including any medium, article, layer, membrane, barrier, matrix, element or structure that is penetrable to allow movement, transfer, penetration or transport of one or more gases and/or liquids through or across at least part of the material, medium, article, layer, membrane, barrier, matrix, element or structure (i.e. the porous conductive material). That is, a substance of which the porous conductive material is made may or may not be gas and/or liquid permeable itself, but the material, medium, article, layer, membrane, barrier, matrix, element or structure formed or made of, or at least partially formed or made of, the substance is gas and/or liquid permeable. The porous conductive material may be a composite material, for example composed of more than one type of conductive material, metallic material, or of a conductive or metallic material(s) and non-metallic material(s). By way of clarifying examples only, without imposing any limitation, examples of porous conductive materials include porous or permeable metals, conductors, meshes, grids, lattices, cloths, woven or non-woven structures, webs or perforated sheets. The porous conductive material may also be a material that has "metal-like" properties of conduction. For example, a porous carbon cloth may be considered a porous conductive material since its conductive properties are similar to those of a metal.

In one example aspect, embodiments provide a distinct 3D electrode and method or process for fabrication thereof. The 3D electrode has been found to render practical or improve the practicality, of a range of electro-energy and electro-synthetic processes in industrial electrochemistry and electrochemical devices.

Example embodiments further provide a new class or type of spiral-wound reaction module, cell, system or device for carrying out such electro-energy and electro-synthetic reactions processes. Various embodiments, further, allow for improved or complete control and/or regulation of the liquid and/or gas involved in such electro-energy and electro-synthetic reaction processes. Aspects of the use of the new class or type of 3D electrode for various applications are described in the Applicant's concurrently filed PCT patent applications "Electro-Synthetic or Electro-Energy Cell With Gas Diffusion Electrode(s)" filed on 30 Jul. 2014, "Modular Electrochemical Cells" filed on 30 Jul. 2014, and "Method and Electrochemical Cell for Managing Electrochemical Reactions" filed on 30 Jul. 2014, which are all incorporated herein by reference.

In a further example aspect there is provided a gas permeable 3D electrode comprising: a gas permeable material; and a porous conductive material attached to or positioned adjacent to the gas permeable material. In a preferred aspect, the gas permeable material is non-conductive and liquid electrolyte impermeable, e.g. hydrophobic, during normal operational use of the electrode. Preferably, a three-phase solid-liquid-gas boundary is able to form at or near a surface of the gas permeable material facing the porous conductive material. In another aspect, there is provided a gas permeable 3D electrode comprising: a gas permeable material, preferably that is non-conductive and liquid electrolyte impermeable; a porous conductive material attached to or positioned adjacent to the gas permeable material; and a catalyst in electrical communication with the porous conductive material, where the catalyst may be located on the porous conductive material or on the gas permeable material, or the catalyst may be located on both the porous conductive material and the gas permeable material. In other example aspects, the porous conductive material can be attached to, fixed to, positioned adjacent, or positioned near with some degree of separation, the gas permeable material. In another example aspect, the porous conductive material is preferably attached to the gas permeable material by using a binder material, which may also be provided with one or more catalysts. The gas permeable 3D electrode can also be termed a gas permeable composite 3D electrode.

In a preferred example, the gas permeable material is non-conducting and impermeable to a liquid electrolyte, and the porous conductive material is permeable to the liquid electrolyte. Preferably the gas permeable material is a different material to the porous conductive material, which are provided as sheets or layers and laminated together.

Preferably, the porous conductive material is either attached to, coupled to, touching with, positioned adjacent, or abutted to the non-conductive gas permeable material, which may be hydrophobic, along a surface of the gas permeable material that is facing the porous conductive material. Preferably, this arrangement then forms or provides an interface of (or boundary region at or between) the porous conductive material and the non-conductive gas permeable material. Also preferably, this forms or provides two regions (a first region including the porous conductive material and a second region including the non-conductive gas permeable material) that are distinct, demarcated or separated. Preferably, the first region and the second region are positioned adjacent, abut, touch or adjoin each other, so that there is an interface or a boundary region between the first region and the second region. Thus, in operation of a preferred embodiment, a three-phase solid-liquid-gas boundary forms at or near the surface of the gas permeable material facing the porous conductive material. Preferably, this is also at or near the interface (i.e. at or within the boundary region) of the first region (i.e. the porous conductive material, which can include a catalyst) and the second region (i.e. the non-conductive gas permeable material, which may also include the same and/or a different catalyst).

By way of explanatory example, the inventors have discovered that combining/laminating materials such as polymers having relatively uniform and well-defined gas permeable structures, with porous conductive materials (also referred to herein as a porous or permeable metallic element, material or layer) such as, for example, metal meshes, grids, lattices, cloths or webs, or perforated metal sheets, can yield composite 3D electrodes having unexpected and novel properties, such as unusually high electrochemical and electro-catalytic activity, robustness, and/or high effective electrochemical area per unit volume.

The inventors have further discovered that disproportionately amplified electrochemical properties are best observed when the interface or boundary region is created by a carefully calibrated fabrication process. Improved electrochemical properties are also observed when the electrode is operated at relatively low current densities, such as from 1 mA/cm$^2$ to 500 mA/cm$^2$ or, preferably, from 1 mA/cm$^2$ to 200 mA/cm$^2$, or preferably from 1 mA/cm$^2$ to 100 mA/cm$^2$, inclusively Amplified properties are observed since a well-defined, narrow, stable, and/or robust three-way solid-liquid-gas boundary is formed and maintained under operating conditions.

Thus, for example, the inventors have discovered that the porous conductive material can be or be formed as a mesh, grid, lattice, cloth, web or perforated sheet. The gas permeable material, for example providing a non-conductive polymer layer or layers, in the composite 3D electrodes may be porous, non-porous, or be comprised of a combination of a porous and non-porous material including a sandwich of a non-porous layer on top of a porous layer, provided only that the material, for example a polymer layer, is gas permeable (i.e. the polymer layer is formed of or includes one or more gas permeable materials as described previously) and is liquid electrolyte impermeable. A binder material(s), which may be provided with catalytic, conductive, and/or other materials, may be added to, positioned on, laid upon and/or laid upon and into or through the porous conductive material and/or the gas permeable material. The binder material(s) may also be present between the conductive metallic layer (i.e. the porous conductive material) and the polymer layer (i.e. the gas permeable material), that is in a boundary region, to thereby enhance the structural integrity, the electrical and structural integration, and/or the robustness of the electrodes. In a preferred form, the binder material is characterised by the fact that its primary purpose is to bind and it therefore does not provide a matrix of particulate carbon black within which a three-way solid-liquid-gas boundary is formed, as may be found in conventional 3D particulate fixed bed electrodes.

Moreover, when composite 3D electrodes of the present embodiments are configured for gas-to-liquid and/or liquid-to-gas processes, they may act as Gas Diffusion Electrodes (GDEs) that display beneficial solid-liquid-gas boundaries when in use, for example uniquely well-defined, narrow, stable, and/or robust three-way solid-liquid-gas boundaries. Such boundaries may result in unexpected and amplified electrochemical performance, especially relative to other 3D electrodes and in respect of their cost of manufacture.

For example, such 3D electrodes may be practically advantageous in a range of industrially significant electrochemical processes, especially when used as GDEs, in various electro-energy or electro-synthetic applications. The electrodes may act as mechanically strong, free-standing electrodes that facilitate the productivity, efficiency, and other important properties of various industrial electro-synthetic processes. Aspects of this and other features are described in the Applicant's concurrently filed PCT patent application "Electro-Synthetic or Electro-Energy Cell With Gas Diffusion Electrode(s)" filed on 30 Jul. 2014, which is incorporated herein by reference.

Preferably, but not exclusively, the gas permeable material (e.g. polymer layer) comprises pores of a specific, narrow range of pore size with a minimal amount or, preferably, a near absence of excessively large pores (which are, effectively, defects that compromise the integrity of the polymer as a barrier film). Such materials can be found in the widely available and low-cost polymer membranes used in the water purification industry. Membranes of this type are manufactured to contain very specific and narrow ranges of pore sizes. They may also be manufactured to display particular hydrophobicity, wetting, and gas or liquid permeation properties.

Additionally, the gas permeable material (e.g. polymer layer) may comprise or be attached to or associated with a dense thin film, i.e. a barrier layer, material or film, selected to have sufficient gas permeability to allow commercially useful rates of gas transfer through the GDE. The barrier layer can be completely non-porous, nano-porous, or comprise a matrix of porous materials and non-porous materials. The dense thin film is selected to have suitable gas permeability to enable a high proportion of the produced gases to permeate the film under normal operational conditions. The barrier layer can also provide additional protection against 'flooding' of liquid electrolyte through the electrode or GDE. Optionally, the barrier layer could be selected to limit the amount of undesired gas or gases, for example water vapour, from permeating through the gas permeable material, the porous conductive material or the electrode. Suitable materials can be chosen that, for example, have high oxygen or hydrogen transport but very low water vapour transport.

To facilitate the deposition of such a barrier layer, material or film, an intermediate layer that is highly uniform and has an extremely flat surface, may be first laid down. The aforementioned barrier layer, material or film may then be deposited upon the intermediate layer. The intermediate layer is preferably but not exclusively, porous with the pores being small and in the range 5-50 nm (but often around 10 nm or so). Common intermediate layer chemistries may be polysulfone and polyethersulfone.

In example embodiments, due to the well-defined wetting pressures of GDEs, it is possible and, indeed, desirable to carry out many electro-synthetic and electro-energy applications at differential liquid and gas pressures. Unlike conventional GDEs comprising particulate fixed beds of carbon black and PTFE, the unique properties of the GDE make it possible to do so and simultaneously maintain the reactions under perfect or at least much improved control. Preferably, but not exclusively, GDEs according to various example embodiments can be operated under conditions of enhanced or optimally differential liquid and gas pressure to thereby maximise electrode performance. Aspects of this and other features are described in the Applicant's concurrently filed PCT patent application "Method and Electrochemical Cell for Managing Electrochemical Reactions" filed on 30 Jul. 2014, which is incorporated herein by reference.

Another outcome of the well-defined wetting pressures of example embodiment GDEs, is that it is possible to operate the GDEs at higher temperatures without risk of flooding than is the case when conventional GDEs are used. Many electrochemical processes are "self-heating" in that they release the excess energy needed to drive the reaction as heat. Many electrochemical processes also display significantly improved energy efficiency at higher temperatures.

Preferably, but not exclusively, the porous conductive material is or includes:
i. metallic meshes, including micro- and nano-porous meshes;
ii. metallic grids, including micro- and nano-porous grids,
iii. metallic cloths, including micro- and nano-porous metallic cloths;
iv. perforated metallic sheets, including micro- and nano-porous perforated sheets;
v. polymeric meshes, grids, cloths, sheets and the like coated with metallic layers;
vi. materials that are not formally metallic in character but which have properties of electrical conduction that are not dissimilar to those of metals; for example, including without limitation, carbon fibres, carbon cloths, and the like; and/or
vii. in general, porous, or spaced apart, metallic elements.

In another example, by locating the porous conductive material, in close proximity to or at the surface of the gas permeable material (e.g. the polymer layer), one generates a composite metallic-polymer structure that combines the advantageous qualities of the porous conductive material (conduction, mechanical strength, resistance to degradation), with the advantageous qualities of the polymer layer (uniform, porous structure, pore size, wetting and other properties). In this way, a well-defined, readily fabricated and inexpensive 3D electrode is realised.

Preferably, but not exclusively, the porous conductive material is attached to the gas permeable material (e.g. the polymer layer) by being physically (e.g. mechanically) or chemically bonded to the gas permeable material. This is preferably, but not exclusively, achieved by the presence of a binder material or materials that act to bind the porous conductive material and the gas permeable material together. The binder material may be present everywhere, substantially everywhere or almost everywhere between or at the interface of the porous conductive material and the gas permeable material. Alternatively, the binder material may be present at a small selection of spots between the porous conductive material and the gas permeable material. The binder material or materials may further be applied in a pattern to thereby securely attach the porous conductive material to the gas permeable material. The binder material may comprise substantially or entirely, of the material which forms the gas permeable material, for example the polymer material which forms the polymer layer. Alternatively, the binder material may be a mixture and comprise one or more unrelated materials which may concurrently impart one or more other desirable properties upon the binder mixture, such as also being a conductor of electricity or a catalyst.

Preferably, but not exclusively, the binder material provides a porous bed, e.g. a porous fixed bed, through which reactants or products may migrate between the porous conductive material and the gas permeable material (e.g. polymer material). It should be noted that, as the binder will typically (but not exclusively) comprise mainly of binder materials and catalyst with very little carbon black and PTFE, such a fixed bed differs from the particulate fixed beds used in conventional GDEs in that it does not, effectively, provide a matrix, e.g. a carbon black matrix, within which a three-way solid-liquid-gas boundary is formed.

Preferably, but not exclusively, the binder material penetrates, fully or at least partially the porous conductive material, and connects the gas permeable material (e.g. polymer material) with the porous conductive material, thereby creating a composite 3D electrode which combines the advantages of the porous conductive material (e.g. porous metallic material) and the gas permeable material (e.g. polymer material).

Preferably, but not exclusively, the binder material covers the whole of, or substantially the whole of, the interface or the boundary region between the porous conductive material and the gas permeable material (e.g. polymer material). In one example, the binder material provides a porous bed that comprises mainly of catalyst and not of carbon black.

Preferably, but not exclusively, the binder material attaches to and/or at least partially penetrates into the gas permeable material (e.g. polymer material). Also preferably, but not exclusively, the binder material attaches to and/or at least partially penetrates into the porous conductive material.

Preferably, but not exclusively, the binder material penetrates at least partially into the gas permeable material (e.g. polymer material) whilst simultaneously the binder material penetrates into and coats around the porous conductive material. Alternatively, the binder material may only partially penetrate into and attach to the porous conductive material.

Preferably, but not exclusively, the porous conductive material and the gas permeable material (e.g. polymer material or polymer layer) are laminated together in a single structure which combines the advantageous properties of the porous conductive material with the advantageous properties of the gas permeable material.

Preferably, but not exclusively, the lamination is achieved by compressing the porous conductive material (e.g. porous metallic layer) and the gas permeable material (e.g. polymer layer) together under suitable pressure and/or heat. Preferably, the pressure and heat applied should not damage or substantially change in a deleterious way, the porous properties of the materials (e.g. the polymer layer or the porous metal layer), or their optimum or near optimum locations with respect to each other.

Preferably, but not exclusively, the binder material acts as an adhesive which creates the lamination and maintains the integrity thereof. In another example form, a porous conductive layer is provided at one surface of the 3D electrode facing a liquid electrolyte, and a porous non-conductive layer is provided at the other surface of the 3D electrode facing one or more gases.

In another example aspect there is provided a method for the fabrication or manufacture of 3D electrodes, for example 3D Gas Diffusion Electrodes (GDEs). In a further aspect there is provided a 3D electrode comprising: a gas permeable material; and a porous conductive material in close proximity to or located at a surface of the gas permeable material.

In another example aspect gas permeable materials, for example hydrophobic, porous polymer membranes, are adapted to create 3D electrodes, preferably that have practical utility in, particularly, electro-energy and electro-synthetic applications. Preferably, the gas permeable materials, such as porous polymer membranes, are relatively inexpensive and readily available.

In another example aspect there is provided a method of fabricating a 3D electrode, comprising the steps of: selecting a gas permeable material, for example with a substantially uniform pore size; attaching a conductive metallic material to at least partially cover the gas permeable material using a binder material; wherein the binder material penetrates the gas permeable material to a depth less than the thickness of the gas permeable material. Substantially uniform pore size is intended to mean where less than about 10% of the gas flow occurs through pores that are about 50 times or more larger than the average pore size.

In an example form, the porous conductive material is gas permeable. In another example form, the porous conductive material is gas permeable and at least partially liquid permeable. In another example form, the hydrophobic gas permeable material is a non-conductive material and is gas permeable and liquid impermeable. In another example form, the porous conductive material (a conductive layer) is part of an outer surface of the 3D electrode and is relatively less hydrophobic than the gas permeable material. In another example form, the bulk 3D electrode is gas breathable and liquid impermeable.

Optionally, but preferably, the 3D electrode is flexible. Optionally, the porous conductive material or layer is made at least partially or wholly from a substance and/or in a form that is flexible. Optionally, the gas permeable material is made at least partially or wholly from a substance and/or in a form that is flexible. Optionally, the gas permeable material is made at least partially or wholly from a polymer or a combination of polymers, for example PTFE, "expanded PTFE" (ePTFE), polyethylene or polypropylene. The polymer itself may or may not be gas permeable. For example, the polymer itself may not be gas permeable but a structure or membrane formed from the polymer is gas permeable.

Optionally, an example embodiment GDE incorporates one or more barrier layers or barrier films that are highly or substantially permeable to a relevant gas stream, but relatively less permeable or impermeable to the transport of the reaction solvent in gaseous form.

In another example aspect, there is provided a method for the fabrication or manufacture of electrochemical devices or cells including or containing 3D electrodes or 3D GDEs, preferably for rendering practical or improving the practicality, of a range of electro-energy and electro-synthetic applications.

In example aspects there are provided electrodes, devices or cells using one or more of the electrodes and/or methods for fabricating the electrodes, where the electrodes are used to produce gas-to-liquid and/or liquid-to-gas transformations. In non-limiting example applications the electrodes can be used: (i) in converting air-based oxygen into purer or pure oxygen; (ii) in manufacturing hydrogen peroxide; (iii) in fuel cells; (iv) in direct methane fuel cells that operate at room temperature. In other examples, the electrodes are used in other types of electrochemical devices or cells.

In a preferred but non-limiting form, the above reactions are carried out using flexible electrodes provided as part of a cell or reactor, for example a spiral-wound or rolled cell or reactor. As a further example, a spiral-wound or rolled cell or reactor can incorporate separate gas channels for the anodes and cathodes, as well as electrolyte channels running down the length of the cell reactor. Aspects of this and other features are described in the Applicant's concurrently filed PCT patent application "Modular Electrochemical Cells" filed on 30 Jul. 2014, which is incorporated herein by reference.

BRIEF DESCRIPTION OF THE DRAWINGS

Illustrative embodiments will now be described solely by way of non-limiting examples and with reference to the accompanying figures. Various example embodiments will be apparent from the following description, given by way of example only, of preferred but non-limiting embodiments, described in connection with the accompanying figures.

| Ni weight: | "Ni coating thickness" (nominal) |
|---|---|
| 0.455 g/m$^2$ (0.0455 mg/cm$^2$) | 50 nm |
| 0.91 g/m$^2$ (0.091 mg/cm$^2$) | 100 nm |
| 1.82 g/m$^2$ (0.182 mg/cm$^2$) | 200 nm |
| 3.64 g/m$^2$ (0.364 mg/cm$^2$) | 400 nm |

Figure 15:
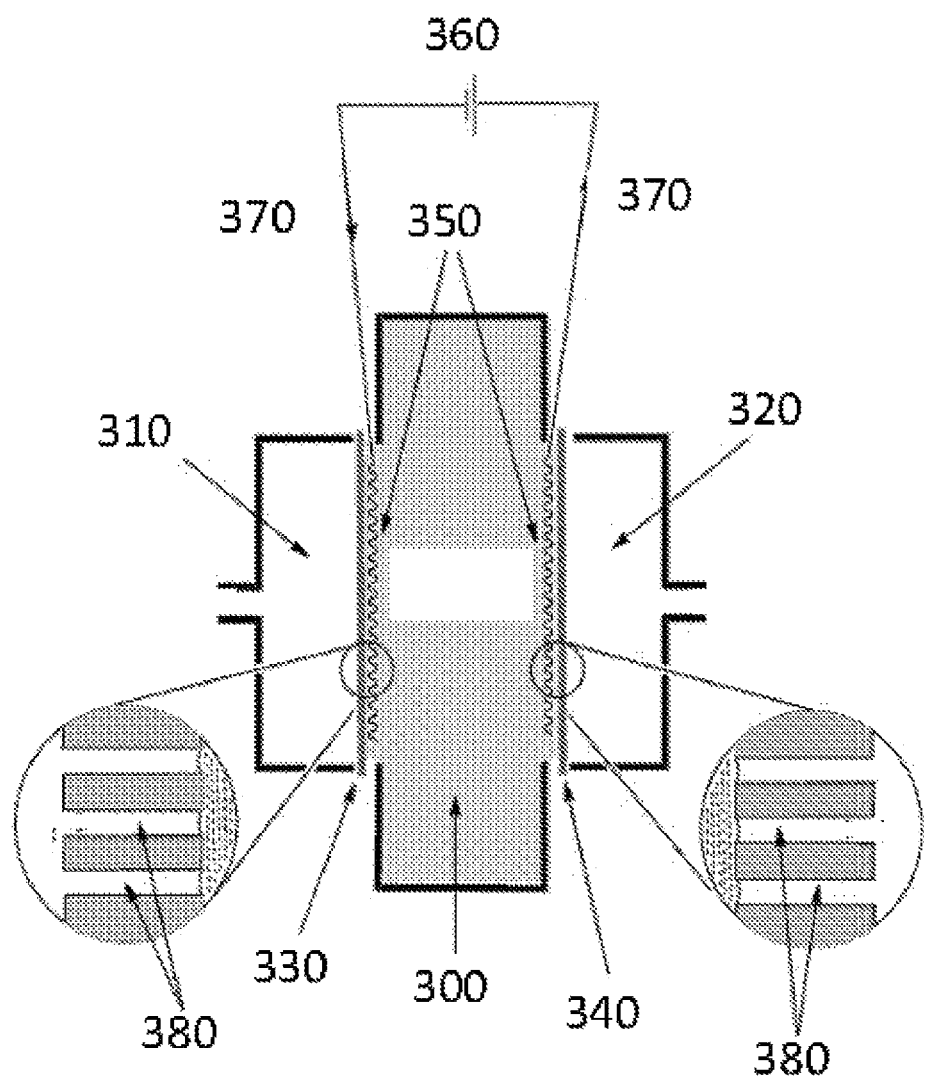

FIG. 15 illustrates a schematic of an example cell (not to scale).

Figure 16:
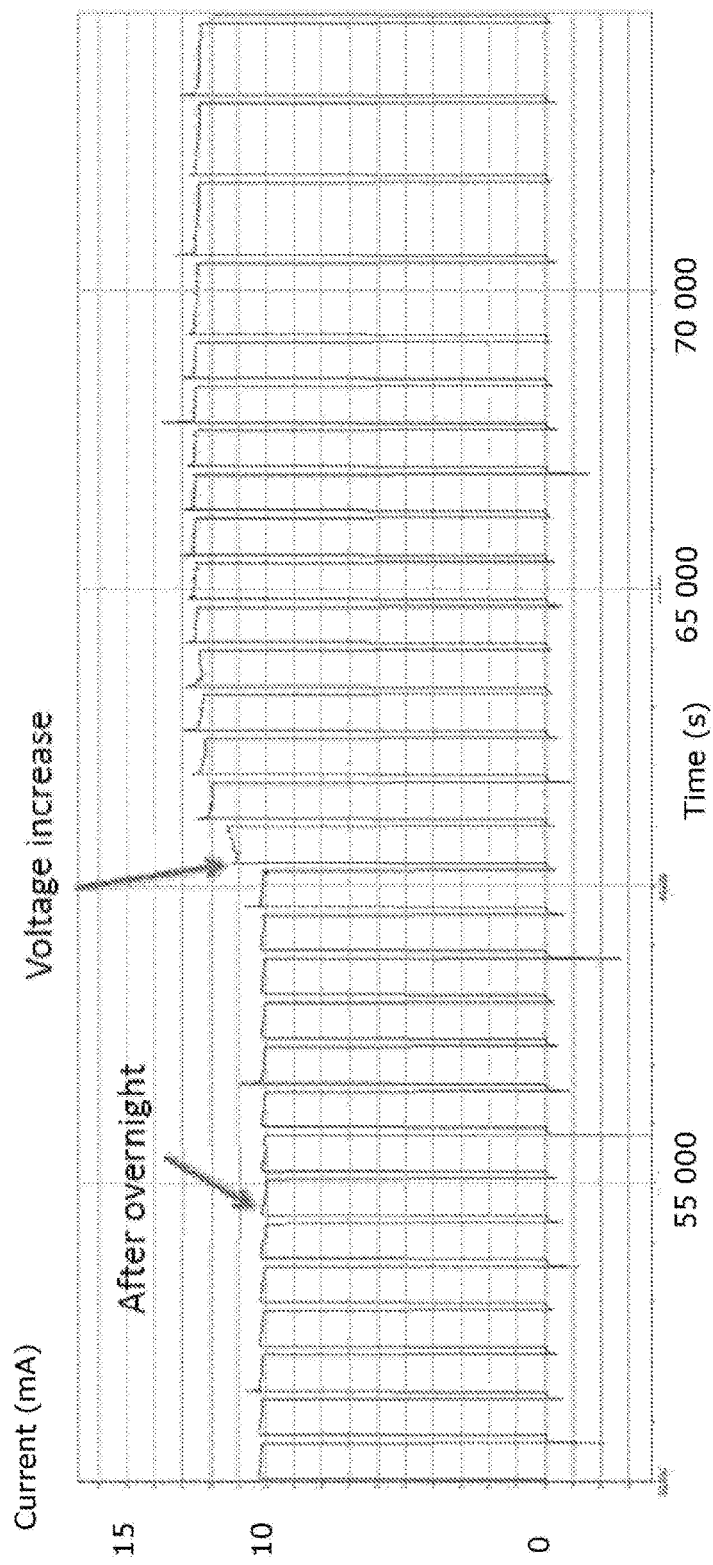

FIG. 16 is a graph of the current obtained in Example 18 versus time, with regular switching on and off of the voltage and an increase of the voltage as shown.

Figure 17:
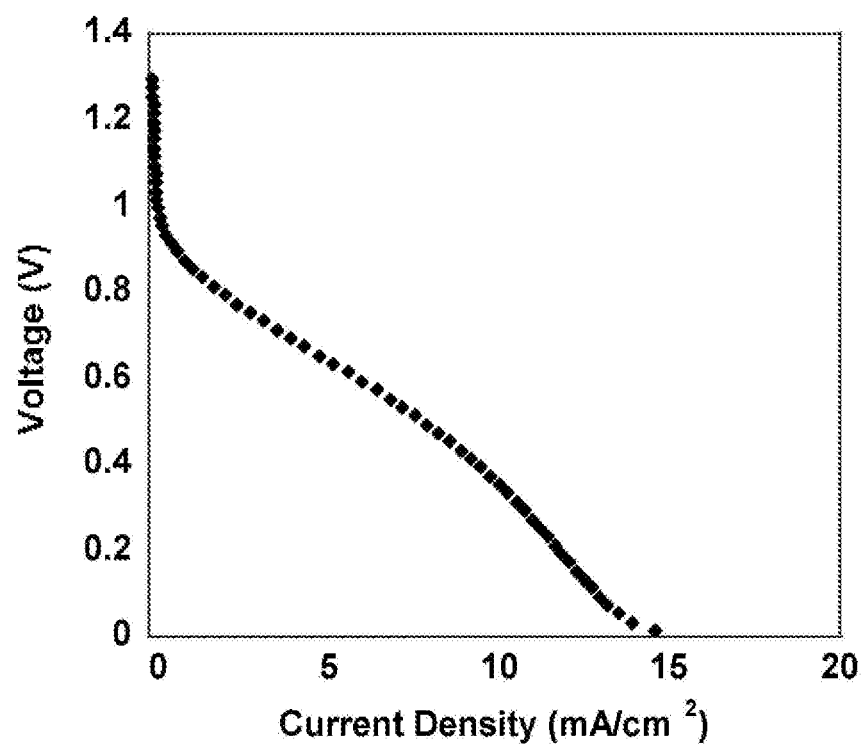

FIG. 17 depicts a polarisation curve generated by a hydrogen-oxygen fuel cell fabricated from 3D electrodes of the present embodiments.

Figure 18:
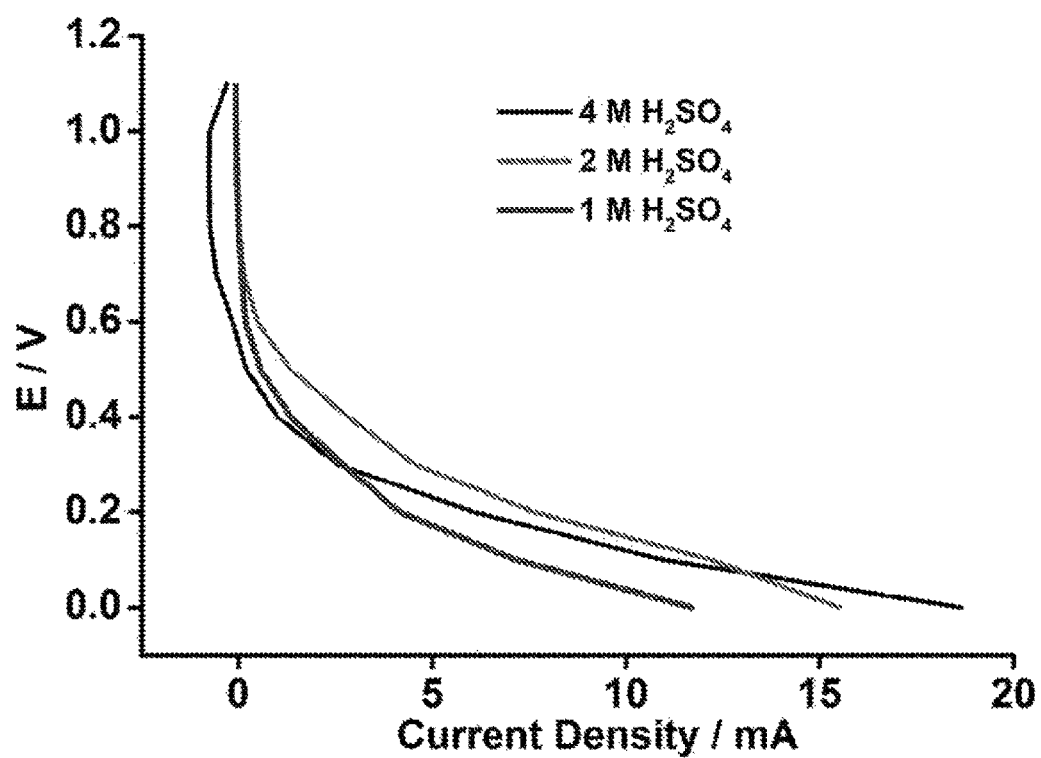

FIG. 18 depicts polarisation curves for a direct methane fuel cell, after flushing with methane and oxygen for 20 min.

Figures 19, 20:
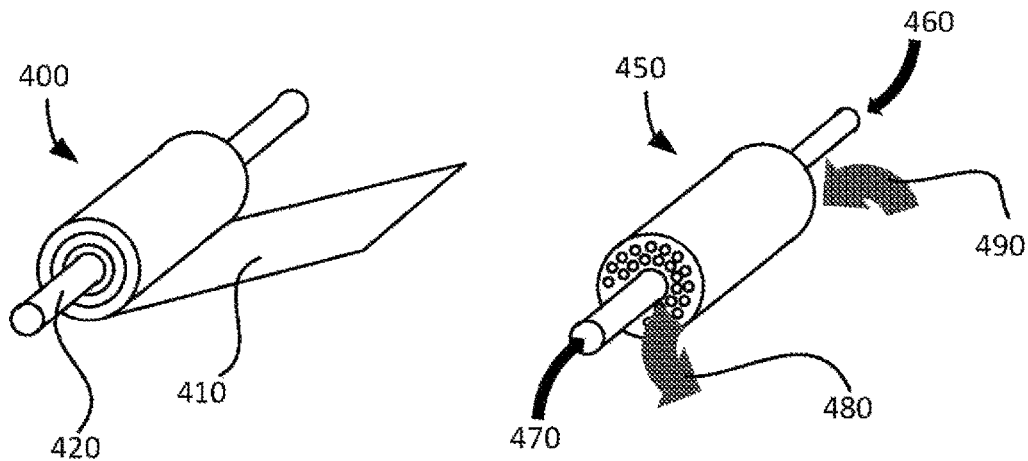

FIG. 19 schematically illustrates an example of how one or more flexible 3D electrodes can be rolled or spiral-wound.

FIG. 20 schematically illustrates an example of how flexible 3D electrodes, for example after being stacked or layered as anode-cathode pairs, can be formed into an example spiral-wound cell or device.

EXAMPLES

The following modes, features or aspects, given by way of example only, are described in order to provide a more precise understanding of the subject matter of a preferred embodiment or embodiments.

A New Approach to Making 3D Electrodes and Gas Diffusion Electrodes (GDEs)

Figure 2:
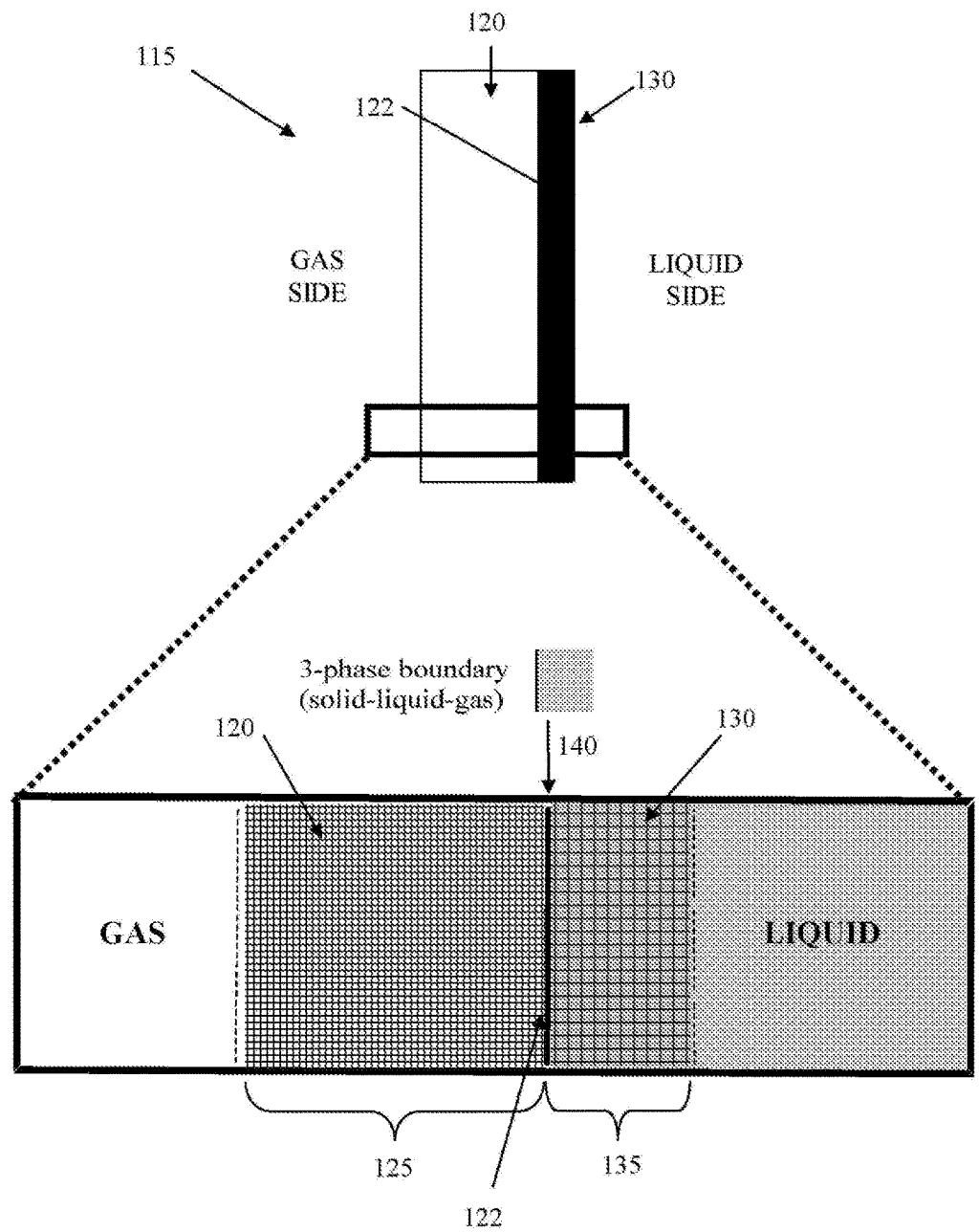
FIG. 2 depicts in schematic form, an example 3D electrode, or gas diffusion electrode, according to the present embodiments (not to scale). The lower part of the figure is a magnified view of a section of the gas diffusion electrode.

FIG. 2 illustrates in schematic form the general structure of an example 3D electrode or GDE 115 that can be used in present embodiments. A 3D electrode or GDE 115 of the present embodiments differs from a conventional 3D particulate fixed bed electrode or GDE 110 in that it separates the features of hydrophobic pore structure and conductivity, preferably catalytic conductivity, into two distinct regions, each of whose properties improve upon and may be more fully controlled than is possible in a conventional 3D particulate fixed bed electrode or GDE. In some embodiments more than two distinct regions may be possible. Thus, an example embodiment of a 3D electrode or GDE 115 may comprise of a liquid-and-gas-porous conductor 130 (i.e. a porous conductive material), that is preferably also provided with a catalyst, coupled with, attached to, abutting, or positioned adjacent a non-conductive gas permeable material 120, that is also preferably liquid electrolyte impermeable, e.g. strongly hydrophobic. The gas permeable material 120 and conductor 130 (i.e. porous conductive material) are substantially distinct, demarcated or separated, thereby providing a first region 135 (conductive region) and a distinct second region 125 (gas permeable region), respectively. The gas permeable material 120 and the conductor 130 are preferably positioned adjacent, abut, touch or adjoin each other, so that there can be touching or overlap of a periphery of the regions at a boundary region or interface 140. The non-conductive, hydrophobic, gas permeable material 120 may display pores that are better defined, more uniform, and potentially of smaller average size, than can be achieved in a conventional 3D electrode or GDE. The liquid-and-gas-porous conductor 130 may, similarly, be more conductive than a conventional 3D electrode or GDE. The low hydrophobicity of the liquid-and-gas-porous conductor (i.e. porous conductive material) 130 will usually also see it completely or substantially completely filled with liquid electrolyte under normal operating conditions, thereby maximally facilitating catalysis. By contrast, the liquid impermeability or high hydrophobicity of the non-conductive, gas permeable material 120 will typically see it completely empty or substantially empty of liquid electrolyte at atmospheric pressure, thereby maximally facilitating gas transport into and out of the GDE 115.

The gas permeable 3D electrode 115 thus provides a gas permeable material 120 that is non-conductive, and a porous conductive material 130 attached to the gas permeable material 120. In operation, the gas permeable material 120 faces a gas side of a cell and the porous conductive material 130 faces a liquid electrolyte side of the cell. In use, a three-phase solid-liquid-gas boundary is able to form at or near a surface 122 of the gas permeable material 120 facing the porous conductive material 130.

The porous conductive material 130 is coupled to, touching, positioned adjacent, attached to or abutting the non-conductive gas permeable material 120, which may be hydrophobic, to form or provide an interface 140 (or boundary region) of or between the porous conductive material 130 and the non-conductive gas permeable material 120. Preferably, this provides two regions (a first region 135 including the porous conductive material 130 and a second region 125 including the non-conductive gas permeable material 120) that are distinct, demarcated or separated. Preferably, the first region 135 and the second region 125 are positioned adjacent, abut, touch or adjoin each other, so that there is an interface 140 (or a boundary region) for the first region 135 and the second region 125. Thus, in operation of a preferred embodiment, a three-phase solid-liquid-gas boundary forms at or near the surface 122 of the gas permeable material 120 facing the porous conductive material 130, which may also be at or near the interface 140 (i.e. at or within a boundary region) between the first region 135 (i.e. the porous conductive material 130, which can include a catalyst) and the second region 125 (i.e. the non-conductive gas permeable material 120). In one example, the solid-liquid-gas boundary, which is formed during use of the electrode in a cell or reactor, has a macroscopic width that is substantially two-dimensional in relation to the width or thickness of the electrode 115. In another example, the solid-liquid-gas boundary is formed at the interface 140 of the gas permeable material 120 and the porous conductive material 130.

When such a 3D electrode or GDE 115 is contacted on the conductive side by a liquid electrolyte and on the non-conductive side by a gaseous material, then the above physical features cause the formation of a three-phase solid-liquid-gas boundary at or near the surface 122 (or interface 140 between the two regions). The three-phase solid-liquid-gas boundary is quite different to that formed in a conventional 3D electrode or GDE. The boundary differs in that it is far better defined, narrower, more stable and/or more robust than can be achieved in a conventional 3D electrode or GDE. For example, the three-phase solid-liquid-gas boundary formed at or near surface 122, or alternatively at or near interface 140, has a macroscopic width that is two-dimensional or substantially two-dimensional in relation to the width of the electrode 115.

These features are important because the inventors have found that example embodiment 3D electrodes or GDEs, such as GDE 115, may, when fabricated in a carefully calibrated way, combine at the interface 140 between gas permeable material 120 and conductor 130, an enhanced or optimum hydrophobic pore structure that facilitates enhanced or maximum gas transport, with an enhanced or optimally conductive, increased or maximally catalytic structure. In effect, at the three-phase solid-liquid-gas boundary in example embodiment 3D electrodes or GDEs, such as GDE 115, each of the critical properties of the electrode may be made ideal, or, at least, nearer to ideal than is otherwise possible.

The effect of this optimisation can be remarkable and unexpectedly significant. Despite being narrower and confined to what appears to be, macroscopically, a 2D geometry, the electrochemical capabilities of the three-phase solid-liquid-gas boundary in example embodiment 3D electrodes or GDEs, such as GDE 115, may substantially improve upon and, in fact, far exceed those of conventional 3D electrode or GDEs, such as GDE 110.

This is because the fabrication of conventional 3D electrodes or GDEs, as currently employed in the art, is predicated on creating all of the important physical properties at the same time within a single material. This approach effectively ignores the fact that the key properties of 3D electrodes or GDEs (namely: pore structure, hydrophobicity, gas transport, liquid transport, conductivity and catalytic activity) are typically inter-dependent and therefore not open to ready, concurrent optimisation within a single material. Example embodiment 3D electrodes or GDEs 115 take account of this limitation and separately optimise the key properties, to thereby achieve more optimum overall properties at the interface 140 between the gas permeable layer 120 and the conductive layer 130.

The inventors have further found that the three-phase solid-liquid-gas boundary may, in fact, at a microscopic level comprise a contorted 3D structure with an unexpectedly large overall surface area. This is particularly the case if the conductive region 135 overlaps somewhat with the gas permeable region 125.

These very fundamental enhancements may impart example embodiment 3D electrodes or GDEs, such as GDE 115, with a range of unexpected and novel electrochemical and physical capabilities. These include:

1. much higher wetting pressures and bubble points than can be achieved in conventional 3D electrodes or GDEs. "Wetting pressure" is defined as the lowest excess of pressure on the liquid electrolyte side of a 3D electrode or GDE relative to the gas side of the electrode, at which the liquid electrolyte penetrates and floods the electrode. The "bubble point" is defined as the lowest excess of pressure on the gas side of a 3D electrode or GDE relative to the liquid electrolyte side of the 3D electrode or GDE, at which the gas blows through the electrode and forms bubbles at the electrode surface on the liquid electrolyte side. Example embodiment 3D electrodes or GDEs, such as GDE 115, typically have wetting pressures and bubble points in excess of 0.2 bar, whereas conventional 3D electrodes or GDEs, such as GDE 110, typically have wetting pressures and bubbles points of 0.2 bar or less;

2. lower electrical resistances, higher electrocatalytic activities and reactivities, as well as more efficient utilization of catalytic materials, than can be realised in conventional 3D electrodes or GDEs, especially, but not exclusively, when operated at relatively low current densities; and 3. an apparent capacity to facilitate hitherto unachievable gas-to-liquid or liquid-to-gas electrochemical reactions, or, at least, improve upon electrochemical reactions that have not proved practically viable to date, especially, but not exclusively, when operated at relatively low current densities. Examples of such transformations include the electrochemical production of hydrogen peroxide from caustic and air oxygen, the production of pure oxygen from air oxygen, the operation of fuel cells with high energy efficiencies, and the direct generation of electrical current by the reaction of methane within a direct methane fuel cell.

Additionally, example embodiment 3D electrodes or GDEs, such as GDE 115, are flexible and may be double-sided, allowing them to be deployed in densely-structured, flexible, spiral-wound and other electrochemical cells, for example of the types described in the Applicant's concurrently filed PCT patent application "Modular Electrochemical Cells" filed on 30 Jul. 2014, which is incorporated herein by reference.

Example embodiment 3D electrodes or GDEs, such as GDE 115, may also be fabricated in an exceedingly low cost manner, allowing for the practical use of: (i) relatively low current densities, which minimise electrical losses and thereby maximise electrical efficiency, and (ii) low-cost catalysts comprising of Earth-abundant elements which only operate efficiently at lower current densities. By these means, it becomes possible to manufacture practically and economically viable, large-scale electrochemical cells for use in industrial-scale electro-synthetic and electro-energy applications. Such cells may achieve energy efficiencies that have hitherto been unavailable in large-scale production and energy environments. For example, chlorine may be manufactured at scale using the chlor-alkali process with 91% energy efficiency, whereas the best available industrial chlor-alkali plants achieve 66% energy efficiency. Further features of this aspect are described in the Applicant's concurrently filed PCT patent application "Electro-Synthetic or Electro-Energy Cell With Gas Diffusion Electrode(s)" filed on 30 Jul. 2014, which is incorporated herein by reference.

The higher wetting pressures that can be achieved in example embodiment 3D electrodes or GDEs, such as GDE 115, relative to conventional GDEs, such as ODE 110, allow for the direct production of pressurised gases in large-scale, industrial liquid-to-gas electro-synthetic/electro-energy cells without the risk of the electrodes becoming flooded and electrolyte leaking out of the electrolyte chamber ('flooding-free' operation). The higher bubble points that can be achieved means that reactant gases may be introduced at pressure into large-scale, industrial gas-to-liquid electro-synthetic electro-energy cells via gas diffusion electrodes, without forming energy-sapping bubbles in the liquid electrolyte ('bubble-free' operation) Further features of this aspect are described in the Applicant's concurrently filed PCT patent application "Method and Electrochemical Cell for Managing Electrochemical Reactions" filed on 30 Jul. 2014, which is incorporated herein by reference.

The present embodiments teach the approach of harnessing an interface between a liquid-and-gas-porous conductive layer and a gas permeable, hydrophobic layer to achieve practical and economic advantages such as those described above. Such advantages are achieved when the regions 125 and 135 are carefully designed/selected, fabricated in a calibrated way and located in close proximity to each other. That is, the three-phase solid-liquid-gas boundary should be enhanced or optimised, typically through carefully calibrated fabrication in order to improve upon conventional GDEs. The scope of the invention therefore includes 3D electrodes or GDEs that contain an interface of the type described above between a liquid-and-gas-porous conductive layer and a gas permeable, hydrophobic layer, and which improve in practical and economic ways upon conventional 3D electrodes or GDEs.

Fabrication of 3D Electrodes and GDEs

As noted above, a new approach to developing 3D electrodes or GDEs involves separately enhancing or optimising one or more key features of 3D particulate fixed-bed electrodes and gas diffusion electrodes in different locations and then combining the enhanced or optimised components along an interface. Thus, for example, the properties of hydrophobicity and porosity to the liquid electrolyte may be optimised in a non-conductive layer. This layer may then be combined along or about an interface, with a separate porous conductive layer in which the conductance and catalytic properties have been optimised.

The hydrophobic material may be a commercially available expanded PTFE membrane having high hydrophobicity and a substantially uniform pore size. Such membranes are manufactured to more accurate specifications than are possible in conventional 3D particulate fixed bed electrodes or GDEs.

The conductive material may be a metallic material, such as a metal mesh or grid (decorated or coated with a catalyst-binder mixture), that is inherently more conductive than the carbon black used in conventional 3D particulate fixed bed electrodes or GDEs. The porous conductive metal may be selected based on hydrophobicity to match a liquid electrolyte.

Small amounts of PTFE and carbon black may be used in the fabrication of the 3D electrode, for example in a binder material to bind the catalyst in the conductive layer to the metallic material. A key difference from conventional 3D particulate fixed-bed electrodes and GDEs is, however, that the PTFE and carbon black do not form a superstructure within which a three-way solid-liquid-gas boundary may be formed. Instead, the solid-liquid-gas boundary is formed at or near a surface of the gas permeable material facing the porous conductive material, or in another example this could be said to be at or near the interface between the hydrophobic porous region and the conductive region.

The inventors have studied such interfaces in 3D electrodes and discovered that they may yield surprisingly and unexpectedly effective electrochemical systems. Their efficacy appears to derive from their unique architecture, which is brought about by careful and calibrated construction. For improved performance, this may need to be coupled with operation of the 3D electrodes at low current density (at moderate voltages), such as from 1 mA/cm$^2$ to 500 mA/cm$^2$ or, preferably, from 1 mA/cm$^2$ to 200 mA/cm$^2$, or preferably from 1 mA/cm$^2$ to 100 mA/cm$^2$, inclusively.

General Example Embodiments—3D Electrode

A new approach to developing 3D electrodes involves adapting existing, commonly available porous materials so that they may act as practically useful 3D electrodes.

In a preferred example there is provided a 3D electrode which includes a gas permeable material that is liquid impermeable, a porous conductive material at least partially covering the gas permeable material (such as covering one side or part of one side of the gas permeable material) that is liquid permeable and gas permeable, and a binder material which adheres or attaches the gas permeable material and the porous conductive material to each other. The binder material (which may be a mixture of materials) penetrates the gas permeable material to a depth less than the thickness of the gas permeable material. In one example, the binder material can be present between the porous conductive material and the gas permeable material. In another example, the binder material is present at an interface or boundary region of the porous conductive material and the gas permeable material. In another example, the binder material adjoins the porous conductive material with the gas permeable material.

Thus, a porous conductive material (e.g. a conductive metallic layer) is provided at or near one surface of the 3D electrode and a gas permeable material (e.g. a non-conductive layer) is provided at or near the other, opposing, surface of the 3D electrode. The conductivity of the resulting composite 3D electrode thus varies along the thickness of the 3D electrode. The porous conductive material (e.g. conductive metallic layer) is gas permeable and at least partially, preferably fully, liquid permeable, whereas the gas permeable material (e.g. non-conductive layer) is gas permeable and liquid impermeable. The porous conductive material (e.g. conductive metallic layer) can be in one example part of an outer surface of the 3D electrode and is relatively less hydrophobic than the gas permeable material, whereas the bulk 3D electrode is gas breathable and liquid impermeable.

When the 3D electrode is in use, a three-phase solid-liquid-gas boundary is formed within the 3D electrode, preferably at or near the surface of the gas permeable material that faces the porous conductive material. The solid-liquid-gas boundary is narrow in macroscopic width compared to the thickness of the electrode or of the gas permeable material. Preferably, the maximum width of the solid-liquid-gas boundary is two-dimensional or substantially two-dimensional in relation to the width (or thickness) of the 3D electrode, or in relation to the width (or thickness) of the gas permeable material. In another example, the maximum width of the solid-liquid-gas boundary is less than or equal to the thickness of the applied binder material in the boundary region or interface between the gas permeable material and the porous conductive material.

The solid-liquid-gas boundary is narrow compared to the width of the electrode. This can depend on the width of the electrode materials used and the application. In one example the solid-liquid-gas boundary can have a maximum (or macroscopic) width of less than 400 µm. In other examples, the solid-liquid-gas boundary can have a maximum (or macroscopic) width of less than about 300 µm, or less than about 200 µm; or less than about 100 µm; or less than about 50 µm; or less than about 10 µm; or less than about 1 µm; or less than about 0.1 µm; or less than about 10 nm. By contrast, conventional gas diffusion electrodes typically have their solid-liquid-gas boundaries distributed over thicknesses of from 0.4 mm to 0.8 mm in the case of fuel cell gas diffusion electrodes, or even greater, such as several millimeters in industrial electrochemical gas diffusional electrodes.

In other examples, the maximum width of the solid-liquid-gas boundary can be defined in relation to the width of the electrode, or in relation to the width of one of the constituting materials or layers. In one example the solid-liquid-gas boundary can have a maximum width of less than about 30% of the width of the electrode. In other examples, the solid-liquid-gas boundary can have a maximum width of less than about 20% of the width of the electrode; or less than about 15% of the width of the electrode; or less than about 10% of the width of the electrode; or less than about 5% of the width of the electrode; or less than about 1% of the width of the electrode; or less than about 0.1% of the width of the electrode; or less than about 0.01% of the width of the electrode.

Preferably, though not necessarily, the porous conductive material is a pure or highly purified metal. For example, the porous conductive material can be, but is not limited to pure or purified nickel or Stainless Steel. Alternatively, the porous conductive material can be a metal such as Ti, Cr, Pt, Cu, Pb, Sn, Co, Mn, Au or Ag, or mixtures or alloys thereof. Alternatively, the porous conductive material could be a metal coated with another metal. For example, the porous conductive material could be stainless steel coated with nickel. Alternatively, the porous conductive material could be stainless steel coated with Ti, Cr, Pt, Cu, Pb, Sn, Co, Mn, Au or Ag. In further examples, the porous conductive material may be a polymer coated with a conductive layer or a metallic layer, such as a polymer fabric coated with a metallic layer. In still other examples, the porous conductive material may be formally non-metallic in character but display properties of electrical conduction which are similar to those of metals; for example, carbon fibre or carbon cloth materials.

In some examples, the conductive region or portion (which can include the porous conductive material and a binder material if used) of the 3D electrode comprises less than or equal to about 10%° carbon atoms, or less than or equal to about 20% carbon atoms, or less than or equal to about 30% carbon atoms. The carbon atoms can be provided as part of, or attached to, the porous conductive material, and/or included as a component of the binder material, in which case the conductive region or portion is provided by the porous conductive material and the binder material. This can provide a significant benefit, as carbon is less expensive than metals and also lighter. In another example, the conductive region or portion of the 3D electrode can comprise activated carbon. In these examples, the conductive region or portion is not simply a continuous metal or continuous metal coating, such as would be obtained from metallic sputter coating. A benefit of using activated carbon is that some catalysts, such as nano-catalysts, can better associate with or bind to the activated carbon than compared to metals.

In one example, the porous conductive material is stainless steel mesh, for example 100 lines per inch (LPI) stainless steel mesh (thickness about 60-80 micron), which is applied by lamination at, for example, a temperature of 50° C. and a pressure of 500 kPa to a polymer membrane of expanded PTFE (ePTFE) that has been pre-coated by screen-printing, with a layer about 20 micron thick of a binder mixture that comprises carbon black (about 10% by weight), nickel nanoparticles (about 80% by weight), and an ionomer, such as a sulfonated tetrafluoroethylene based fluoropolymer-copolymer (e.g. Nafion™ material), (about 10% by weight).

In other examples, the layer of binder material can be from about 1 micron to about 100 microns thick, or about 10, about 30, about 40, about 50, about 60, about 70, about 80, about 90, or about 100 microns thick. The binder material may comprise:

carbon black (from about 1% to about 30% by weight, or from about 1% to about 20% by weight, or from about 1% to about 10% by weight, or from about 1% to about 5% by weight, or about 5%, or about 10%, or about 15%, or about 20%, or about 25%, or about 30% by weight), nickel particles or nanoparticles (from about 1% to about 90% by weight, or from about 1% to about 80% by weight, or from about 1% to about 70% by weight, or from about 1% to about 60% by weight, or from about 1% to about 50% by weight, or about 10%, or about 20%, or about 30%, or about 40%, or about 50%, or about 60%, or about 70%, or about 80%, or about 90% by weight), and/or an ionomer, such as a sulfonated tetrafluoroethylene based fluoropolymer-copolymer (e.g. Nafion™ material), (from about 1% to about 30% by weight, or from about 1% to about 25% by weight, or from about 1% to about 20% by weight, or from about 1% to about 10% by weight, or from about 1% to about 5% by weight, or about 5%, or about 10%, or about 15%, or about 20%, or about 25%, or about 30% by weight).

In another example, the gas permeable material is a porous polymer membrane or structure. In another example the gas permeable material can be made or formed of one or more substances selected from, but not limited to the group of PTFE, polypropylene, polyethylene or polysulfone. The gas permeable material can be any medium, article, layer, membrane, barrier, matrix, element or structure that is sufficiently porous or penetrable to allow movement, transfer, penetration or transport of one or more gases through or across at least part of the material, medium, article, layer, membrane, barrier, matrix, element or structure (i.e. the gas permeable material). That is, a substance of which the gas permeable material is made may or may not be gas permeable itself, but the material, medium, article, layer, membrane, barrier, matrix, element or structure formed or made of, or at least partially formed or made of, the substance is gas permeable. The gas permeable material can also be referred to as a "breathable" material. By way of example only, a gas permeable material can be a porous membrane and a substance from which the gas permeable material is made or formed can be a polymer, such as PTFE. In one example the 3D electrode is a Gas Diffusion Electrode.

Preferably, the gas permeable material has substantially uniform pore size. Between the porous conductive material (e.g. conductive metallic layer) and the gas permeable material (e.g. non-conductive polymer layer) is a binder material providing a binder layer in a boundary region, and on both sides of the boundary region the pores are substantially uniform in size and distribution. For example, the average pore size can be between about 10 nm to about 500 nm, or preferably between about 50 nm to about 500 nm, or preferably between about 100 nm to about 500 nm, or in more specific examples about 0.1, 0.2, 0.3, 0.4 or 0.5 microns in size. In a most preferred example, the gas permeable material has an average pore size of about 50 nm to about 500 nm and is formed of PTFE.

For example, a commonly available and relatively inexpensive non-conductive porous material is made or formed of "expanded PTFE", also known as ePTFE (where PTFE=polytetrafluoroethylene, or Teflon™). ePTFE comprises a highly porous (typically 60-80% porosity) fibrous network of microscopically small, hydrophobic PTFE. An important property of ePTFE is that it is highly porous but also highly hydrophobic. Other widely-available, commodity-type porous polymer membranes, are made or formed from, but are not limited to, polypropylene, polyethylene, polysulfone, and other polymers of similar ilk.

It should be noted that, while the brand name Goretedx polymer material can be used, the inventors have found that use of Goretex® polymer material is not preferred or optimum in the applications described below. In fact, the inventors have found that ePTFE membranes manufactured by the General Electric Company, having some different properties, offer the best and most optimum utility in most electrochemical devices.

In one example, the depth to which the binder material penetrates the gas permeable material (e.g. polymer layer) is in the range of about 1 nm to about 10 µm, or about 50 nm to about 1 µm, or about 50 nm to about 500 nm. In a specific example, the porous conductive material is a nickel mesh of 100 LPI (LPI=lines per inch), the gas permeable material is a 0.2 micron PTFE membrane and the binder material is a combination of carbon black (about 10% by weight), nickel nanoparticles (about 80% by weight), and a sulfonated tetrafluoroethylene based fluoropolymer-copolymer (e.g. Nafion™ material) (about 10% by weight), and the binder material penetrates the gas permeable material to a depth greater than 0 but less than the thickness of the gas permeable material, for example less than about 850 nm.

In another form there is provided a method of fabricating a 3D electrode. The steps include selecting a gas permeable material, for example with a substantially uniform pore size, and then applying, under suitable ('calibrated') heat and pressure for lamination, a porous conductive material to partially coat the gas permeable material, with use of a binder material as an adhesive. The binder material preferably penetrates the gas permeable material to a depth less than the thickness of the gas permeable material.

The ('calibrated') lamination step can include: a particular heat or range of heats of application; a particular pressure or range of pressures of application; a particular time or period of application; and/or a particular circumstance or range of circumstances of application.

Attachment of one or more porous conductive materials, for example as one or more porous conductive layers or meshes, to the gas permeable material, for example a porous polymer membrane, using controllable lamination techniques are employed to produce 3D electrodes. When formed in this way, 3D electrodes with unexpected and improved electrochemical performance may be realised, especially relative to other 3D electrodes and to the cost of manufacture. Further, unrelated materials, for example including catalytic or other materials, can be conveniently added to, or formed upon or in-between the one or more porous conductive materials, layers or meshes, and the gas permeable material to produce 3D electrodes that are practical and useful in electro-energy or electro-synthetic applications. The availability of such 3D electrodes makes viable or improves the practicality of a range of electro-energy and electro-synthetic applications. Such applications are typically unviable or relatively less practical using conventional particulate fixed-bed or gas diffusion electrode technologies.

The porous conductive materials, for example provided as meshes, membranes or layers, can be applied to one or more gas permeable materials, for example provided as meshes, membranes or layers, having a specific, and preferably narrow, range of pore sizes, such as the widely available and relatively low cost polymer membranes used in the water purification industry. Such membranes are manufactured to contain very specific and narrow ranges of pore sizes. By adapting or modifying such membranes or other gas permeable materials to be 3D electrodes, one may conveniently impart upon the 3D electrode highly desirable and otherwise unobtainable pore properties. For example, 3D electrodes may be conveniently and reliably fabricated with tiny (for example less than 500 nm in size) and reasonably or substantially uniform pores that are not easily, reliably, or inexpensively achieved in conventional 3D electrodes. Additionally, the desired pore size can be readily varied by selecting a different gas permeable material, for example provided as a membrane or mesh, for adaption or modification into a 3D electrode. Gas permeable materials with a wide variety of pore sizes are readily available.

A porous conductive material, for example a conductive metallic material, mesh or layer, can be applied such that the produced 3D electrodes display unusually high electrochemical activities as a function of the electrochemical surface area present.

General Example Embodiments—Gas Diffusion Electrode (GDE)

When intended to be used in a Gas Diffusion Electrode (GDE) type application, the porous conductive material (e.g. metallic material or layer) is preferably, but not exclusively, applied such that the produced 3D electrodes create uniquely well-defined, narrow and stable three-way solid-liquid-gas boundaries. In a particular example, the porous conductive material may have a thickness in the range of about 1 nm to about 1000 µm, or in the range of about 1 µm to about 100 µm, or in the range of about 5 µm to about 40 µm. By controlling the pore size of the gas permeable material (e.g. a polymer layer), one may also control important physical properties of the 3D electrode, for example a 3D GDE, such as the wetting pressure, the bubble point, and the permeability to gases.

In an example embodiment in the case where a GDE is manufactured using a previously formed polymer membrane as the gas permeable material, the GDE can have substantially the same wetting pressure as that of the polymer membrane (i.e. the gas permeable material) used. In the example case where a membrane having average pore size 0.2 µm is used as the gas permeable material in the GDE, the wetting pressure of both the membrane and the GDE is 3.4 bar (such an example polymer membrane is available from the General Electric Company). Thus, liquid water will only penetrate and flood the GDE upon the application of 3.4 bar of pressure on the liquid side. The addition of a dense, thin film that is, nevertheless porous to gases but not to liquid water, on top of the PTFE may increase the wetting pressure to 10 bar or greater. By contrast, to the knowledge of the Applicant all other known GDEs have wetting pressures that currently do not exceed 0.2 bar. Aspects of this feature are described in the Applicant's concurrently filed PCT patent application "Electro-Synthetic or Electro-Energy Cell With Gas Diffusion Electrode(s)" filed on 30 Jul. 2014, which is incorporated herein by reference. Thus, in one form the present example electrode has a wetting pressure above 0.2 bar, and preferably about 3.4 bar or greater.

In preferred examples the porous conductive material is attached to the gas permeable material (e.g. the polymer layer) by being physically (e.g. mechanically) or chemically bonded to the gas permeable material. This can be achieved by the presence of a binder material, or materials, that act to bind the porous conductive material and the gas permeable material together. The binder material may be present everywhere, substantially everywhere or almost everywhere between the porous conductive material and the gas permeable material. Alternatively, the binder material may be present at a selection of spots or regions between the porous conductive material and the gas permeable material. The binder material or materials may further be applied in a pattern to thereby securely attach the porous conductive material to the gas permeable material. The binder material may include, substantially or partially, the material which forms the gas permeable material, for example the polymer material which forms the polymer layer. Alternatively, binder material may be a mixture and comprise one or more unrelated materials which may concurrently impart one or more other desirable properties upon the binder mixture, such as also being a conductor of electricity or a catalyst.

In one example, the binder material attaches to the surface of the porous structure of the gas permeable material (e.g. polymer material or layer). In another example, the binder material penetrates the porous structure of the gas permeable material (e.g. polymer material or layer) to a depth less than the thickness of the gas permeable material (e.g. polymer material or layer).

Example gas permeable or breathable 3D electrodes can be formed by depositing a catalyst within a binder material (e.g. binder layer) on a gas permeable material, followed by attaching or laminating thereto, a porous conductive material. In one example, one could start with a gas permeable non-conductive material and then form thereupon, a binding layer using a binder material containing one or more catalysts. To this combination, a porous conductive material may be laminated using suitable heat and/or pressure.

In a preferred example the 3D electrode is flexible. The porous conductive material or layer can be made at least partially or wholly from a substance and/or in a form that is flexible. The gas permeable material can similarly be made at least partially or wholly from a substance and/or in a form that is flexible. Optionally, the gas permeable material is made at least partially or wholly from a polymer or a combination of polymers, for example PTFE, "expanded PTFE" (ePTFE), polyethylene or polypropylene. The polymer itself may or may not be gas permeable. For example, the polymer itself may not be gas permeable but a structure or membrane formed from the polymer is gas permeable.

Numerous other industrial electrochemical processes may benefit from the use of gas depolarized GDEs, if they were practically viable. These include the electrochemical manufacture of: (a) hydrogen peroxide, (b) fuels from $CO_2$, (c) ozone, (d) caustic (without chlorine), (e) potassium permanganate, (f) chlorate, (g) perchlorate, (h) fluorine, (i) bromine, (j) persulfate, and others. Electrometallurgical applications, such as metal electrowinning, could also benefit from the energy savings associated with anode depolarization; metal electro-deposition occurs at the cathode side of such cells, while oxygen is evolved at the anode. If oxygen evolution was replaced by hydrogen oxidation on a suitable gas diffusion anode, this would generate substantial energy savings. However, the mechanical characteristics of conventional GDEs make them unsuitable for delimiting narrow-gap chambers, thereby restricting their application in the undivided electrolysis cells that are widely used in electrometallurgical processes. Moreover, conventional GDEs would leak under the hydraulic head of electrolytic solutions commonly used in industrial size electrolysers. Several industrial electrochemical processes in the pulp and paper industry may also benefit from the use of alternative GDEs that could be gas depolarized and withstand a higher pressure differential, including: (a) "black liquor" electrolysis, (b) "Tall Oil recovery" and (c) chloride removal electrolysis. Flooding of GDEs after the build-up of even very mild liquid pressures is, furthermore, a particular and well-recognized problem in fuel cells, such as hydrogen-oxygen fuel cells.

Thus, the electrochemical cell can be used in the electrochemical manufacture of: (a) hydrogen peroxide, (b) fuels from $CO_2$, (c) ozone, (d) caustic (without chlorine), (e) potassium permanganate, (f) chlorate, (g) perchlorate, (h) fluorine, (i) bromine, (j) persulfate, (k) chlorate, (l) caustic (in general), (m) $CO_2$ from methane, and others.

In alternative examples, the electrochemical cell involves electrochemical processes unique to particular industries. Examples include:
(i) electrometallurgical applications, such as metal electrowinning;
(ii) pulp and paper industry applications, such as: (a) "black liquor" electrolysis, (b) "Tall Oil recovery" and (c) chloride removal electrolysis; and
(iii) fuel cell and related device applications, such as hydrogen-oxygen fuel cells, including but not limited to alkaline fuel cells.

In another example aspect, the beneficial effect/s may be achieved by the fact that GDEs according to example embodiments make it possible and practical to carry out entirely new chemical processes, either in cells or devices. For example, hitherto unconsidered processes for the formation of fuels from carbon dioxide, or remediation of $SO_x$ and $NO_x$ pollution, are possible and practical using GDEs according to example embodiments.

In another example embodiment, one or more GDEs are used to inject or introduce a depolarizing gas not only into the depolarizing electrode but also in sufficient quantities to force the gas into the electrolyte to cause the formation of bubbles that will rise within the reactor, causing mixing within the electrolyte, and thereby increasing mass transfer and decreasing concentration polarization effects. Alternatively, one or more GDEs are used to inject an inert gas or some combination of inert gas and depolarizing gas. In this embodiment, the GDE acts like a fine bubble diffuser, and may carry out two functions: to add a gas to the cell and also to provide mixing. Thus, the depolarizing gas and/or an inert gas can be forced into the liquid electrolyte, via the at least one electrode, to cause bubble formation and/or mixing in the liquid electrolyte.

In various further examples: a porous conductive material or layer is provided attached to, positioned adjacent to, positioned or layered upon, or at least partially within the gas permeable material; the porous conductive material or layer is associated with the gas permeable material; the porous conductive material or layer is located on and/or within the gas permeable material; and/or, the gas permeable material is located on and/or within the porous conductive material or layer. In other examples, the gas permeable material is a gas permeable membrane or structure, a gas permeable polymer membrane or structure, a gas permeable porous polymer membrane or structure, or a gas permeable porous membrane or structure.

General Example Embodiments—3D Electrode and Gas Diffusion Electrode (GDE) with a Barrier Layer to Exclude Vapour from the Liquid Electrolyte An example embodiment 3D electrode or GDE may incorporate one or more barrier layers or barrier films that are highly or substantially permeable to the relevant gas stream, but relatively less permeable or impermeable to the transport of the reaction solvent in gaseous form. Several examples of such barrier layers or films exist. Examples of such barrier layers or films that are highly permeable to oxygen gas but poorly permeable or impermeable to water vapour include: polyolefins, poly(methylpentene), organosilicon polymer films, fluorocarbon or perfluorocarbon polymers, especially hyperbranched perfluorocarbon polymers, or mixtures thereof. The incorporation of such a barrier layer in the 3D electrode, for example a 3D GDE, preserves the gas stream outside of the 3D electrode from contamination by the gaseous form of the solvent used (e.g. water vapour) and also protects the gas channels outside of the 3D electrode from being blocked, impeded, or flooded by water condensate. The unique properties of the 3D electrode in respect of avoiding flooding, may thereby be transmitted to the entire network of gas channels and plumbing within a cell in which it is employed.

Additionally, because it can be practically difficult to completely prevent the formation of larger pores in a 3D electrode or to prevent defects from forming over the course of extended use, the barrier layer or barrier film may serve as a means to mask large pores and/or defects in the porous structure that could compromise the ability of the 3D electrode to perform a desired function, for example such as to prevent flooding.

The barrier layer or barrier film may be located on the gas side of the 3D electrode. Alternatively, the barrier layer or barrier film may be located on the liquid side of the 3D electrode, between the porous conductive material (e.g. conductive metallic material) and the gas permeable material (e.g. non-conductive polymer layer).

Preferably, the barrier layer or barrier film is highly or substantially permeable to the gases that are generated (as reaction products) or added (as reactants) from the gas side of the 3D electrode, but poorly permeable or impermeable to the solid, liquid, or gaseous components of the solvent used on the liquid side of the 3D electrode, namely, the electrolyte. For example, in 3D electrodes which form an interface between liquid water and oxygen gas, the barrier layer or barrier film is highly or substantially permeable to oxygen gas, but poorly permeable or impermeable to gaseous water vapour. In a second example in which a 3D electrode forms an interface between methane/natural gas and a liquid solvent, the barrier layer or barrier film is highly or substantially permeable to methane/natural gas, but impermeable or poorly permeable to the gaseous form of the liquid solvent.

In a particular example, the 3D electrode is a composite electrode and comprises a gas permeable material provided as a non-woven layer (e.g. high-density polyethylene fibers, such as for example Tyvek™ polymer material) attached to a barrier layer comprising a polymeric dense thin film (e.g. a polymethylpentene barrier layer) on one side, and a metal mesh on the other side, where the metal mesh is adhered to the polymer layer by a binder material.

Some General Methods of Fabricating an Example 3D Electrode or GDE

In one example, one could start with a gas permeable material provided as a non-conductive material and then apply the porous conductive material by depositing a conductive metallic material on the gas permeable material. In a further example, one or more catalysts can then be deposited as part of a binding layer, with subsequent lamination of the electrode assembly into a single structure using suitable heat and/or pressure. In a still further example, one may coat a binder material to provide a binding layer containing one or more catalysts onto a gas permeable material (e.g. a polymer layer) and then laminate the gas permeable material with a metallic material or layer precoated with the same binder material. Several other methods exist to fabricate an example embodiment.

Some General Advantages of Example 3D Electrodes and GDEs

As noted earlier, the presence of well-defined and narrow gas-solid-liquid interfaces in 3D electrodes of the present embodiments may eliminate many of the problems that are created in other classes of solid-liquid-gas electrodes, such as conventional gas diffusion electrodes, or trickle-bed electrodes. Examples of the problems that may be eliminated or diminished include, without limitation, instability in, inhomogeneity in, fluctuations in, and/or failure of the solid-liquid-gas boundary. Problems of this type may result in uneven, low yielding, incomplete or incorrect reactions, amongst others.

Additionally, the 3D electrodes can provide unexpectedly amplified electrochemical properties of the type describe earlier, including unusually high electrode activities per unit volume of deposited catalyst (included in the binder layer).

The inventors have found that unexpected and disproportionate advantages of this type may be realised when the electrode interface is fabricated in a careful, calibrated manner. For improved performance the electrode may also need to be operated at relatively low current densities, such as from 1 $mA/cm^2$ to 500 $mA/cm^2$ or, preferably, from 1 $mA/cm^2$ to 200 $mA/cm^2$, or preferably from 1 $mA/cm^2$ to 100 $mA/cm^2$, inclusively.

Thus, for example, hydrogen-oxygen fuel cells utilizing the 3D electrodes typically require smaller quantities of catalysts than is normally the case using other types of electrodes. The produced 3D electrodes also do not necessarily require pure oxygen gas or highly compressed atmospheric air oxygen as a feedstock (as is the case in PEM fuel cells). Nor do the produced 3D electrodes necessarily require humidification of the feedstock gases (as is the case in PEM fuel cells). These advantages arise because the conductive layer in 3D electrodes of the present embodiments are well-defined, narrow, and have a high electrochemical area per unit volume of 3D electrode.

Other advantageous features which may be realised include, amongst others: (i) the catalyst in the interfacial region is maximally active, (ii) the catalyst is not wasted by being deposited in other, non-interfacial regions, where catalyst cannot act, (iii) the reactants have improved or maximum access to the electrode surface and suffer fewer limitations in terms of mass transport, and (iv) in one example application, water molecule products are readily and rapidly transported away from the reactive surface of the electrodes (due to the relatively narrow conductive layer and its high electrochemical surface area).

For illustrative purposes only and without limiting the invention, we now describe a representative common problem that may arise in conventional gas diffusion or particulate fixed bed electrodes and show how it may be eliminated in a 3D electrode of the present embodiments.

"Flooding" is a phenomenon that occurs when a liquid (product or reactant) partially or completely fills a gas diffusion electrode, thereby causing a breakdown in the solid-liquid-gas boundary and blocking electrochemical contact with the gas (reactant or product). Flooding is a particular problem in fuel cells, such as hydrogen-oxygen fuel cells, that require the feedstock gases to be humidified. Flooding may be caused by water ingress into the gas diffusion electrode via systematic, incremental percolation through the non-homogeneous pores of the electrode, or it may be caused by spontaneous condensation of the water vapour in the feedstock gas stream. Regardless of its origin, flooding always induces a decline in the voltage output and power generation of such fuel cells.

Flooding does not, however, occur under normal operating conditions in 3D electrodes of the present embodiments since the three-phase solid-liquid-gas boundary is too well-defined and too narrow. There is a very clear separation of the liquid and gas phases in such electrodes, meaning that incremental percolation through the GDL does not occur. Moreover, the narrowness of the interface ensures that any condensation of any size is readily taken up and drawn back into the liquid phase, thereby effectively eliminating the possibility of flooding.

The above advantages confer utility and low-cost upon 3D electrodes of the present embodiments, as well as high performance relative to the current density employed. These properties make the 3D electrodes practical and useful in a variety of industrial applications, including but not limited to electro-energy and electro-synthesis applications. Many such applications are not practically viable without the use of 3D electrodes of the present embodiments. The 3D electrodes also allow the fabrication of practical and viable devices for these transformations, such as spiral-wound reactors and the like.

In further illustrative example applications, the 3D electrodes may also be used to improve or make viable electrochemical devices for: (i) converting air-based oxygen into pure or purer oxygen; (ii) manufacturing hydrogen peroxide; or (iii) use as fuel cells, both hydrogen-oxygen fuel cells and direct methane fuel cells. These example electrochemical devices share a common feature in that the 3D electrodes all display unusually high electrochemical activity relative to the current density employed. This activity appears to derive at least in part, from an unexpectedly strong capacity to sequester and consume oxygen gas from out of the air; a property that is believed to result from the well-defined and narrow three-way solid-liquid-gas boundary in the 3D electrode. The interface appears to create a remarkably selective reaction by the oxygen in air. The reaction is so strongly favoured that it continues within a sealed gas chamber even after the oxygen in the air has been largely depleted, thereby causing the formation of a partial vacuum in the gas chamber. Such a partial vacuum would normally halt or, at least, dramatically slow the reaction. However, in these cells, the vacuum continues growing until effectively all of the oxygen in the air is consumed. To the best of the inventors' knowledge, such effects have not been previously observed. This was undoubtedly because in these examples, the solid-liquid-gas boundary was carefully created to have a width/thickness of the order of 850 nm. This meant that the electrode could operate highly efficiently at a relatively low current density.

Beyond the above, 3D electrodes of the present embodiments may also display the following advantages:

(1) A dramatically higher wetting pressure than is achievable in any known conventional gas diffusion electrode. Conventional gas diffusion electrodes typically flood upon the application of <0.2 bar of external pressure. By contrast, electrodes of the current embodiments contain uniform pore structures in the gas permeable, water impermeable layers, so that they may require far higher external pressures before leaking. For example, embodiment electrodes may contain relatively small/tiny and uniform pore sizes, such as between about 10 nm to about 500 nm, or in one example about 0.2 microns, which can lead to a reduction in or avoidance of flooding of the electrode up to applied pressures of 3.4 bar. This means that a substantial pressure differential can be applied across the electrode, e.g. having an electrolyte at higher pressure on one side of the electrode compared to a gas region on the other side of the electrode, for example a pressure difference of about 3.4 bar, well above previously known electrodes. By this means, electrodes of the present embodiments can withstand a relatively higher pressure before leaking.

(2) Flexibility of the electrode; the materials used in the electrode can be optionally made to be flexible or bendable, and for example, able to be rolled or spiral-wound. The gas permeable material can be selected from, for example, different porous polymer materials and/or different pore sizes to achieve desired properties of the electrode. This flexibility distinguishes many previous electrodes that are rigid structures.

(3) The ability to produce electrodes of relatively large size. For example, for commercial applications, electrodes can be readily produced having a width and/or a length of greater than or equal to 0.05 m, 0.1 m, 0.2 m, 0.3 m, 0.4 m, 0.5 m, 1 m, or 2 m. In another example electrodes can be readily produced of about 0.05 m, about 0.1 m, about 0.2 m, about 0.3 m, about 0.4 m, about 0.5 m, about 1 m, about 2 m, or larger in width and/or length. In an application where an electrode is rolled or spiral-wound, the flat electrode before rolling may preferably have a width of about 0.05 m or greater, about 0.1 m or greater, about 0.2 m or greater, about 0.3 m or greater, about 0.4 m or greater, about 0.5 m or greater, about 1 m or greater, about 2 m or greater, and a length of about 0.5 m or greater, about 1 m or greater, about 2 m or greater, about 3 m or greater, about 4 m or greater, about 5 m or greater, about 10 m or greater. The rolled or wound electrode may have a diameter of about 0.05 m or greater, about 0.1 m or greater, about 0.2 m or greater, about 0.3 m or greater, about 0.4 m or greater, about 0.5 m or greater, or even larger. This relatively large size distinguishes many previous electrodes that can only be produced in a small size, for example up to the order of 0.01 m in size. The difference in size scale is not a trivial factor since many small electrodes cannot be simply scaled up in size. For example, in relatively small cells having small sized electrodes, it is not required to have or consider a high electrical conductivity in the cell/electrode, because the distances involved are small, so the associated resistances are relatively small. In contrast, in larger scale cells/electrodes, such as the present example, this issue is much more challenging and higher conductivity is required along very good conduction pathways. Hence, a small scale electrode structure cannot typically and simply be scaled up to a large scale electrode.

The following examples provide more detailed descriptions of particular embodiments. The examples are intended to be illustrative and not limiting to the scope of the invention.

Examples 1-11: Fabricating Electrodes Using Pre-Formed, Porous Conductive Metal Structures Example 1: Illustrative Example—Fabricating Electrodes by Spot-Gluing a Metal Mesh onto an ePTFE Membrane An expanded PTFE (ePTFE) membrane manufactured by General Electric Corporation (average pore size 0.2 micron) had a fine nickel mesh (200 lines per inch; manufactured by Precision eForming Inc.) laid down upon the ePTFE membrane. The mesh was then carefully lifted, starting at one edge and small spots of a commercial adhesive ('Loctite plastic') were spot-painted at periodic intervals along the underside of the mesh. The mesh was thereafter released and allowed to contact the membrane, causing the adhesive, which is capable of binding metals to PTFE, to securely adhere the mesh to the surface of the PTFE membrane.

Using this technique, the porous conductive material was secured to the surface of the polymeric layer material (i.e. the gas permeable material) to thereby create a composite 3D electrode. Electrodes of this type were not found to generate unusual or unexpectedly amplified electrochemical properties, however they could be used as a basis for the subsequent fabrication of electrodes that did display amplified properties.

Example 2: Illustrative Example—Fabricating Electrodes by Hot-Laminating a Metal Mesh onto a Polypropylene Membrane A porous polypropylene membrane manufactured by Membrane Solutions Inc. (pore size 0.15 microns) had a fine nickel mesh (200 line per inch; manufactured by Precision eForming Inc.) laid down upon the membrane. The assembly was passed one or more times through a commercial laminator of the type available in most stationary stores. After treatment in this manner, the mesh was securely attached to the membrane, and, indeed, the nickel mesh (i.e. the porous conductive material) penetrated and bonded to the outermost layers of the porous polypropylene membrane (i.e. the gas permeable material). Using this technique, the porous conductive material was secured to and bonded to the outermost portions of the polymeric layer material (i.e. the gas permeable material) to thereby create a composite 3D electrode. Electrodes of this type did not generate unusual or unexpectedly amplified electrochemical properties, however they could be used as a basis for the subsequent fabrication of electrodes that did display amplified properties.

Example 3: Illustrative Example—Fabricating Electrodes by the Application of a Binder Material An expanded PTFE membrane (ePTFE) manufactured by General Electric Corporation (pore size 0.2 micron) had a fine nickel mesh (200 line per inch; manufactured by Precision eForming Inc.) laid down upon the membrane. The mesh was then carefully lifted, starting at one edge and a layer of a binder material (15% Nafion in alcohols/water, supplied by Ion Power Inc., containing 20% by weight of a catalytic filler such as particulate nickel, supplied by Sigma-Aldrich) was applied to the membrane surface. The mesh was thereafter released and allowed to contact the coated membrane. After leaving to dry for 4 hours at 60° C., the mesh was adhered to the surface of the PTFE membrane.

Figure 3:
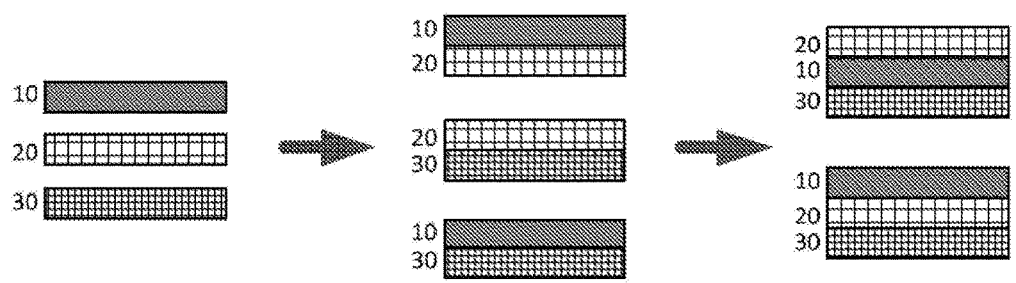
FIG. 3 illustrates side views of example structures of electrodes of the current embodiments (not to scale).

This fabrication method may be amended in several ways. The binder material may be painted over the unconnected mesh and the membrane and then dried, causing the mesh to adhere to the membrane. Alternatively, the binder material may be separately applied to the membrane surface and the mesh, with the coated, wet membrane and mesh then married up and dried. In generalised examples, FIG. 3 shows some of the permutations that are possible when a binder material is used to adhere or attach a porous conductive material (such as a metallic mesh) to a gas permeable material (such as a polymer membrane). On the left hand side in FIG. 3 is shown the three different elements that are to be combined into a single composite 3D electrode; namely, a binder material 10, a porous conductive material 20 (for example a metallic mesh) and a gas permeable material 30 (for example a polymer membrane). The middle section in FIG. 3 shows that the binder material 10 can be either applied to the porous conductive material 20 or to the gas permeable material 30 or to the combination of the porous conductive material 20 and the gas permeable material 30. There are two general outcomes (shown on the right hand side in FIG. 3): (a) the situation shown at the top right of FIG. 3, where the binder material 10 mostly lies between the porous conductive material 20 and the gas permeable material 30; and (b) the situation shown at the bottom right of FIG. 3, where the binder material 10 mostly lies over and through the holes of the porous conductive material 20 (although the binder material 10 is not illustrated as being present through the holes of the porous conductive material 20 for clarity). In both cases, the 3D electrode is a single integrated unit.

Figures 4A, 4B:
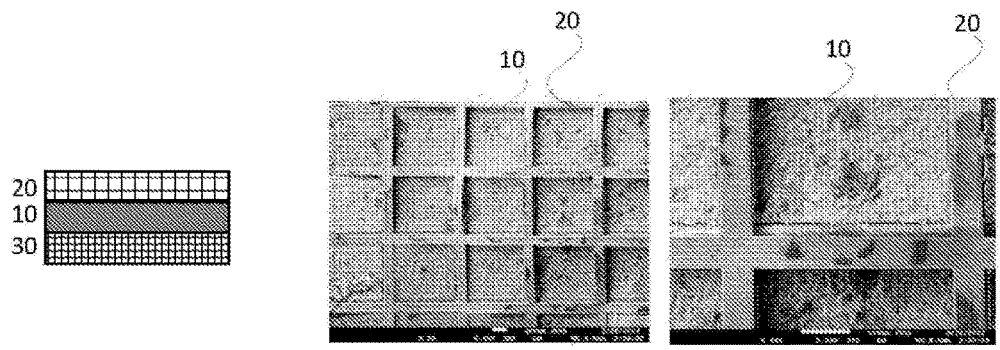
FIG. 4(a) is a scanning electron micrograph (SEM) of an example electrode fabricated according to one of the permutations shown in FIG. 3.
FIG. 4(b) is a magnified view of a section of the example electrode shown in FIG. 4(a).

FIG. 4(a) is a scanning electron micrograph (SEM) of an example electrode fabricated according to one of the permutations shown in FIG. 3, as illustrated at the left hand side in FIG. 4(a), and using a nickel mesh and the binder material described in Example 3. FIG. 4(b) is a magnified view of a section of the example electrode shown in FIG. 4(a). Clearly visible is the binder material 10 underneath the porous conductive material 20 which is bound to the underlying gas permeable material 30 (which is not visible).

Figure 5:
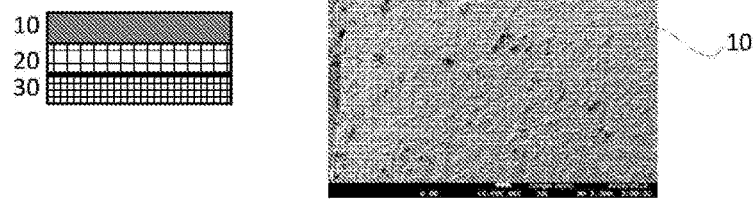
FIG. 5 is a scanning electron micrograph (SEM) of an example electrode fabricated according to another of the permutations shown in FIG. 3.

FIG. 5 is a scanning electron micrograph (SEM) of an example electrode fabricated according to another of the permutations shown in FIG. 3, as illustrated at the left hand side in FIG. 5, and using a nickel mesh and the binder material described in Example 3. Clearly visible is the binder material 10 covering and within the pores or holes of the porous conductive material 20 (which is only faintly visible in outline) which is bound to the underlying gas permeable material 30 (which is not visible).

Figure 6:
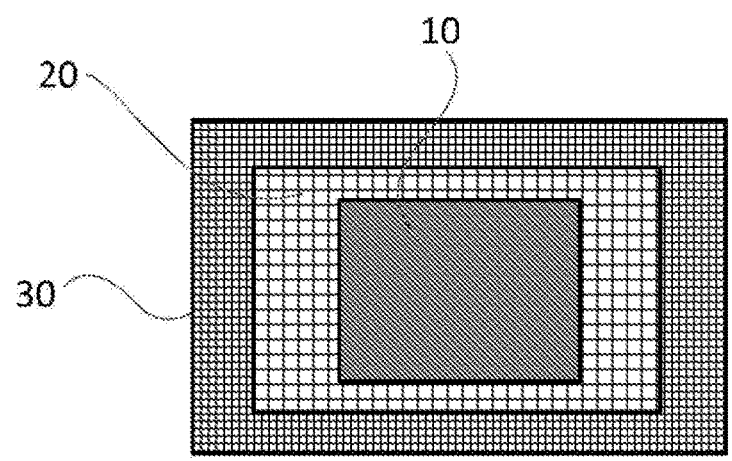
FIG. 6 illustrates a top view of an example electrode showing example layers (not to scale).

FIG. 6 shows a top view of the schematic structure of an example non-completed composite 3D electrode, in which a porous conductive material 20, for example a 50 lines per inch (LPI) nickel mesh, has been adhered to, for example spot-glued, or otherwise simply placed upon or attached to, a gas permeable material 30 (for example a PTFE membrane as described in Example 1), and then overcoated, within a central square area, with binder material 10, which may be a catalyst-binder material. In one example, the binder material 10 can be painted over the porous conductive material 20 (or alternatively on the gas permeable material 30 before positioning the porous conductive material 20). A variety of other methods of application are possible, such as spraying, dipping, pouring, printing, electro-coating, electroless coating or powder coating. After drying, the binder material 10 adheres, i.e. attaches, the porous conductive material 20 to the gas permeable material 30.

Other embodiments include the incorporation of more than one porous conductive material 20, for example more than one metallic mesh of the same type or more than one metallic mesh of different types (e.g. different pore sizes and/or different materials), and/or the use of more than one binder material. In an example composite electrode, a 200 LPI metal mesh (i.e. a first porous conductive material) was first bound to an underlying gas permeable material, after which a 50 LPI metal mesh (i.e. a second porous conductive material) was laid down and overcoated with a binder material. Hence, this example shows the use of two different porous conductive materials in association with a gas permeable material, and use of a binder material.

A key advantage of using a binder material in this manner is that the binder material 10 would typically penetrate the outermost pores of the gas permeable material 30 and thereby provide a porous connection between the gas permeable material 30 and the current carrying metallic mesh (i.e. the porous conductive material 20). The binder material 10 further ensures an intimate contact between the porosity of the gas permeable material 30 and the current-carrying capability of the porous conductive material 20. The use of a binder as described in this example may impart the electrode with amplified electrochemical properties at low applied current densities if the binder is applied in a careful and calibrated manner to thereby achieve optimum performance. By this is meant that the binder would preferably have to be selectively formulated and applied in a particular way, using particular quantities, at a particular location.

Example 4: Illustrative Example—Fabricating Electrodes by Drawing a Binder Material into the Outermost Pores of the Membrane Using a Vacuum Bar An expanded PTFE (ePTFE) membrane (manufactured by General Electric Corporation; pore size 0.2 micron) had a fine nickel mesh (200 line per inch; manufactured by Precision eForming Inc.) laid down upon the membrane. The polymer membrane and metallic mesh were then placed on a glass frit through which a partial vacuum was drawn. A binder material (15% Naftion in alcohol/water: supplied by Ion Power Inc., containing 20% by weight of a catalytic filler, such as particulate nickel, supplied by Sigma-Aldrich) was then applied to the polymer membrane and metallic mesh using a paintbrush. The partial vacuum pulled the binder material down through the holes in the metallic mesh and into the outermost pores of the polymer membrane. Sufficient binder material was applied to completely coat both the metallic mesh and the polymer membrane. After drying for 4 hours at 60° C., the metallic mesh was adhered to the polymer membrane.

Figure 7:
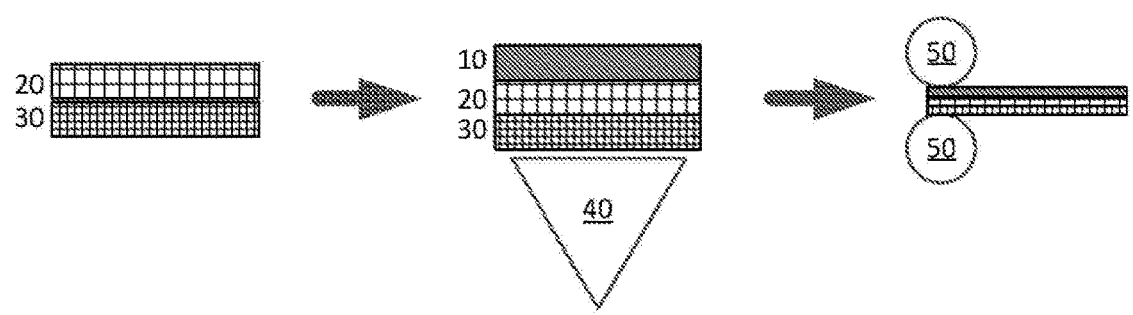
FIG. 7 schematically depicts an example process used to manufacture an example electrode according to Examples 4, 5 and 6 (not to scale).

In a generalised example, FIG. 7 illustrates the general concept of applying a pressure differential, for example by creating a vacuum, or at least a partial vacuum, on one side of the materials for example using a vacuum bar, during the deposition of a binder material. A gas permeable material 30 and a porous conductive material 20 are positioned adjacent to each other (left hand side in FIG. 7). Then a binder material 10 is applied over the porous conductive material 20 and a vacuum 40, or at least a partial vacuum, is applied or created on one side opposite the binder material 10 (middle section in FIG. 7). This fabrication method may be amended in several ways. For example, the binder material 10 may be applied to the gas permeable material 30 only while applying the vacuum, with the porous conductive material 20 then placed on top of the binder material 10, causing the porous conductive material 20 to adhere to the gas permeable material 30. Alternatively, the binder material 10 may be separately applied to the surface of the gas permeable material 30 (under vacuum) and the porous conductive material 20, with the coated, wet gas permeable material 30 and porous conductive material 20 then married up and dried.

A key advantage of using a vacuum in this way is that the vacuum may assist in providing a porous connection between the gas permeable material 30 and the current carrying porous conductive material 20. By drawing the binder material 10 into the outermost pores of the gas permeable material 30, the vacuum further ensures good adhesion and the best possible contact between the porosity of the gas permeable material 30 (e.g. polymer membrane) and the current-carrying capability of the porous conductive material 20 (e.g. metal mesh). The application of a binder as described in this example may impart the electrode with amplified electrochemical properties at low applied current densities if the binder is applied in a careful and calibrated manner to thereby achieve optimum performance.

Example 5: Illustrative Example—Fabricating Electrodes by the Application of a Binder Material, Followed by Lamination of the Assembly Using Pressures and/or Heat A further variation in the above techniques involves the application of pressure and/or heat during the step of attaching a porous conductive material 20 to a gas permeable material 30. For example, a porous conductive material 20 attached to a gas permeable material 30 using a binder material 10, as described in Examples 3 or 4, may be further treated by lamination under pressure and/or heat. For example, the expanded PTFE (ePTFE) membrane (produced by General Electric Company; pore size 0.2 micron) attached to a fine nickel mesh (200 line per inch; manufactured by Precision eForming Inc.) using a binder material (15% Nafion in alcohol/water; supplied by Ion Power Inc., containing 20% by weight of a catalytic filler, such as particulate nickel, supplied by Sigma-Aldrich), may be further subjected to pressure lamination (which may or may not include the addition of heat).

FIG. 7 illustrates the concept. As described in Example 4, a porous conductive material 20 is bound to a gas permeable material 30 by the application of a binder material 10 whilst applying a vacuum 40 to the other side of the gas permeable material 30 from the binder material 10. Then, referring to the right hand side in FIG. 7, the electrode structure may be pinched between pressure rollers 50 to compress the electrode structure into a robust, laminated electrode. The compression may optionally include elevated temperatures. The application of a binder as described in this example may impart the electrode with amplified electrochemical properties at low applied current densities if the binder is applied in a careful and calibrated manner to thereby achieve optimum performance.

Example 6: Illustrative Example—Fabricating a Catalytically Active Electrode by Screen-Printing a Binder-Catalyst Combination, Followed by Lamination of the Assembly Using Pressure In another practical example of fabricating an example electrode, a fine nickel mesh (200 lines per inch; manufactured by Precision eForming Inc.) is overlaid upon an expanded PTFE (ePTFE) membrane (General Electric Corporation, pore size 0.2 micron). This unattached assembly is placed on a vacuum bar. A screen-printing screen is then placed over the assembly and a layer of binder-catalyst material is printed onto the metallic mesh (i.e. the porous conductive material) and the polymer membrane (i.e. the gas permeable material). The binder-catalyst material comprised 5% Nafion in alcohols/water; supplied by Ion Power Inc., incorporating 50% by weight of nickel nanoparticles and micron-sized particulate nickel (1:1), supplied by Sigma-Aldrich, with solvent (1:1 alcohols/water) making up the rest. It should be appreciated that a variety of different binders and catalysts, in various mixtures, can be used.

The resulting printed polymer membrane and metallic mesh is then compressed using a pressure laminator by being passed between two rollers under high pressure. The binder-catalyst layer now exhibits a high gloss sheen and the metallic mesh is securely attached to the polymer membrane. In another example, a 100 LPI stainless steel mesh can be laminated by these means to an ePTFE membrane. In both cases the resulting composite 3D electrode is highly flexible and robust. The technique described in this example may impart the fabricated electrode with amplified electrochemical properties at low applied current densities if applied in a careful and calibrated manner to thereby achieve optimum performance.

Example 7: Illustrative Example—Manufacturing 3D Electrodes Using Spray-Coating

Binder materials may be applied by any convenient means, including but not limited to painting, spraying, dipping, printing, electro-coating, electroless coating, powder coating, or any other means of application. For example, one method with which to create 3D electrodes involves spray-coating one or more of the composite materials with a binder solution. For example, a PTFE membrane having 0.2 micron pore size (supplied by General Electric Corporation) and overlaid with a 200 LPI nickel mesh, was sprayed using a conventional spray-gun, with a conductive binder coating containing about 75% by weight nanoparticulate nickel (supplied by Skyspring Nanotechnology), about 2% Nafion (supplied by DuPont), and about 23% ethanol. The mixture was sprayed until the surface of the metallic mesh was just covered. After spraying, the binder coating was left to dry at about 60° C. in an oven for about 2 hours.

Scanning electron micrographs (SEM) of the surface of such a produced membrane that was sprayed with the binder coating typically showed a porous mass that penetrates into the pores of the membrane and ultimately covers the surface of the membrane. The thickness of the binder coating was easily varied by increasing or decreasing the time of spraying after the surface had been completely covered. Porometry measurements indicated that the coated membrane was nevertheless permeable to air in much the same way as the uncoated precursor membrane.

Example 8: Further Aspects of Example Gas Diffusion Electrodes (GDEs)

Further to the above examples, which are intended to be illustrative only and not limiting in any way, some of the novel features or properties of example electrodes of the present embodiments can be elucidated and explained. For the purposes of this example, we refer to the example electrodes described in Examples 1 and 4 above. That is, for the purposes of this illustrative example, we refer to the combination of an expanded PTFE (ePTFE) membrane (General Electric Corporation; pore size 0.2 micron) (i.e. a gas permeable material) overlaid with a fine nickel mesh (200 lines per inch; manufactured by Precision eForming Inc.) (i.e. a porous conductive material), optionally held together by a binder material, or a binder-catalyst material, including about 5-15° % Nation in alcohols/water (supplied by Ion Power Inc.), and about 20-50% by weight of fillers and/or catalyst material.

Figure 1:
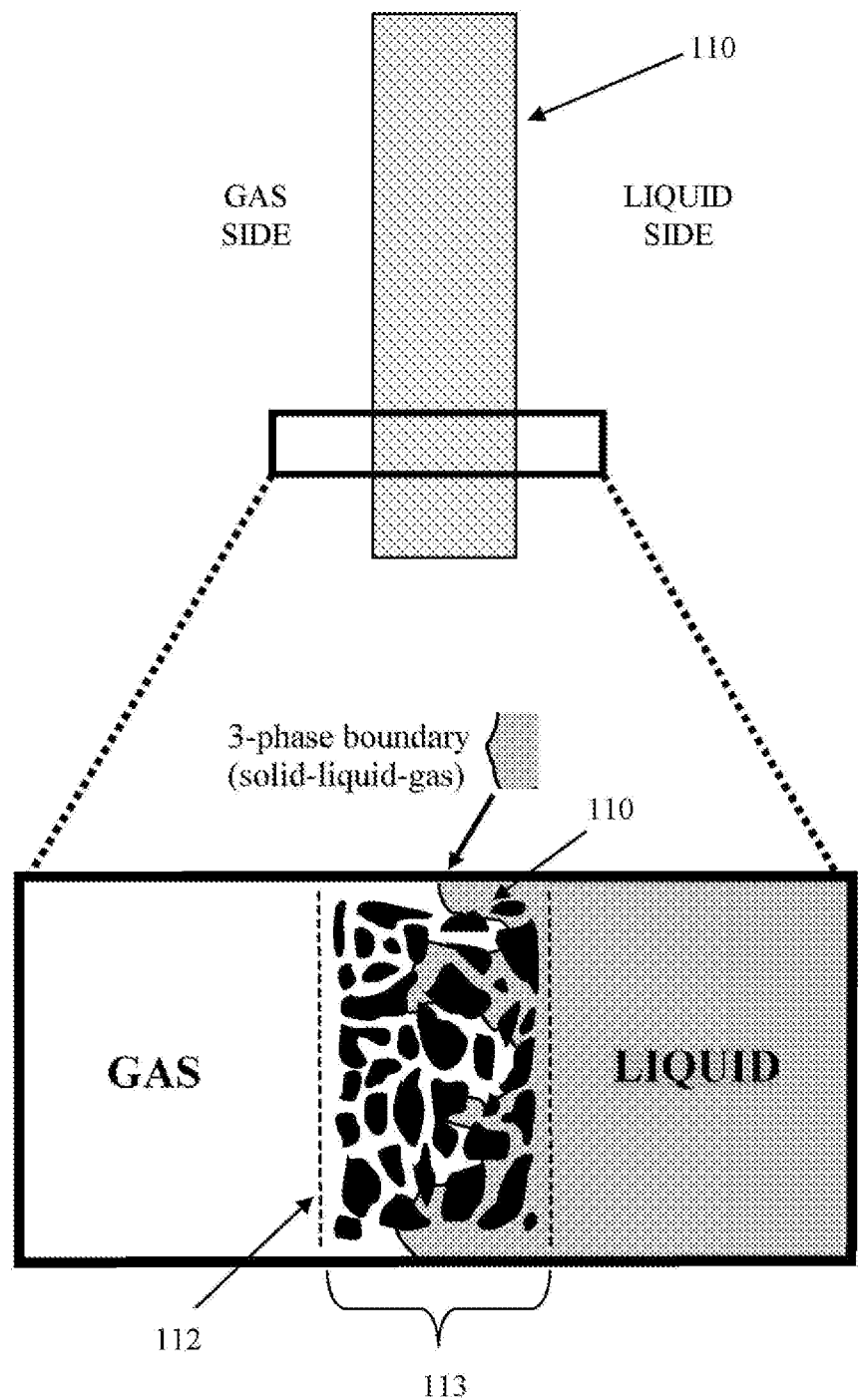
FIG. 1 (prior art) depicts in schematic form, a conventional gas diffusion electrode. The lower part of the figure is a magnified view of a section of the conventional gas diffusion electrode.

FIG. 1 depicts in a schematic form, a conventional gas diffusion electrode (GDE) 110, as widely used in industry at present (Prior Art). In cases where an electrode contains a zone or a layer that is intended to facilitate gas diffusion, FIG. 1 illustrates that gas diffusion layer or zone. FIG. 2 illustrates in schematic form the general structure of an example 3D electrode 115 of the present embodiments, such as those described in Examples 1 and 4 above. In a conventional GDE 110, conductive particles (such as carbon particles) are typically mixed with non-conductive, hydrophobic Teflon particles, and then compressed and/or sintered into a single unit whose pore structure is ill-defined and non-uniform. By contrast, in an embodiment of the present GDE 115, the porous conductive material 130 and the gas permeable material 120 are substantially demarcated or separated, although there can be overlap at a boundary region. The pore structure of the gas permeable material 120, for example a non-conductive, hydrophobic material/element, is well-defined and uniform.

Figure 8:
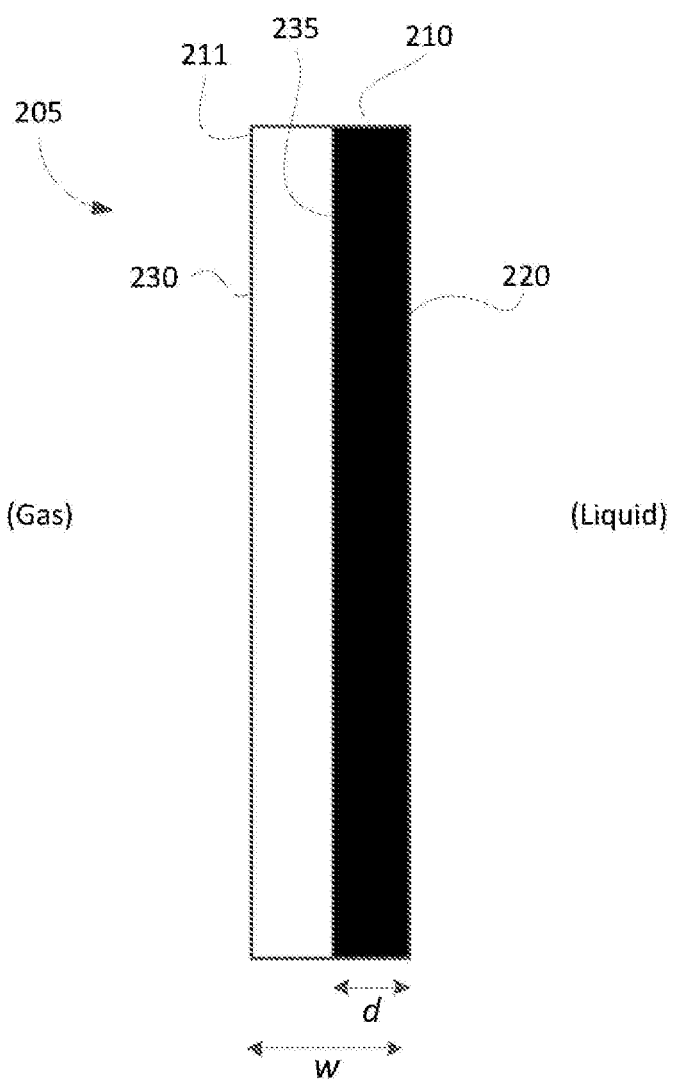
FIG. 8 depicts a schematic cross-sectional view of an example GDE (not to scale).

As can be seen in FIG. 8, the example 3D electrode 205 of width w includes a conductive layer or region 210 of width d with a non-conductive layer or region of width w-d. The dimensions are not accurate and are for illustration only. In the case of the electrode referred to in Example 1, the 3D conductive layer 210 (i.e. porous conductive material) comprises the fine nickel mesh, which has a thickness of about 5-8 μm, while the 3D non-conductive layer 211 comprises the ePTFE membrane, which has a thickness of about 20 μm. While the non-conductive layer or region 211 is thicker than the conductive layer or region 210 in this case, that need not be true in other cases of fabricated 3D electrodes. With other gas permeable materials and other techniques, this relative ratio may be quite different, with conductive layers or regions 210 being thicker and the non-conductive layers or regions 211 being thinner.

For example, in the case of the electrode referred to in Example 4 (where a binder material was applied with a paintbrush), the conductive layer comprised the fine nickel mesh and the binder material. The thickness of the binder material providing a binding layer was not easily controlled using a paintbrush, so that thicknesses of a binding layer of up to about 112 μm, for example, may be created. The binder material, moreover, penetrated the outermost portion of the ePTFE layer or membrane (to about 0.1-0.8 μm deep), so that the conductive portion may be cumulatively up to about 120 μm in thickness. The non-conductive portion would typically be about 19.2-19.8 μm thick. Thus, in such a case, the three-phase solid-liquid-gas boundary will fall within a maximum thickness of 0.8+120=120.8 μm. Such large thicknesses generally represent an extreme in the case of GDEs of the present embodiments, although thicknesses of 400-500 μm have also been achieved in the most extreme cases. Generally, but not exclusively, GDEs of the present embodiments formed by lamination of free-standing porous metallic structures to ePTFE membranes will have a three-phase solid-liquid-gas boundary that is less than about 100 μm thick.

In conventional GDEs, the entire GDE is conductive and different pore sizes and intermediate amounts of Teflon binder within the GDE, are used to create the solid-liquid-gas boundary that is formed inside the conventional GDE. However, because the pores in conventional GDEs are created by fusing layers of different particle size, there is relatively poor control on the pore size and distribution. The pores are therefore of a generally wide and non-uniform distribution. Moreover, the pores are generally large, being, at best, typically 30 microns in diameter at the outside edges of the GDE. The solid-liquid-gas boundary that is created within the GDE is therefore poorly controlled and ill-defined, with substantial variations in depth within the GDE Small changes that occur during use of the GDE may therefore also shift the interface, causing the GDE to be prone to instability or even breakdown. Thus, a common problem in gas-liquid electrochemical transformations is flooding of the GDE. This occurs when the solid-liquid-gas boundary progressively relocates itself into the center of the GDE, until the GDE is effectively filled with liquid.

Whereas a conventional GDE relies upon the presence of larger pores in the center to provide for low-pressure ingress of gases to the interface, example GDEs of the present embodiments rely upon a substantial, large, relatively large or substantially large non-conductive layer or region 211 relative to the volume of the interface 235 with the conductive layer or region 210, to provide for low-pressure ingress of gases.

One advantage involves hitherto unavailable uniformity in how electrochemical gas-liquid reactions take place down the full length of the 3D GDE. Because the solid-liquid-gas boundary is so tightly constrained and uniform, such reactions will essentially occur in an identical way at all points of the interface along the length of the electrode. Practical problems arising from inhomogeneity and instability in the interface, as occur in many conventional GDEs, may therefore be largely eliminated. These include, without limitation, local excesses (or swamping/flooding) of reactants/products, leading to inefficient reaction, energy wastage (e.g. local hotspots), or electrode degradation. Moreover, once created, the interface is relatively stable and easily maintained— more stable and easily maintained that conventional GDEs. These properties result in 3D electrodes that may be more active per unit electrochemical area or per unit volume of catalyst than comparable conventional GDEs.

Another feature is that the solid-liquid-gas boundary is relatively delicate. By this it is meant that the solid-liquid-gas boundary can be degraded (reversibly and temporarily) by non-judicious applications of gas pressure (from the gas-facing side). For example, even relatively small overpressures on the gas side of the GDE can push the liquid out of the conductive layer, diminishing the surface area of the boundary. This will occur at the so-called "bubble point" of the membrane polymer layer. In the extreme case, the liquid may even be pushed away from the electrode, effectively, destroying the solid-liquid-gas boundary or making it so small as to be practically useless. Moreover, in such a situation, gas bubbles may become trapped in the conductive layer or region 210, making it difficult (but not impossible) to regenerate the electrode. To avoid these possibilities, it is generally desirable or necessary to closely control external gas pressures and ensure that the conductive layer or region 210 is properly "wetted" prior to operation. Once operating, GDEs of the present embodiments are generally highly stable. While the solid-liquid-gas boundaries are "delicate" in that they may be destroyed or disrupted upon the application of excesses of pressure, it should be noted that the pressures required to disrupt the three-phase boundaries are much higher than is the case in conventional GDEs. That is, the three-phase solid-liquid-gas boundaries in example GDEs are much less delicate than is the case for conventional GDEs.

Considering another aspect of example electrodes, there are various ways to measure air permeability of a material. For example, porosimietry can be used to determine the flow rate of air through membranes and coated membranes in units of liters per minute (L/min) as a function of applied pressure (in units of psi). Another way to measure air permeability is to use the 'Gurley number' scale, which is obtained with a Gurley densitometer. This measures the time (in seconds) taken to pass a particular fixed volume of air (2.5 cm$^3$) through a sample of fixed area (0.645 cm$^2$) at a fixed applied pressure (0.44 psi). The air permeability of the sample is inversely proportional to the Gurley number. That is, the larger the Gurley number, the less permeable to air is the sample.

Present example 3D electrodes, for example using a treated or coated ePTFE membrane, have an air permeability that is very similar to that of the untreated or uncoated ePTFE membrane, at all measured applied pressures. By contrast, the air permeability of a conventional gas diffusion electrode using a Gortex™ membrane as an 'electrolyte leakage barrier' declines very substantially. For example, Gortex™ membranes used in conventional gas diffusion electrodes typically have Gurley numbers of 50-800 seconds. In one example, after they were laminated to a conventional gas diffusion electrode, their Gurley number increased to about 9,000-16,000 seconds. This means that it took 20-180 times longer to transfer the same quantity of air through such an electrode (with a Gortex™ membrane) as it took to transfer the same quantity of air through the Gortex™ membrane only.

Thus, in some particular example 3D electrodes according to present embodiments, an advantage is that the 3D electrodes have improved permeability to air, or are substantially permeable to air, whereas conventional 3D electrodes are less so. That is, in one example, the air permeability of the 3D electrode is similar to, about equal to, the same as, or is substantially similar to, substantially about equal to, or substantially the same as, the air permeability of the gas permeable material (e.g. polymer membrane).

Example 9: Illustrative Example—Novel Properties of Example Gas Diffusion Electrodes (GDEs)—the Effect of Pressure and Temperature on Energy Efficiency and Flooding A feature of example GDEs of the present embodiments is that they allow for the application of a higher pressure to the liquid electrolyte than is present on the gases in the GDE. High liquid pressures (relative to the corresponding pressure of the gas on the gas-facing side of the GDE) often have the effect of improving the energy efficiency of electrochemical reactions. By contrast, conventional GDEs typically can only deal with very low liquid pressures before they flood (and thereby become inoperable).

For example, GDEs containing as their polymer layer, a General Electric Corporation PTFE membrane with average pore size 0.2 μm (used for membrane distillation in the water purification industry), are typically able to withstand up to about 3.4 bar of liquid pressure before they flood. This is because the PTFE membrane has a wetting pressure (or "water-inlet" pressure) of 3.4 bar. Thus, an electrochemical cell employing such GDEs may have its liquid electrolyte pressurised up to 3.4 bar higher, in this case, than the pressure of the gases in and on the gas-facing sides of the GDEs. Many electrochemical processes involving gas-to-liquid or liquid-to-gas transformations are favourably affected by differential pressures of this type. Such a large pressure differential may therefore have the effect of substantially increasing the energy efficiency of the half-reaction which occurs at the GDE electrode. That is, one may achieve a particular rate of production at a lower applied cell voltage than was otherwise needed.

By contrast, conventional GDEs typically have wetting pressures below 0.2 bar, meaning that they flood upon the application of more than 0.2 bar to the liquid electrolyte. The option to apply higher differential pressures above 0.2 bar to liquid electrolytes in such cases, is therefore not available. Thus, in one example embodiment, an electrochemical cell employing a GDE can have its liquid electrolyte pressurised to at least 0.2 bar and up to about 3.4 bar higher than the pressure of the gases in and on the gas-facing sides of the GDE.

A second feature of example GDEs of the present embodiments is their unusual properties at increasing temperatures. One effect of higher temperatures is to increase the amount of water vapour within a GDE and therefore also to increase the potential for condensation of that water vapour (flooding) within the GDE. An example GDE, with a high wetting pressure of, for example, 3.4 bar, is far less easily wet (if not being, effectively un-wettable) than a conventional GDE with a wetting pressure of 0.1 bar. For this reason, the conventional GDE will be at greater risk of flooding with increasing temperature than a GDE of the present embodiments with a higher wetting pressure (e.g. 3.4 bar).

Thus, cells employing example GDEs of the present embodiments may have their liquid electrolyte heated to higher temperatures than those having conventional GDEs, without risk of flooding the GDE. For many electrochemical processes, higher temperatures have the effect of improving the energy efficiency of the half-reaction at the electrode and thereby the increasing the energy efficiency of the overall process. Moreover, most electrolytic cells are "self-heating" in that the excess energy which must be applied to drive the reaction, is released as heat.

Example 10: Illustrative Example—Adding an Additional Barrier Layer to Exclude Water Vapour from the Gas Stream in GDEs A feature of all Gas Diffusion Electrodes is that, being gas permeable, they permit gaseous water vapour from the liquid (water) side of the electrode to permeate through the GDE into the gas stream. For liquid-to-gas transformations like water-electrolysis to form hydrogen gas, this contaminates the product gas stream with water. For example, at a temperature of about 70° C., the hydrogen gas product stream from electrolytic water-splitting may contain several percent of water, necessitating the use of dryers to purify the hydrogen. Moreover, the water vapour may condense to form liquid water within the gas stream, which may hinder or block the flow of gases and may ultimately even flood the gas channel.

Example gas diffusion electrodes of the present embodiments may, however, be readily adapted to exclude, or largely exclude different gases, such as water vapour in one example, from passing through the GDE, from the liquid (water) side to the gas side. This may be achieved by incorporating a barrier layer or film that is highly permeable to the desired gas stream, but relatively less permeable to an undesired gas, such as water vapour transport. Examples of suitable barrier layers or films include organosilicon polymer films, or perfluorocarbon polymers, especially hyperbranched perfluorocarbon polymers, or mixtures thereof.

Figure 9:
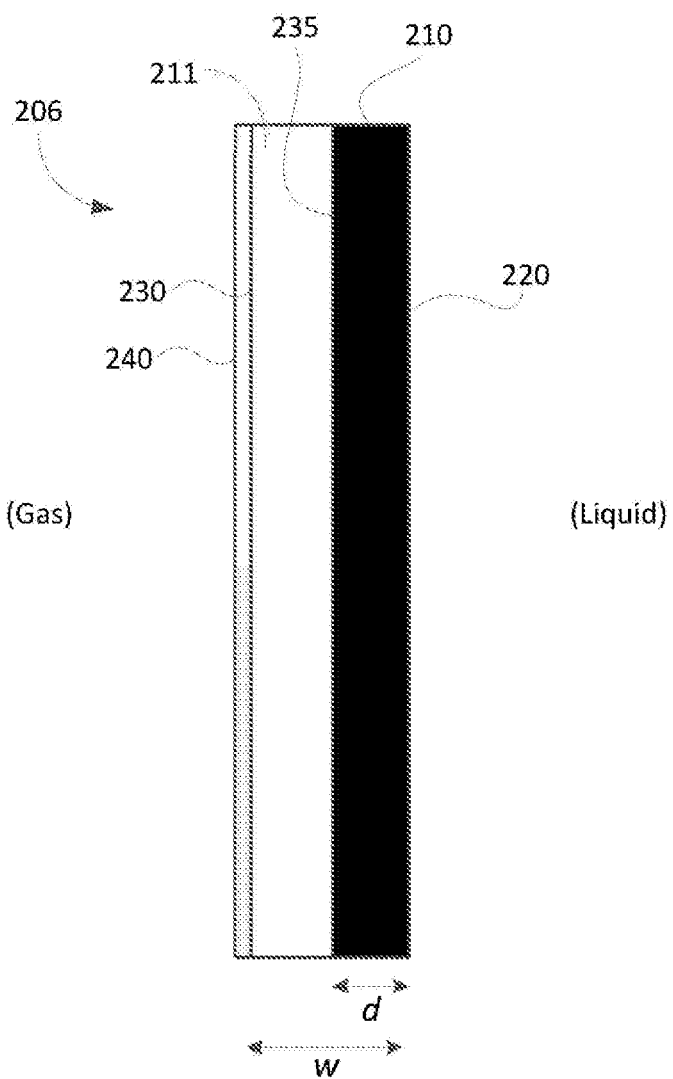
FIG. 9 schematically illustrates an example GDE modified by adding a barrier layer (not to scale).
Figure 10:
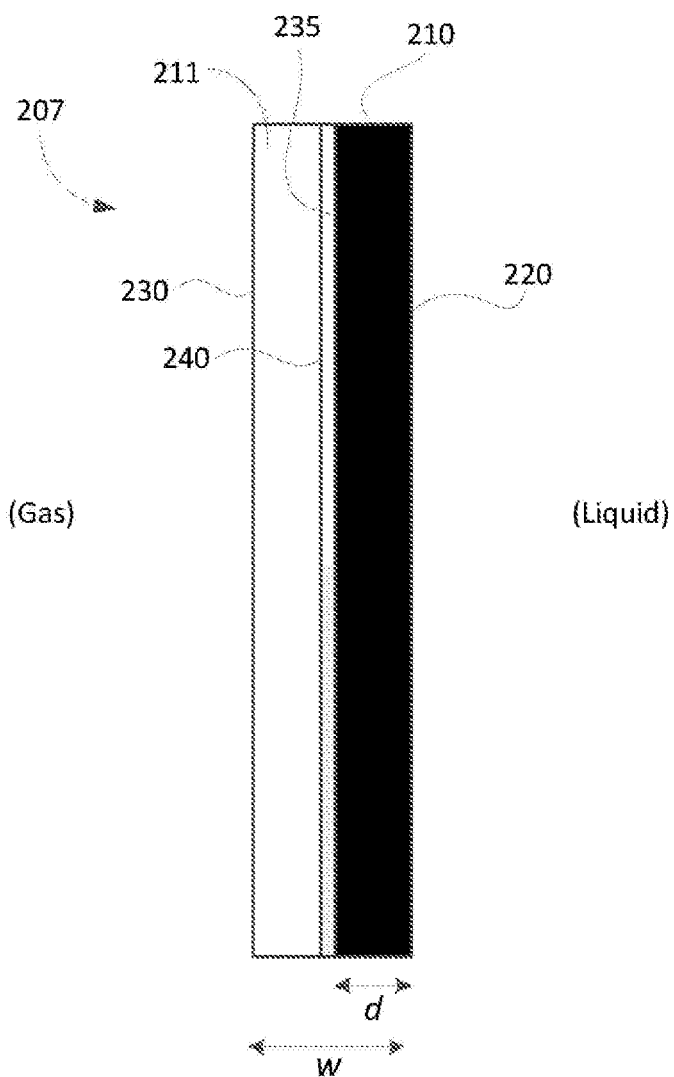
FIG. 10 schematically illustrates another example GDE provided with a barrier layer (not to scale).

FIG. 9 illustrates an example 3D electrode 206 in which a barrier layer or film 240 is incorporated into the example GDE. In FIG. 9, a barrier layer or film 240 of the above type has been introduced on the gas stream side of the GDE 206. In FIG. 10, a barrier layer or film 240 has been introduced at the interface 235 of the GDE 207. In both cases, the barrier layer or film 240 substantially allows transport of the desired gas stream, but hinders or blocks transport of undesired gas, in this example gaseous water vapour.

Example 11: Illustrative Example—Fabricating Novel Double-Sided GDEs

Figure 11:
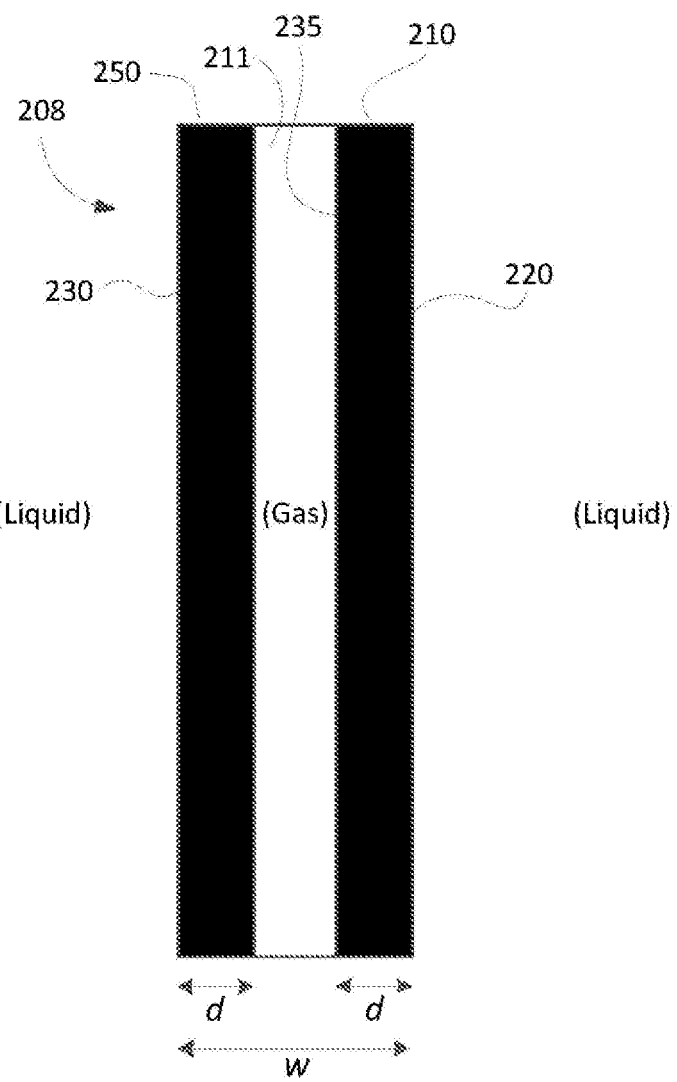
FIG. 11 depicts a schematic side view of an example GDE in which the two outer surfaces are both conductive (not to scale).

FIG. 11 schematically illustrates a GDE 208 in which a gas permeable material, such as a gas permeable polymer layer, has been laminated with, or attached to a porous conductive material, such as a conductive metallic layer, on both of its sides. The second conductive layer 250 may be applied to the GDE 208 at the same time as the first conductive layer 220. Alternatively the second conductive layer 250 may be applied after the first conductive layer 220 is applied. The same means of fabrication described in the earlier examples, or other means, may be used to generate the double-sided GDE 208.

Regardless of its method of manufacture, the effect of having metallic layers, regions or coatings on both sides of the GDE 208 is to make the central, non-conductive core or region 211, also a channel along which gases can pass. The outer metallic layers, regions or coatings face the liquid phase (e.g. in one example water). The resulting membranous gas channel 211 within the body of such a double-sided gas diffusion electrode 208 may be remarkably permeable to gases. That is, the resulting gas channel may be able to accommodate and carry unexpectedly large quantities of gas even at atmospheric pressure. For example, in a particular but non-limiting application, when acting as a cathode in a water electrolysis cell operating at a current density of about 10 mA/cm$^2$ (which results in the generation of 1000 liters of hydrogen per day per square meter of electrode geometric surface), such a double-sided gas diffusion electrode 208 can extend up to about 2.5 meters away from an attached hydrogen collection apparatus without the inner gas channel of the electrode 208 becoming saturated and unable to carry more hydrogen at any point along its length. Such a double-sided GDE 208 may be used by dipping into a solution of electrolyte, with gas fed to or from the non-conductive central region or core 211.

Examples 12-15: Fabricating Electrodes by Applying Conductive Metal Structures

Example 12: Illustrative Example—Fabricating Electrodes Using Deposition of Conductive Metals In other alternative examples there are provided 3D electrodes which include a gas permeable material and a porous conductive material partially coating the gas permeable material. Referring back to FIG. 8 to illustrate this electrode structure, the porous conductive material penetrates the gas permeable material to a depth (d) less than the thickness (w) of the gas permeable material. For example, the depth is between about 5 nanometers to about 0.4 millimeters, dependent on sufficient thickness of the gas permeable material, e.g. gas permeable membrane. Alternatively, in another preferred form, the depth is between about 1/100,000$^{th}$ to about 1/1.5$^{th}$ of the thickness of the gas permeable material.

A conductive layer is formed at one surface of the 3D electrode and a non-conductive layer is provided or formed at the other, opposing, surface of the 3D electrode. The conductivity of the 3D electrode thus varies along the thickness of the 3D electrode. The conductive layer is gas permeable and at least partially liquid permeable, whereas the non-conductive layer is gas permeable and liquid impermeable. The conductive layer is part of an outer surface of the 3D electrode and is relatively less hydrophobic than the gas permeable material, whereas the bulk 3D electrode is gas breathable and liquid impermeable. In other example forms: when used as a GDE, a three-way solid-liquid-gas boundary is formed within the 3D electrode; the solid-liquid-gas boundary is narrow in macroscopic width compared to the thickness of the 3D electrode or the gas permeable material. For example, the solid-liquid-gas boundary may be up to 850 nm wide.

Generally, for the examples discussed here, there is provided a process for preparing a 3D electrode or a GDE, comprising the steps of: a fabrication step to fabricate the 3D electrode or a GDE, including determining or setting a width of a three-phase solid-liquid-gas boundary, preferably where the width is narrow in relation to the width of the 3D electrode or a GDE; and an operation step to operate the 3D electrode or a GDE, preferably in a cell, at low current density, for example from 1 mA/cm$^2$ to 500 mA/cm$^2$, or from 1 mA/cm$^2$ to 200 mA/cm$^2$, or from 1 mA/cm$^2$ to 100 mA/cm$^2$, inclusively.

Referring back to FIG. 8 as a structural illustration for this alternative example, where the metallic and/or binder material has penetrated the pores of the non-conductive layer or region 211 the conductive layer or region 210 closest to the interface 235 or boundary region may also have a pore structure and other properties (e.g. hydrophobicity, wetting, and gas/liquid permeability), that are essentially identical, or, at least, very similar, to that of the non-conductive layer or region 211. In such a case, the boundary region or interface 235 between the layers or regions 210, 211 is not so much characterised by a structural change, as by an electrical change. It is, effectively, only a boundary region or interface of electrical conductivity. On one side of boundary or interface 235, layer or region 210 is conductive or somewhat conductive, whereas on the other side of boundary or interface 235, layer or region 211 is non-conductive. Moreover, on both sides of the boundary, boundary region or interface 235, the pores are uniform and small (about 0.2 micron in this case, although smaller pores can be obtained using other membranes). For this type of example 3D electrode, there is a substantially uniform or highly uniform pore structure and distribution, especially about the conductive-non-conductive boundary, which can be readily varied by merely selecting a different membrane to use as a gas permeable material. Important other properties (e.g. hydrophobicity, wetting, and gas/liquid permeability) are also unchanged on both sides of the interface 235.

The gas permeability of the conductive layer or region 210 is, moreover, either identical to or greater than that of the non-conductive layer or region 211 (except, of course, in the non-optimum case where the membrane has been blocked by an over-thick application of the conductive layer). Thus, gases may readily and uniformly pass through the electrode 205 (in this alternative example). The gas permeability of the 3D electrode 205 is, additionally, readily characterizable, being created by and being substantially the same as that of the uncoated gas permeable material, for which gas permeability data may routinely exist. The liquid permeability of a 3D electrode depends largely or even entirely on the gas permeable material and the liquid with which it interacts. A hydrophilic polymer allows a hydrophilic liquid to pass through evenly and uniformly. The same is true for a hydrophobic polymer interacting with a hydrophobic liquid. In the case where there is a mismatch between the polymer and the liquid, an interface is created between the liquid and the 3D electrode. The extent and nature of that interface depends on the materials involved.

In further various examples, the wetting pressure for the GDEs is the same as that of the polymer layer or membrane used (for example the General Electric Corporation membrane of 0.2 μm average pore size), which is about 3.4 bar. Thus, only upon the application of 3.4 bar of pressure on the liquid side does liquid water penetrate and pass through the membrane, thereby flooding the membrane. By contrast, all other GDEs known to the Applicant have wetting pressures that do not exceed 0.2 bar.

In various further examples: a porous conductive material or layer is provided at least partially within the gas permeable material; the porous conductive material or layer is associated with the gas permeable material; the porous conductive material or layer is located on and within the gas permeable material; and/or, the gas permeable material is located on and within the porous conductive material or layer. Preferably, though not necessarily, the conductive material is a metal, which after being applied is in the form of the porous conductive material. For example, the conductive material forming the porous conductive material can be Nickel. Alternatively, the metal could be Ti, Cr, Pt, Cu, Pb, Sn, Co, Mn, Au or Ag. Further, the porous conductive material could be formed of carbon black particles.

In further examples, the depth (d) of the conductive layer or portion is in the range of about 1 nm to about 10 μm, or about 50 nm to about 1 μm, or about 50 nm to about 500 nm. In a specific example, the porous conductive material is formed of Nickel, the gas permeable material is a 0.2 micron PTFE membrane and the depth is greater than 0 and less than about 850 nm.

In an example method of fabricating this form of 3D electrode, the steps include selecting a gas permeable material, for example with a substantially uniform pore size, and then applying, as a calibrated step, a conductive material to partially coat the gas permeable material, thereby forming a porous conductive material. The porous conductive material penetrates the gas permeable material to a depth less than the thickness of the gas permeable material. The calibrated step can include: a particular mode of application; a particular time or period of application; a particular electrical current or range of current of application; a particular temperature or range of temperature of application; and/or a particular circumstance or range of circumstances of application. The ideal conditions by which the calibrated deposition is performed, are typically determined by a program of study to realise a suitably narrow and well-defined solid-liquid-gas boundary in the desired range of widths, such as from 50 to 850 nm width. In one example, the conductive material can be Nickel and can be applied by vacuum deposition at a loading of greater than about 0.455 g/m$^2$ and less than about 3.64 g/m$^2$. Preferably, in this particular example, the Nickel is provided at a loading of about 1.82 g/m$^2$, which has the effect of imparting the electrode with unexpectedly amplified electrochemical properties when operated at a current density of 10 mA/cm$^2$ in the manufacture of: (i) pure oxygen from air oxygen, (ii) hydrogen peroxide from aqueous alkaline solution, or (iii) electrical potential and current in an alkaline fuel cell (or a direct methane fuel cell when a coating of Pt is used having 100 nm thickness) (see section entitled: "Some General Advantages of Example GDEs).

Calibrated or careful application of one or more electrically conductive materials to gas permeable materials, for example porous polymer membranes, using controllable coating techniques can be used to produce 3D electrodes. When formed in a calibrated manner, one or more conductive layers may form part of a 3D electrode with unexpected and improved electrochemical performance, especially relative to other 3D electrodes and to the cost of manufacture. Further layers, for example including catalytic or other materials, can be conveniently added to, or formed upon the one or more conductive layers to produce more complex 3D electrodes that are practical and useful in electro-energy or electro-synthetic applications.

Example gas permeable or breathable 3D electrodes can be formed by depositing a conductive material or layer on a gas permeable material and, optionally, subsequently depositing a catalyst on the conductive material or layer. In one example, one could start with a gas permeable non-conductive material and then form the conductive material or layer on the gas permeable non-conductive material, and thereafter, deposit one or more catalysts.

In the case of an example 3D electrode manufactured in this manner, and referring back to the structure illustrated in FIG. 8, a gradual change in hydrophobicity exists in moving from the outside surface 220 through the conductive layer or region 210 which may penetrate the gas permeable material to depth d. The outer metal-binder surface 220 is relatively less hydrophobic, but this becomes more hydrophobic on moving into the non-conductive layer or region 211 toward the highly hydrophobic, non-conductive surface 230. The distance over which this hydrophobicity changes may be small, in one example being effectively only the depth into which the binder material penetrates the gas permeable material, for example in the case of ePTFE pore structure about 0.1-0.8 μm. This is narrower than the depth d, which defines or approximates the thickness of the conducting layer (for example about 8 μm to about 120 μm in some examples).

Thus, for this particular 3D electrode, a liquid solvent like water is likely able to partially penetrate at least some of the way into the conductive outer layer or region 210, which in one example form may be provided by applying or depositing a metallic coating. But water will be repelled and unable to penetrate into the highly hydrophobic interior. The liquid is therefore limited to, in one example the about 0.1 μm to about 0.8 μm thick outermost portion of the ePTFE, which has a high internal surface area, most of which may be conductive (after attachment of the metallic coating). The ingress of liquid water into the electrode 205 is therefore tightly controlled and a solid-liquid-gas boundary is created within, in one example, the outermost layer of about 0.1 μm to about 0.8 μm in depth. At this interface, gas from the non-conductive side 230 of the electrode 205 encounters liquid ingression from the outside of the membrane, at the conductive, metallized region.

According to various aspects provided by way of example:

(1) Carefully calibrated application of one or more conductive materials to gas permeable materials, such as porous polymer membranes, using controllable coating techniques can produce 3D conductive electrodes of remarkable and unexpected robustness, activity, and electrochemical area per unit volume, and which, when configured for gas-to-liquid and/or liquid-to-gas processes, display uniquely well-defined, narrow, and stable three-way solid-liquid-gas boundaries;

(2) When applied in a calibrated manner, conductive layers of this type constitute the formation of a 3D electrode with unexpected and amplified electrochemical performance, especially relative to other 3D electrodes and to the cost of manufacture;

(3) Additional layers including catalytic or other materials may be conveniently added to, or formed upon the conductive one or more layers to yield more complex 3D electrode structures that are practically useful in, especially, electro-energy or electro-synthetic applications;

(4) The availability of 3D electrodes, for example fabricated as described in points (1)-(3) above, makes viable or improves the practicality of a range of electro-energy and electro-synthetic applications. Such applications are typically unviable or relatively less practical using conventional fixed-bed or gas diffusion electrode technologies.

In various example forms, the coating techniques include but are not limited to metal vacuum-coating, sputter-coating, dip-coating, electroless- and electro-coating, powder-coating, and the like. In various example forms, the catalytic or other layers are applied by techniques, including but not limited to: electro- or electroless-coating, powder-coating, dip-coating, vacuum-coating, and the like. While coating techniques such as these have been previously applied to membranes which have subsequently been used to facilitate electrocatalytic transformations, the inventors have found that such metal-coating can be optimised in a different way, which provides for novel and improved catalytic properties, especially, but not exclusively, when operated at low current density. The unique mode of optimisation in such cases is directed at achieving a well-defined and narrow solid-liquid-gas interface during operation as a GDE, such as having a thickness of from about 50 to about 850 nm.

Optionally, but preferably, the 3D electrode is flexible. Optionally, but preferably, the gas permeable material is made at least partially or wholly from a substance that is flexible, for example at least partially or wholly from a polymer or a combination of polymers, for example PTFE, ePTFE, polyethylene, polysulfone or polypropylene. The polymer itself may or may not be gas permeable. For example, the polymer itself may not be gas permeable but a structure or membrane formed from the polymer is gas permeable.

Example 13: Illustrative Example—Fabricating Electrodes Using Vacuum (Sputter) Deposition of Conductive Metals Here we provide examples of calibrating metal deposition to achieve a suitably narrow solid-liquid-gas boundary, which provides for amplified catalytic properties. Commonly available membranes formed of expanded polytetrafluoroethylene (ePTFE), which are non-conductive, can be obtained with average pore size 0.1 µm, as supplied by the company Cobetter filter, and average pore size 0.2 µm, as supplied by General Electric (GE). The membranes comprise of extremely fine, 3D fibrous networks that have a high internal surface area. Moreover, the membrane pores are relatively tiny and relatively uniform. That is, they have a pore network that is well-defined.

Figure 12:
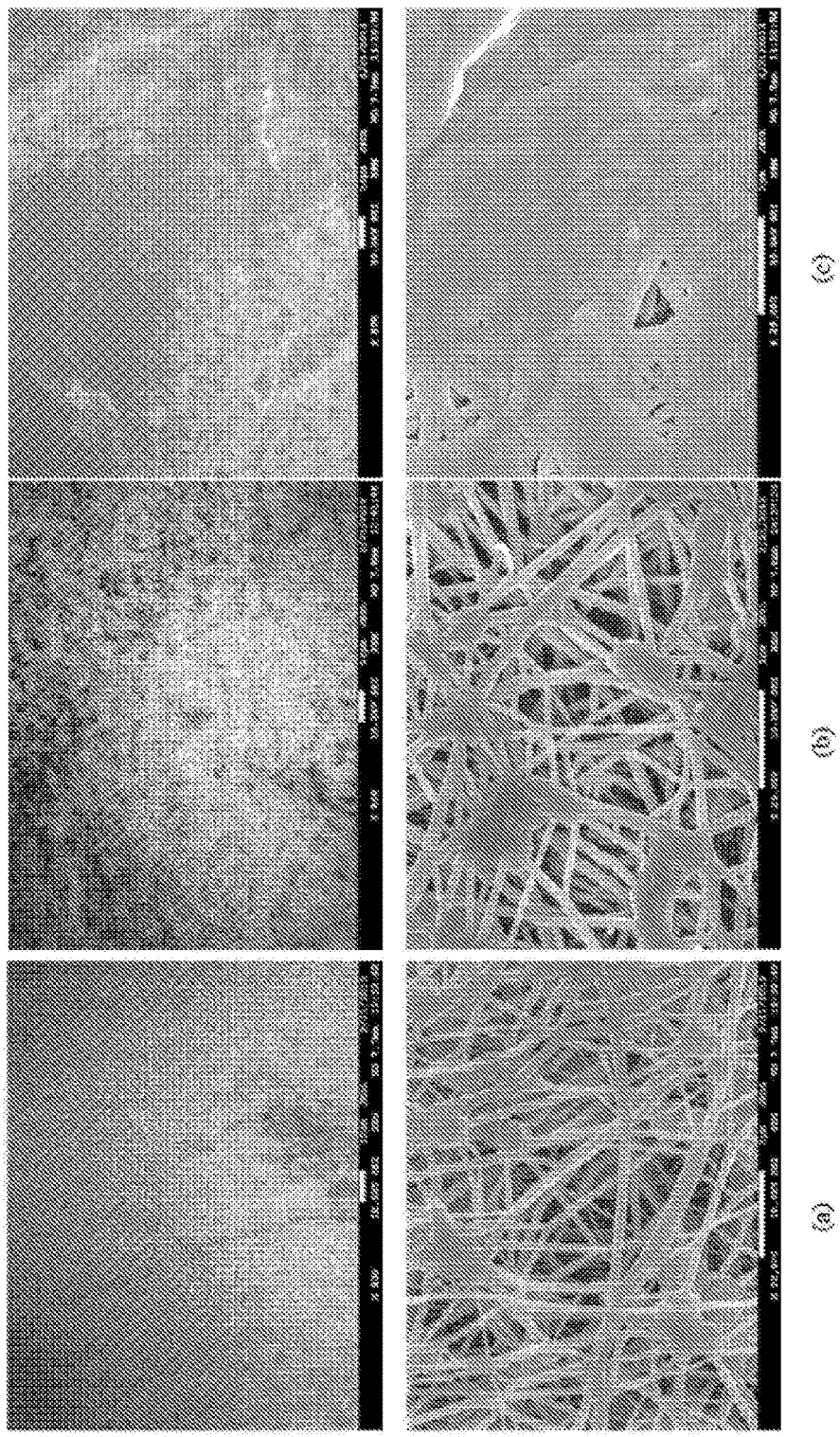
FIG. 12 depicts scanning electron micrographs (SEM) at different magnifications of a GE PTFE membrane with pore size of 0.2 μm, after vacuum coating with Nickel in the following example loadings: (a) (left) 0.455 g/m$^2$; (b) (center) 1.82 g/m$^2$; (c) (right) 3.64 g/m$^2$.

FIG. 12 shows the surface of a GE membrane of average pore size 0.2 µm after it has been subjected to metal vacuum coating (sputter-coating) with varying loadings of nickel. Although nickel is described as a preferred example, various other metals or conductive materials can be used, either individually or in combination, such as any of the transition metals. Although a wide range of conductive materials, such as metals or carbon, can be suitable as one or more conductive layers, particularly suitable are the stable oxide-forming metals such as Ni, Ti and Cr, or Cu, or the noble metals such as Pt, Au, Ag.

FIG. 12(a) (left-most set of images) depicts the membrane after the vacuum deposition of 0.455 g of nickel per 1 square meter of geometric area. When deposited on a non-porous solid substrate, this loading yields a uniform layer of nickel about 50 nm thick. As can be seen, in FIG. 12(a), the fibrous network of the membrane remains relatively unchanged, with each of the fibres simply coated with a thin layer of nickel. Conductance measurements indicated that the nickel-coated surface of the membrane is conductive, albeit with a relatively high resistance (in the order of 1-100 kΩ/square). The membrane has therefore been transformed into a 3D electrode, albeit a relatively poor one, by the coating process.

FIG. 12(b) (middle-set of images) depicts the membrane after the vacuum deposition of 1.82 g of nickel per 1 square meter of geometric area. When deposited on a non-porous, solid substrate, this loading yields a uniform layer of nickel about 200 nm thick. As can be seen, in FIG. 12(a), the fibres in the fibrous network of the membrane have been noticeably thickened by the deposition process with "knots" of particularly thick nickel visible. The pore structure, porosity and high internal surface area of the membrane remain intact. Because of the thicker coating, the conductance of the membrane surface is also improved, in the order of <10 Ω/square. The nickel coated membrane is therefore clearly a true 3D electrode, with a high internal conductive surface.

FIG. 12(c) (right-most set of images) depicts the membrane after the vacuum deposition of 3.64 g of nickel per 1 square meter of geometric area. When deposited on a non-porous, solid substrate, this loading yields a uniform layer of nickel about 400 nm thick. As can be seen, in FIG. 12(c), the fibres in the fibrous network of the membrane have been so thickened by the deposition process that the surface of the membrane is effectively covered. The pore structure, porosity and high internal surface area of the membrane is thereby destroyed, so that the membrane no longer can serve as a true 3D electrode.

Figure 13:
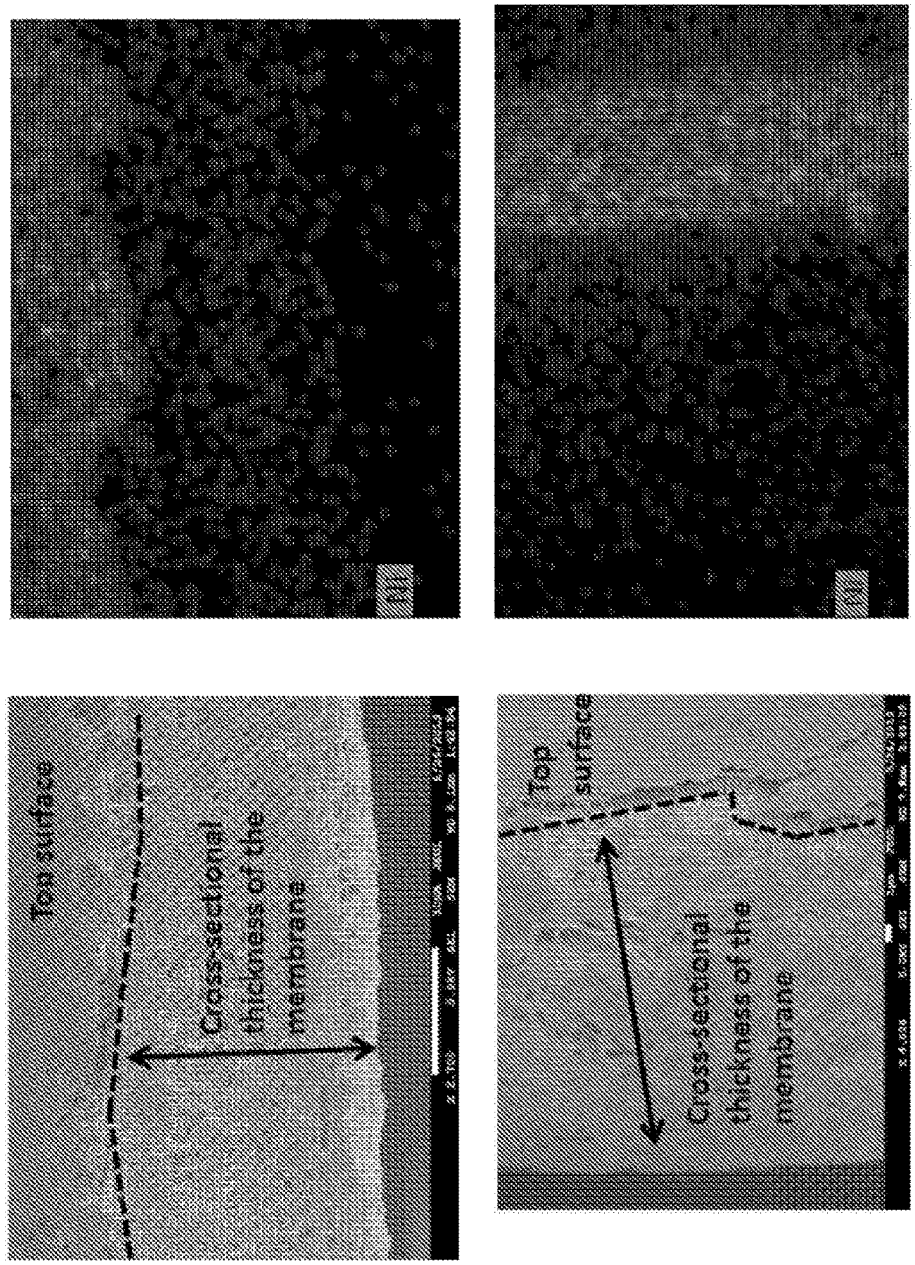
FIG. 13 depicts: (a) scanning electron micrographs (SEM) of a GE PTFE membrane with pore size of 0.2 μm, after vacuum coating with Nickel for the example loading 1.82 g/m$^2$ (left hand side images); (b) overlay images created using Energy Dispersive X-ray (EDX) to image only the Nickel atoms, which appear as light coloured areas, all other elements appear as black (right hand side images).

To characterise the thickness of the nickel coating on the membrane from FIG. 12(b), it was cryogenically frozen, cracked, and a cross-section at the fracture was examined using scanning electron microscopy (SEM). The resulting images are depicted in FIG. 13. FIG. 13(a) show SEM images of the cross-section, viewed from laterally above the top surface of the exposed edge. The cross-sectional thickness of the membrane is greater than 20 microns. FIG. 13(b) depicts overlays to the images in FIG. 13(a), that were generated using Energy-Dispersive X-rays (EDX), tuned to image only nickel atoms. The nickel atoms appear as white/grey areas in FIG. 13(b); all other atoms appear as black areas. As can be seen, EDX indicates that the vacuum-deposited nickel layer is limited to the very top of the membrane, in a layer of thickness about 850 nm. Note that this thickness denotes only the extent to which the nickel atoms have penetrated the porous membrane structure during the deposition technique. The entire 850 nm layer is unlikely to be conductive. The uncoated membrane is highly hydrophobic, i.e. water-repelling. This is to be expected for a membrane formed from PTFE polymer. However, the nickel coated surface is somewhat less hydrophobic.

Table 1 depicts the contact angles of a GE PTFE membrane with pore size of 0.2 µm, after vacuum coating with nickel in various example loadings. As can be seen, the surface of the uncoated membrane is extremely hydrophobic, with a contact angle of about 133° However, when coated with increasing quantities of nickel, the contact angle and the hydrophobicity of the surface declines, to a minimum of about 107° at a coating weight of 1.782 g/m² geometric area. This corresponds to a more optimum 3D electrode shown in FIG. 12(b), indicating that the pore structure, porosity and high internal surface area of the membrane are all retained at this coating weight.

TABLE 1

| Nickel weight deposited (/m² geometric area) | 0 | 0.446 g | 0.891 g | 1.782 g | 3.564 g |
|---|---|---|---|---|---|
| [equivalent layer thickness on a non-porous substrate] | [0] | [50 nm] | [100 nm] | [200 nm] | [400 nm] |
| Contact angle | 133.4 ± 1.4 | 121.1 ± 1.6 | 117.3 ± 2.0 | 107.3 ± 1.7 | 110.5 ± 2.2 |

In summary, carefully calibrated vacuum (sputter) coating of about 1.782 g/m² conductive nickel onto the surface of a PTFE membrane yields a 3D electrode having a well-defined and uniform pore structure, a high internal electrochemical surface area, and a narrow conductive cross-section (about 850 nm) that extends for the geometric length and breadth of the coated side of the membrane. Moreover, the hydrophobicity of the nickel coated surface is significantly lower (contact angle about 108°) than the bulk of the membrane (contact angle about 133°). This has the effect of allowing bulk water to penetrate, or better penetrate, the porous nickel-coated surface than it does the bulk of the membrane, where it is strongly repelled.

This example provides an illustration of how truly optimum properties of conductivity, porosity (including pore size) and hydrophobicity may be achieved at the narrow interface between the gas permeable layer and the conductive layer using the techniques of the present embodiments. Such truly ideal properties can simply not be achieved in conventional 3D particulate fixed bed electrodes and gas diffusion electrodes using the fabrication techniques currently employed by the art. The present embodiments provide, as far as the inventors know, the only way to truly optimise the key fundamental properties of gas diffusion electrodes.

Figure 14:
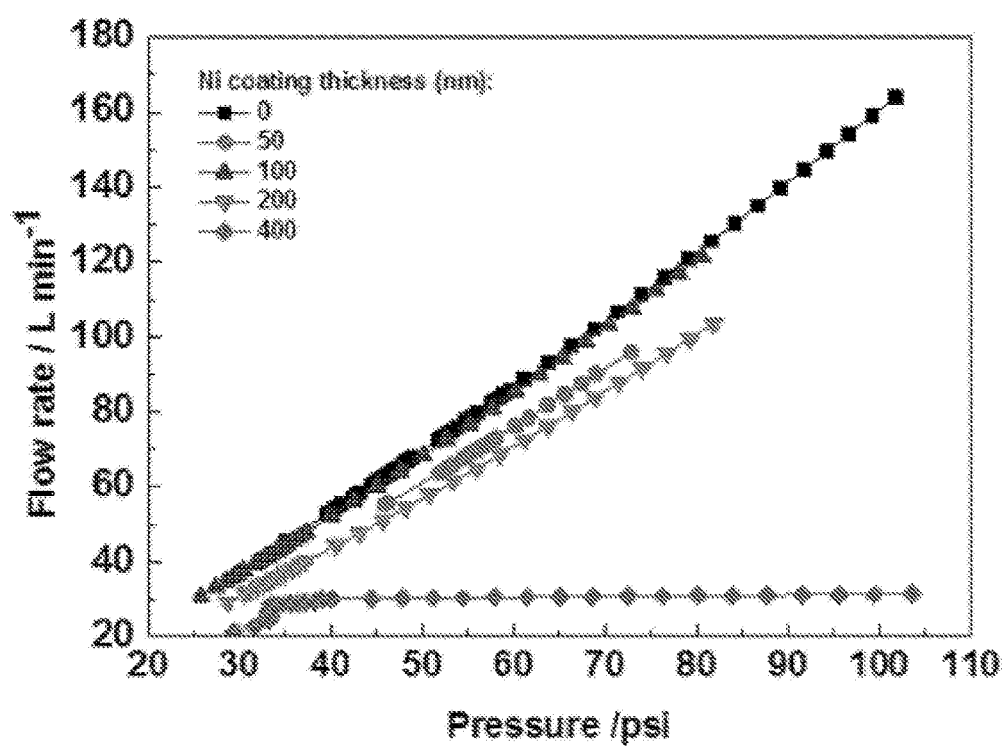
FIG. 14 depicts the air-permeability of a GE PTFE membrane with pore size of 0.2 μm, after vacuum coating with nickel in various example loadings. The loadings are identified according to the equivalent thickness that they would create on a non-porous substrate, which correspond to the actual weights as follows.

FIG. 14 illustrates a fundamental characteristic of membranes of this class or type, being their permeability to gases, which is air in this example case. The air-permeability of the produced electrodes are plotted in FIG. 14, with each electrode identified at the top left of FIG. 14 according to the equivalent thickness of nickel that would have been deposited on a non-porous substrate. As can be seen, the deposition of a Ni coating has little effect on air-permeability, up to the point where the pore structure becomes blocked. Porometry (air-permeability) experiments further indicate that the pore sizes of the coated membranes and their distributions remain essentially unchanged. The bottom, straight line in FIG. 14 depicts the air-permeability of the membrane in FIG. 12(c) and as can be seen, this electrode does not transmit gases in the manner normally expected. Thus, there is provided in one form a gas permeable 3D electrode comprising: a gas permeable material; and a porous conductive material partially coating the gas permeable material.

In various further examples:
i. the conductive material penetrates the gas permeable material to a depth less than the thickness of the gas permeable material.
ii. the depth is between about 5 nanometers to about 0.4 millimeters.
iii. the depth is between about 1/100,000$^{th}$ to about 1/1.5$^{th}$ of the thickness of the gas permeable material.
iv. a conductive layer is provided at one surface of the 3D electrode and a non-conductive layer is provided at the other surface of the 3D electrode.
v. the conductivity of the 3D electrode varies along the thickness of the 3D electrode.
vi. the conductive layer is gas permeable and at least partially liquid permeable, and the non-conductive layer is gas permeable and liquid impermeable.
vii. the conductive layer is part of an outer surface of the 3D electrode and is relatively less hydrophobic than the gas permeable material.
viii. the bulk 3D electrode is gas breathable and liquid impermeable.
ix. in use a solid-liquid-gas boundary is formed within the 3D electrode.
x. the solid-liquid-gas boundary is narrow in width compared to the thickness of the gas permeable material.
xiii. the conductive material is a metal.
xiv. the conductive material is Nickel.
xv. the metal is selected from the group of Ti, Cr, Pt, Cu, Pb, Sn, Co, Mn, Au and Ag.
xvi. the conductive material is carbon black particles.
xvii. the depth is in the range of 1 nm to 10 µm, or 50 nm to 1 µm, or 50 nm to 500 nm.
xviii. the conductive material is Nickel, the gas permeable material has a pore size of about 0.2 micron and is formed of PTFE, and the depth is greater than 0 and less than about 850 nm.
xix. the gas permeable material has substantially uniform pore size.

Example 14: Illustrative Example—Manufacturing 3D Electrodes Using Electroless Deposition of Conductive Metals The technique known as electroless nickel coating is well-known in industry. It involves dipping an item into a coating bath. The thickness of nickel deposited is typically proportional to the time that the item is dipped. A PTFE membrane having 0.2 micron pore size, supplied by GE, was pre-treated by vacuum depositing nickel onto its surface in the loading 0.0891 grams/m² geometric area. The membrane was then dipped into a commercially supplied electroless nickel coating bath (Nicklad 729 AS/B; Elite Surface Technologies). Table 2 shows the relative deposition rates at different example temperatures and dipping times

TABLE 2

| Bath temperature | Plating time | 1 minute | 1.5 minutes | 2 minutes |
|---|---|---|---|---|
| 89° C. | Coating rate (by weight)/ mg Ni cm$^{-2}$ min$^{-1}$ | 0.1071 | 0.1053 | 0.1111 |
| | coating rate (by thickness)/ nm cm$^{-2}$ min$^{-1}$ | 120 | 118 | 125 |
| 87° C. | Coating rate (by weight)/ mg Ni cm$^{-2}$ min$^{-1}$ | 0.0833 | 0.08038 | 0.0862 |
| | Coating rate (by thickness)/ nm cm$^{-2}$ min$^{-1}$ | 94 | 90 | 97 |

The desired porosity is largely lost after 1 min coating at 89° C. At 87° C., the coated area is still porous after 1 min of coating. Using this technique, it is clear that one can deposit a desired layer thickness of nickel on the membrane with some precision.

Example 15: Illustrative Example—Using Spray-Deposition to Add Catalyst Layers to Pre-Manufactured 3D Electrodes 3D electrodes including or coated with nickel can have catalyst layers added to them using a spray-coating technique. A PTFE membrane having 0.2 micron pore size, supplied by GE, was coated with 1.82 g Ni/m$^2$ using vacuum metal deposition as previously described. The coated membrane was then sprayed using a commercially-available spray-gun, with a binder-catalyst coating containing about 40% by weight of the water oxidation catalyst Co$_3$O$_4$ (supplied by Sigma-Aldrich), about 15% Nafion (supplied by DuPont), and about 5% ethanol. The mixture was sprayed until the surface of the membrane was just covered. After spraying, the coating was dried at about 60° C. in an oven for about 2 hours. Scanning electron micrographs indicate that the binder-catalyst mixture penetrated into the pores of the membrane and covered its surface. The thickness of the coating on the outside of the membrane could be varied by increasing or decreasing the time of spraying after the surface had been completely covered.

Examples 16-20: Example Applications in Cells

Example 16: Illustrative Example—the Practical Utility of 3D Electrodes: Electrocatalytic Synthesis of Peroxide by the Dow-Huron Process Using GDEs The Dow-Huron process was developed in the 1970-80's for the electrochemical manufacture of hydrogen peroxide in the basic solutions that are used by the pulp and paper industry. This industry is the biggest user of hydrogen peroxide (as a bleaching agent for the manufacture of white paper). The chemical half-reactions that occur in this process (in 1 M NaOH electrolyte) are:

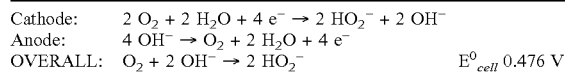

| Cathode: | $2\,O_2 + 2\,H_2O + 4\,e^- \rightarrow 2\,HO_2^- + 2\,OH^-$ | |
|---|---|---|
| Anode: | $4\,OH^- \rightarrow O_2 + 2\,H_2O + 4\,e^-$ | |
| OVERALL: | $O_2 + 2\,OH^- \rightarrow 2\,HO_2^-$ | $E^0_{cell}$ 0.476 V |

As can be seen, this reaction overall consumes base, OH$^-$, and oxygen, O$_2$, to make the hydroperoxide ion, HO$_2^-$, which is the form of hydrogen peroxide under basic conditions. Catalysts capable of facilitating hydroperoxide formation are required. The reactor used for the Dow-Huron process is described in U.S. Pat. No. 4,431,494. It involves a trickle-bed reactor into which pure oxygen or an "oxygen-containing gas" is pumped. Pure oxygen generated at the anode may be recycled back into the cathode. The hydrogen peroxide that is produced is typically used directly in a pulp and paper mill. The Dow-Huron process has not been commercially successful, partly because of the inefficiency of the trickle-bed reactor used to introduce oxygen at the cathode.

We have repeated these set of reactions using a 3D GDE according to an example embodiment. The GDE layer was General Electric Corporation PTFE membrane (0.2 micron pore size). The membrane was laminated with a 200 LPI nickel mesh and a binder (as described in Example 4). This electrode was used without modification for the cathode. For the anode, the electrode was modified by spraying (as described in Example 7). The electrodes were placed in a cell shown schematically in FIG. 15.

The cell in FIG. 15 includes the following parts: a central water reservoir 300 (containing aq. 1 M KOH), which has a water-free oxygen entry chamber 310 on the left side and a water-free oxygen generation chamber 320 on the right side. Between the water reservoir 300 and the oxygen entry chamber 310 is the cathode 3D electrode 330 (as described above). Between the water reservoir 300 and the oxygen generation chamber 320 is the anode electrode 340 (as described above). On or close to the surface of the breathable electrodes 330 and 340 is a conductive layer containing a suitable catalyst 350.

When an electrical current is applied to the electrodes by the direct current power source 360, then electrons flow along the outer circuit 370 as shown. That current causes oxygen from the air to react on the surface of the cathode electrode 330: pure oxygen is also generated on the surface of the anode electrode 340. No bubbles are formed at either the anode or cathode surface; the oxygen passes through the hydrophobic pores 380 of the 3D GDE electrodes, as shown. Liquid water cannot pass through these pores 380 since the hydrophobic surfaces of the pores 380 repel the water; the surface tension of the water thereby prevents droplets of water from disengaging from the bulk of the water to pass through the pores. Thus, the membranes of electrodes 330 and 340 act as a gas-permeable, water-impermeable barrier. In this process, peroxide is formed in the electrolyte.

This process and cell demonstrates that example GDEs can be manufactured and used to carry out the Dow-Huron process for electrochemical manufacture of hydrogen peroxide. A feature of the process used is that it did not prove to be necessary to pump air into the cathode oxygen entry chamber, as is the case for pure oxygen with the trickle-bed reactor which is conventionally used in the Dow-Huron process. Instead, at <10 mA/cm$^2$ current density, the nickel-coated ePTFE membrane electrode at the cathode aggressively extracted the oxygen from non-flowing ambient atmospheric air within the chamber. This could be demonstrated by connecting a plastic tube to the chamber entrance, with its other end dipped into a reservoir of water. Under these circumstances, the cathode GDE was found to extract and consume oxygen from the air in the chamber, causing a partial vacuum to form in the gas chamber. The partial vacuum caused a column of water to be drawn up into the tube. If left indefinitely, the entire tube and, ultimately, the entire gas chamber filled with water. The only explanation for this phenomenon is that oxygen in the chamber was spontaneously extracted from the air, causing a low pressure (partial vacuum) to form in the attached tube. Even at the low partial pressures of oxygen that were thereby created, oxygen continued to be rapidly extracted from the remaining air by the nickel-coated ePTFE membrane electrode. This activity of the cathode GDE to selectively pull oxygen out of the air is remarkable; it stands in contrast to the relatively lower activity of the conventional 3D fixed-bed, trickle-bed reactor used conventionally.

Example 17: Illustrative Example—the Practical Utility of 3D Electrodes: Electrocatalytic Conversion of Atmospheric Oxygen to Pure Oxygen Using GDEs An adaption of the Dow-Huron process has been described in the scientific literature. A paper published in the *Journal of Applied Electrochemistry* (1997) Vol. 27, Page 83, teaches that, if the electrolyte containing peroxide is not used and the peroxide contacts the anode of that cell, the reaction at the anode changes to that given below:

| | |
|---|---|
| Cathode: | $O_2$ (air) + $H_2O$ + 2 $e^-$ → $HO_2^-$ + $OH^-$ |
| Anode: | $HO_2^-$ + $OH^-$ → $O_2$ (pure) + $H_2O$ + 2 $e^-$ |
| OVERALL: | $O_2$ (air) → $O_2$ (pure) |

That is, the excess hydroperoxide ion generated at the cathode migrates to the anode, where it is preferentially oxidized. In such a situation, the cell effectively converts atmospheric oxygen (only 20% pure) at the cathode into pure oxygen (100% pure) at the anode. This is done electrochemically. Currently, most pure oxygen is manufactured cryogenically, an expensive and large-scale process. The above electrochemical process can potentially be performed on a much smaller scale.

Moreover, in the publication above, atmospheric air had to be pumped through the 15 mm diameter air cathode that was used at the high rate of 140 mL/min in order for the process to work. By contrast, when the same process is carried out using the apparatus shown in FIG. 15 at current densities <10 mA/cm², there was no need to pump air through the cathode at all. The cathode GDE extracted oxygen from the ambient air within the oxygen entry chamber without any need for an overpressure of atmospheric air. This, once again demonstrates how unexpectedly active the example 3D GDEs may be.

FIG. 16 shows a current plot of such an oxygen purification process over several days, with switching on and off of the applied voltage at regular intervals. The process made use only of the ambient air, with no air being pumped into the oxygen entry chamber. As can be seen, despite this the overall reaction was remarkably stable.

Example 18: Illustrative Example—the Practical Utility of 3D Electrodes: Efficient and Practical Fuel Cells Using GDEs The example cell in FIG. 15 may also be adapted to operate as a fuel cell, using example 3D electrodes. In such an application it is not necessary to use pure oxygen or compressed air, as is normally the case. Instead, atmospheric oxygen at normal air pressure may be used in the water-free oxygen entry chamber 310 on the left side. Hydrogen is then introduced into the water-free chamber 320 on the right side, with the result that an electrical current is generated, according to the half-reactions, which may be one of the following, depending only on the nature of the conductor and catalyst layers used on the oxygen electrode, and the basicity of the electrolyte:

| With water-generating catalysts (basic conditions): | | |
|---|---|---|
| | $O_2$ + 2 $H_2O$ + 4 $e^-$ → 4 $OH^-$ | |
| | $H_2$ + 2 $OH^-$ → 2 $H_2O$ + 2 $e^-$ | |
| OVERALL: | $O_2$ + 2 $H_2$ → 2 $H_2O$ | $E^0_{cell}$ 1.23 V |
| OR: | | |
| With water-generating catalysts (acidic conditions): | | |
| | $O_2$ + 4 $H^+$ + 4 $e^-$ → 2 $H_2O$ | |
| | 2 $H_2$ → 4 $H^+$ + 4 $e^-$ | |
| OVERALL: | $O_2$ + 2 $H_2$ → 2 $H_2O$ | $E^0_{cell}$ 1.23 V |

Water formed in the above reactions moves directly into the water reservoir 300, thereby avoiding any possibility of flooding the gas diffusion layer and maintaining a very clear and well-defined solid-liquid-gas boundary in the 3D electrodes. Protons are readily able to migrate between the electrodes through the water between the electrodes. This arrangement also eliminates the need to humidify the oxygen and hydrogen feed gases, which is a substantial extra cost in Proton Exchange Membrane (PEM) fuel cells. Humidification of the feed gases is needed in PEM fuel cells because this is the only way to maintain the moisture content of the PEM, which must stay high in order to ensure good proton conductivity between the electrodes.

The inventors have tested the fabrication of a fuel cell using GDEs of an example embodiment. The GDEs were based on an expanded PTFE (ePTFE) membrane. The cathode and anode GDEs were fabricated as follows: An expanded PTFE (ePTFE) membrane (manufactured by General Electric Corporation; pore size 0.2 micron) was vacuum-(sputter-) deposited with a thin layer of platinum (Pt) using the vacuum-/sputter-coating techniques described earlier. Using the terminology of Example 13, the Pt coating layer thickness on each electrode was deposited to an optimum thickness, which was calibrated to be about 100 nm. The resulting GDEs were combined as anode and cathode in an electrochemical cell, which was charged with a 6 M KOH solution. Pure hydrogen gas was allowed to flow through the anode gas chamber and oxygen or air through the cathode gas chamber at 1 bar. There was no ion exchange membrane between the cathode and anode in the cell.

In order to be practically useful in small-scale, "on-site" modular cells, for example of the type described in the Applicant's concurrently filed PCT patent application "Modular Electrochemical Cells" filed on 30 Jul. 2014, incorporated herein by reference, the abovementioned Pt-coated ePTFE anode and cathode combination should achieve a current density of about 10 mA/cm². Experiments showed that, with a 1 cm gap between them, the electrodes achieved a steady current of 10 mA/cm² whilst a generating a voltage of 0.4 V at 25° C. FIG. 17 depicts the polarization curve obtained. As can be seen, it is characteristic of classical fuel cell behaviour.

Considering that current day commercial PEM fuel cells achieve about 0.5-0.6 V at 70-80° C. with about 6 bar pressure applied, the data in FIG. 17 at 25° C., is unexpectedly substantial. Relatively speaking, it demonstrates high electrical efficiency. Moreover, the fuel cell did not require humidified gases, nor an expensive PEM membrane, nor compressed air. The fuel cell is, furthermore, not prone to flooding and is manufactured from ePTFE membranes that are inexpensively available.

Example 19: Using Example Embodiment GDEs to Fabricate Electrochemical Cells that Facilitate Hitherto Unknown Transformations—a Direct Methane Fuel Cell that Operates at Room-Temperature As noted previously, GDEs of the present embodiments may allow for the construction of reactors that facilitate hitherto unknown electrochemical reactions. An example is the construction of a direct methane fuel cell that operates at room temperature using GDEs of the present embodiments as the cathode and anode in the fuel cell, where oxygen gas is introduced through the gas diffusion electrode and methane gas is introduced through a second gas diffusion electrode.

FIG. 15 depicts a simple cell construction for such an embodiment. The cell in FIG. 15 includes the following parts: a central water reservoir 300 (containing aq. 1-4 M $H_2SO_4$), which has a water-free oxygen entry chamber 310 (i.e. gas region) on the left side and a water-free methane entry chamber 320 (i.e. gas region) on the right side. Between the water reservoir 300 and the oxygen entry chamber 310 is the cathode GDE electrode 330. Between the water reservoir 300 and the methane entry chamber 320 is the anode electrode 340. On or close to the surface of the breathable electrodes 330 and 340 is a conductive layer containing a suitable catalyst 350.

In such an application it is necessary to introduce oxygen, in the form of pure oxygen or as air oxygen into the oxygen gas chamber 310 on the left side. Methane must be simultaneously introduced into the gas chamber 320 on the right side, with the result that an electrical current is generated, according to the half-reactions below:

| At the Anode: | $CH_4 + 2 H_2O \rightarrow CO_2 + 8 H^+ + 8 e^-$ | $E^0_{ox} = -0.31$ V* |
|---|---|---|
| At the Cathode: | $O_2 + 4 H^+ + 4 e^- \rightarrow 2 H_2O$ | $E^0_{red} = 1.23$ V |
| | $CH_4 + 2 O_2 \rightarrow CO_2 + 2 H_2O$ | $E^0_{cell} = 0.92$ V |

*unconfirmed, but $E^0_{red}$ is believed to be about −0.31 V.

Note that the $E^0_{cell}$ is positive, meaning that the system should generate a voltage and a current. However, to date, no direct methane fuel cell has been demonstrated that operates at room temperature. This is because a suitable cell arrangement and catalyst for methane oxidation have not been identified.

The inventors have found however, that a direct methane fuel cell of this type, that operates at room temperature, may be fabricated using GDEs of an example embodiment. The GDEs were based on an expanded PTFE (ePTFE) membrane.

The cathode and anode GDEs were fabricated as follows: An expanded PTFE (ePTFE) membrane (manufactured by General Electric Corporation; pore size 0.2 micron) was vacuum-(sputter-) deposited with a thin layer of platinum (Pt) using the vacuum-/sputter-coating techniques described in a previous example. Using the terminology of Example 13, the Pt coating layer thickness on each electrode was calibrated to optimally be about 100 nm. The resulting GDEs were combined as anode and cathode in an electrochemical cell of the type shown in FIG. 15, which was charged with a 1 to 4 M $H_2SO_4$ solution. Pure methane gas was allowed to flow through the anode gas chamber and oxygen or air through the cathode gas chamber at atmospheric pressure. There was no ion exchange membrane between the cathode and anode in the cell.

FIG. 18 depicts the polarization curves obtained when a 1 cm gap existed between the ePTFE electrodes in the cell and the cell was allowed to stand for >20 min with the gases passing through their respective chambers, before the curve was recorded. As can be seen, the resulting curve depicts classical fuel cell behaviour. As can also be seen, the cell achieved a practically useful 10 mA/cm² at about 0.15 V when using 4 M $H_2SO_4$. To the best of our knowledge, this is the first example ever reported of a direct methane fuel cell that operates with potentially useful currents at room temperature. The reactor architecture, involving the use of "breathable" electrodes based on ePTFE, clearly made this result possible.

It should be noted that the cell did display anomalous behaviour in that the currents below about 0.4 V were only obtained if the cell was allowed to stand for some time with the gases passing through their respective chambers, before the curve was recorded. A second scan immediately after a first scan, showed the same currents at voltages above 0.4 V, but only small currents below 0.4 V. To try to explain this behaviour, further studies were carried out on the cell. These suggested that at about 0.4 V, there may have been a change in the electrochemical behaviour of the cell. This may have been caused by: (1) the formation of a methanic polymer over the face of the methane electrode (in analogy with methanol fuel cells where a methanolic polymer is known to form over the face of the methanol electrode; this polymer must be periodically ejected by reverse biasing the cell), (2) a kinetic effect in which the methane displayed a low affinity for the platinum catalyst below 0.4V, so that once all of the Pt-bound methane was consumed, it took some time for more methane to bind and react on the platinum at voltages below 0.4 V; or, alternatively, (3) an additional reaction taking place intermittently below about 0.4 V.

Example 20: Illustrative Example—Using Flexible 3D Electrodes to Form a Spiral-Wound Cell or Device As previously discussed, example 3D electrodes can be flexible. 3D electrodes can be formed as anodes and cathodes for use in a variety of cells, devices or reactors. 3D electrodes can be stacked or layered, for example as alternating anodes/cathodes and with any required intervening spacer layers, insulating layers, gas channel layers, feed channels or the like. Selected edges of 3D electrodes can be sealed while other selected edges are left unsealed for gas or liquid ingress or egress, as required.

FIG. 19 schematically illustrates an example partially produced spiral-wound cell, device or reactor 400. One or more flexible 3D electrodes 410, for example a layered stack of flexible 3D electrodes formed as anode-cathode pairs or series, can be rolled or spiral-wound about a central tube, conduit or section 420. Some applications may call for a single flexible 3D electrode to be rolled or wound.

FIG. 20 schematically illustrates an example of how flexible 3D electrodes, for example after being stacked as anode-cathode pairs or series, can be formed into an example spiral-wound cell, device or reactor 450. To minimise the overall footprint of a cell, a multi-layered arrangement of flat-sheet flexible 3D electrodes may be rolled up into a spiral-wound cell 450. The spiral-wound cell 450 may then be encased in a casing, which still allows for electrolyte to transit through the cell 450. 3D electrodes acting as anodes and cathodes can be attached to a central tube 420 in such a way that unsealed edges of the electrodes properly transport liquid/gases. For example, electrolyte can be introduced to the rolled 3D electrodes at input edges 490, and electrolyte can exit the rolled 3D electrodes at exit edges 480. Also for example, a gas or gases can be introduced to the rolled 3D electrodes at gas input 460, and a gas or gases can exit the rolled 3D electrodes at gas exit 470. The liquid and gas plumbing can vary depending on the specific structure or application.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

Optional embodiments may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although preferred embodiments have been described in detail, it should be understood that many modifications, changes, substitutions or alterations will be apparent to those skilled in the art without departing from the scope of the present invention.

The invention claimed is:

1. A gas permeable 3D electrode comprising:
   a gas permeable material that is non-conductive;
   a porous conductive material attached to the gas permeable material; and
   a binder material to attach the porous conductive material to the gas permeable material;
   wherein the binder material is provided with a catalytic material; and
   wherein a three-phase solid-liquid-gas boundary is able to form at or near a surface of the gas permeable material facing the porous conductive material.

2. The gas permeable 3D electrode of claim 1, wherein the electrode is flexible.

3. The gas permeable 3D electrode of claim 2, wherein the electrode is spiral-wound or rolled.

4. The gas permeable 3D electrode of claim 1, wherein during use of the electrode the gas permeable material is impermeable to a liquid electrolyte, and the porous conductive material is permeable to the liquid electrolyte.

5. The gas permeable 3D electrode of claim 1, wherein the porous conductive material is provided adjacent to the gas permeable material.

6. The gas permeable 3D electrode of claim 1, wherein the porous conductive material abuts the gas permeable material.

7. The gas permeable 3D electrode of claim 1, wherein the porous conductive material is selected from the group of: metallic meshes; metallic grids; metallic lattices; metallic cloths; perforated metallic sheets; polymeric meshes, grids, lattices or cloths coated with a metallic layer; carbon fibres or carbon cloths; and, porous or spaced apart metallic elements.

8. The gas permeable 3D electrode of claim 1, wherein the binder material is provided with a conductive material.

9. The gas permeable 3D electrode of claim 1, wherein the binder material includes carbon black particles, graphene, carbon nanotubes, or buckyballs.

10. The gas permeable 3D electrode of claim 1, wherein the binder material includes Nickel particles or nanoparticles.

11. The gas permeable 3D electrode of claim 1, wherein the binder material includes an ionomer.

12. The gas permeable 3D electrode of claim 1, wherein the binder material is present between the porous conductive material and the gas permeable material.

13. The gas permeable 3D electrode of claim 1, wherein the binder material penetrates into the gas permeable material to a depth less than the thickness of the gas permeable material.

14. The gas permeable 3D electrode of claim 1, wherein the binder material penetrates into or around the porous conductive material.

15. The gas permeable 3D electrode of claim 1, comprising a barrier layer.

16. The gas permeable 3D electrode of claim 15, wherein the barrier layer limits an amount of water vapor permeating through the electrode.

17. The gas permeable 3D electrode of claim 1, wherein the gas permeable material has a characteristic pore size <500 nm.

18. The gas permeable 3D electrode of claim 1, wherein the electrode has a wetting pressure between 0.2 bar and 10 bar.

19. The gas permeable 3D electrode of claim 1, wherein the electrode has a width of about 0.05 in to about 2 in.

20. The gas permeable 3D electrode of claim 1, wherein the electrode has a length of about 0.5 m to about 10 m.

21. The gas permeable 3D electrode of claim 1, wherein in use the three-phase solid-liquid-gas boundary is macroscopically substantially two-dimensional in relation to the width of the 3D electrode.

22. The gas permeable 3D electrode of claim 1, wherein the porous conductive material is at least partially formed using Nickel.

23. The gas permeable 3D electrode of claim 1, wherein the porous conductive material is at least partially formed using Ti, Cr, Pt, Cu, Pb, Sn, Co, Mn, Au and/or Ag.

24. An electrochemical cell comprising the gas permeable 3D electrode of claim 1.

25. The electrochemical cell of claim 24, wherein the cell includes a plurality of the gas permeable 3D electrodes that are flexible.

26. A gas permeable 3D electrode comprising:
   a gas permeable material that is non-conductive;
   a first porous conductive material attached to the gas permeable material; and
   a second porous conductive material positioned on an opposite side of the gas permeable material to the first porous conductive material;
   wherein a three-phase solid-liquid-gas boundary is able to form at or near a surface of the gas permeable material facing the first porous conductive material.

27. The gas permeable 3D electrode of claim 26, wherein during use of the electrode, the gas permeable material is impermeable to a liquid electrolyte, and the first porous conductive material is permeable to the liquid electrolyte.

28. The gas permeable 3D electrode of claim 26, wherein the first porous conductive material is provided adjacent to the gas permeable material.

29. The gas permeable 3D electrode of claim 26, wherein the first porous conductive material abuts the gas permeable material.

30. The gas permeable 3D electrode of claim 26, further comprising a binder material to attach the first porous conductive material to the gas permeable material.

31. The gas permeable 3D electrode of claim 30, wherein the binder material is provided with a catalytic material.

32. The gas permeable 3D electrode of claim 30, wherein the binder material is provided with a conductive material.

33. The gas permeable 3D electrode of claim 30, wherein the binder material includes carbon black particles, graphene, carbon nanotubes, or buckyballs.

34. The gas permeable 3D electrode of claim 30, wherein the binder material includes Nickel particles or nanoparticles.

35. The gas permeable 3D electrode of claim 30, wherein the binder material includes an ionomer.

36. The gas permeable 3D electrode of claim 30, wherein the binder material is present between the first porous conductive material and the gas permeable material.

37. The gas permeable 3D electrode of claim 30, wherein the binder material penetrates into the gas permeable material to a depth less than the thickness of the gas permeable material.

38. The gas permeable 3D electrode of claim 30, wherein the binder material penetrates into or around the first porous conductive material.

39. The gas permeable 3D electrode of claim 26, comprising a barrier layer.

40. The gas permeable 3D electrode of claim 39, wherein the barrier layer limits an amount of water vapor permeating through the electrode.

\* \* \* \* \*

UNITED STATES PATENT AND TRADEMARK OFFICE
CERTIFICATE OF CORRECTION

Page 1 of 2

PATENT NO. : 10,026,967 B2
APPLICATION NO. : 14/908258
DATED : July 17, 2018
INVENTOR(S) : Gerhard Frederick Swiegers It is certified that error appears in the above-identified patent and that said Letters Patent is hereby corrected as shown below:

In Column 2, Line 28, change "outermost" to --outer-most--

In Column 6, Line 35, change "GDE" to --GDE.--

In Column 10, Line 41, change "inclusively" to --inclusively.--

In Column 12, Line 27, change "grids," to --grids;--

In Column 19, Line 42, change "ODE" to --GDE--

In Column 21, Line 47, change "µm," to --µm;--

In Column 23, Line 60, change "Goretedx" to --Goretex®--

In Column 32, Line 41, change "alcohols/water," to --alcohols/water;--

In Column 34, Line 22 (Approx.), change "alcohols/water:" to --alcohols/water;--

In Column 35, Line 48-49, change "Corporation," to --Corporation;--

In Column 36, Line 55, change "Nation" to --Nafion--

In Column 48, Line 45 (Approx.), change "times" to --times.--

In Column 50, Line 16, change "330:" to --330;--

In Column 55, Line 21, Claim 4, change "electrode" to --electrode,--

Signed and Sealed this
Sixteenth Day of October, 2018

Andrei Iancu
*Director of the United States Patent and Trademark Office*

In Column 56, Line 2, Claim 19, change "0.05 in" to --0.05 m--

In Column 56, Line 2, Claim 19, change "2 in." to --2 m.--